US011993302B2

(12) United States Patent
Zheng et al.

(10) Patent No.: US 11,993,302 B2
(45) Date of Patent: May 28, 2024

(54) WHEELED CARRYING APPARATUS

(71) Applicant: Wonderland Switzerland AG, Steinhausen (CH)

(72) Inventors: Leilei Zheng, Guangdong (CN); Zheng-Wen Guo, Guangdong (CN); Er Xue Wang, Guangdong (CN); Mingxing Sun, Guangdong (CN); Shoufeng Hu, Guangdong (CN); Wanquan Zhu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 353 days.

(21) Appl. No.: 16/899,581

(22) Filed: Jun. 12, 2020

(65) Prior Publication Data
US 2020/0391783 A1 Dec. 17, 2020

(30) Foreign Application Priority Data

Jun. 13, 2019 (CN) .......................... 201910514627.1
Aug. 23, 2019 (CN) .......................... 201910787608.6
(Continued)

(51) Int. Cl.
*B62B 9/08* (2006.01)
*B62B 7/04* (2006.01)
(Continued)

(52) U.S. Cl.
CPC .............. *B62B 9/087* (2013.01); *B62B 7/044* (2013.01); *B62B 7/062* (2013.01); *B62B 9/085* (2013.01); *B62B 9/20* (2013.01); *B62B 9/142* (2013.01)

(58) Field of Classification Search
CPC ........... B62B 9/087; B62B 9/085; B62B 9/08; B62B 9/20; B62B 9/142; B62B 7/044; B62B 7/04; B62B 7/062; B62B 7/06
See application file for complete search history.

(56) References Cited

U.S. PATENT DOCUMENTS

| 4,349,938 A | 9/1982 | Fontana |
| 4,779,879 A | 10/1988 | Kassai |

(Continued)

FOREIGN PATENT DOCUMENTS

| CA | 2457374 A1 | 8/2004 |
| CA | 2682801 A1 | 10/2008 |

(Continued)

OTHER PUBLICATIONS

Office Action and search report dated Oct. 13, 2021 on Taiwanese counterpart 109131083 along with English translation of search report.

(Continued)

*Primary Examiner* — John D Walters
(74) *Attorney, Agent, or Firm* — Hauptman Ham, LLP

(57) ABSTRACT

A wheeled carrying apparatus includes a frame structure including a standing frame, a wheel mount carrying a wheel and pivotally connected with the standing frame, the wheel being rotatable relative to the first wheel mount about a wheel axis, a locking assembly including a wheel mount latch movably connected with the standing frame, the wheel mount latch being engaged with the wheel mount to rotationally lock the first wheel mount with respect to the standing frame, and disengaged from the wheel mount to unlock the wheel mount for rotation of the wheel mount to change an orientation of the wheel axis, an actuating assembly coupled to the wheel mount latch and including one or more linking part, and a release mechanism including an operating part provided on the frame structure that is oper- (Continued)

able to cause the actuating assembly to pull the wheel mount latch to disengage from the wheel mount.

54 Claims, 78 Drawing Sheets

(30) Foreign Application Priority Data

| Sep. 11, 2019 | (CN) | 201910858955.3 |
|---|---|---|
| Dec. 23, 2019 | (CN) | 201911336477.6 |
| Apr. 30, 2020 | (CN) | 202010370191.6 |

(51) Int. Cl.
  *B62B 7/06* (2006.01)
  *B62B 9/20* (2006.01)
  *B62B 9/14* (2006.01)

(56) References Cited

U.S. PATENT DOCUMENTS

| 4,997,066 | A | 3/1991 | Bigo |
| 5,125,676 | A | 6/1992 | Teng |
| 5,351,364 | A | 10/1994 | Zun |
| 6,212,733 | B1 | 4/2001 | Yeh |
| 6,315,309 | B1 | 11/2001 | Li et al. |
| 7,083,175 | B1 * | 8/2006 | Liu .................... B60B 33/0039 280/47.38 |
| 7,210,690 | B2 | 5/2007 | Tan |
| 7,273,225 | B2 * | 9/2007 | Yeh .................... B62B 9/085 280/638 |
| 7,490,848 | B2 | 2/2009 | Wu et al. |
| 7,922,182 | B2 | 4/2011 | Van der Vegt |
| 8,328,226 | B2 | 12/2012 | Ku-Hui et al. |
| 8,991,854 | B2 * | 3/2015 | Greger .................... B62B 3/022 280/650 |
| 9,044,656 | B2 | 6/2015 | Zhang |
| 9,254,858 | B2 * | 2/2016 | Shellenberger ......... B62B 9/085 |
| 9,592,846 | B1 | 3/2017 | Hanson et al. |
| 9,707,987 | B2 * | 7/2017 | Hanson .................... B62B 7/068 |
| 11,254,342 | B2 * | 2/2022 | Kalinowski ........... B62B 5/0442 |
| 11,358,624 | B2 | 6/2022 | Guo et al. |
| 11,479,285 | B2 | 10/2022 | Guo et al. |
| 2003/0204933 | A1 | 11/2003 | Yeh |
| 2004/0226134 | A1 | 11/2004 | Chen |
| 2005/0194755 | A1 | 9/2005 | Lan |
| 2006/0071452 | A1 | 4/2006 | Yeh |
| 2007/0013156 | A1 | 1/2007 | Wu et al. |
| 2007/0085304 | A1 | 4/2007 | Yeh |
| 2007/0262565 | A1 | 11/2007 | Bearup et al. |
| 2010/0109271 | A1 | 5/2010 | Funakura |
| 2010/0127481 | A1 | 5/2010 | Funakura |
| 2010/0259022 | A1 | 10/2010 | Zhong et al. |
| 2011/0285110 | A1 | 11/2011 | Ku-Hui et al. |
| 2012/0043730 | A1 | 2/2012 | Walther et al. |
| 2012/0056393 | A1 | 3/2012 | Funakura |
| 2012/0326418 | A1 | 12/2012 | Ohnishi |
| 2013/0069329 | A1 | 3/2013 | Chaudeurge |
| 2014/0327233 | A1 | 11/2014 | Greger et al. |
| 2017/0057284 | A1 | 3/2017 | Wang et al. |
| 2017/0066465 | A1 | 3/2017 | Hanson et al. |
| 2018/0065655 | A1 | 3/2018 | Leys et al. |
| 2018/0162434 | A1 | 6/2018 | Kalinowski et al. |
| 2020/0391783 | A1 | 12/2020 | Zheng et al. |
| 2021/0046968 | A1 | 2/2021 | Zheng |
| 2021/0070344 | A1 | 3/2021 | Guo et al. |
| 2022/0009538 | A1 | 1/2022 | Guo et al. |
| 2023/0059506 | A1 | 2/2023 | Wu et al. |

FOREIGN PATENT DOCUMENTS

| CA | 2682806 A1 | 10/2008 |
| CA | 2756004 A1 | 10/2010 |
| CA | 2820031 A1 | 12/2013 |
| CA | 2682801 C | 3/2015 |
| CA | 3067568 A1 | 7/2020 |
| CA | 3183933 A1 | 12/2021 |
| CN | 1031204 A | 2/1989 |
| CN | 2758149 Y | 2/2006 |
| CN | 2827815 Y | 10/2006 |
| CN | 201012618 Y | 1/2008 |
| CN | 101678852 A | 3/2010 |
| CN | 101687518 A | 3/2010 |
| CN | 201646809 U | 11/2010 |
| CN | 201761521 U | 3/2011 |
| CN | 201923194 U | 8/2011 |
| CN | 102248961 A | 11/2011 |
| CN | 102923174 A | 2/2013 |
| CN | 202753995 U | 2/2013 |
| CN | 203111278 U | 8/2013 |
| CN | 103568712 A | 2/2014 |
| CN | 203681630 U | 7/2014 |
| CN | 104044623 A | 9/2014 |
| CN | 104118462 A | 10/2014 |
| CN | 203888857 U | 10/2014 |
| CN | 203946141 U | 11/2014 |
| CN | 104176105 A | 12/2014 |
| CN | 104781132 A | 7/2015 |
| CN | 204871148 U | 12/2015 |
| CN | 204956578 U | 1/2016 |
| CN | 205632637 U | 10/2016 |
| CN | 106143581 A | 11/2016 |
| CN | 206351703 U | 7/2017 |
| CN | 206885123 U | 1/2018 |
| CN | 207293586 U | 5/2018 |
| CN | 108820029 | 11/2018 |
| CN | 109305211 A | 2/2019 |
| CN | 208915235 U | 5/2019 |
| CN | 209617237 U | 11/2019 |
| CN | 110834664 A | 2/2020 |
| CN | 110901746 A1 | 3/2020 |
| EP | 2719605 A1 | 4/2014 |
| EP | 2805868 A2 | 11/2014 |
| EP | 2946985 A1 | 11/2015 |
| EP | 2946985 B1 | 4/2018 |
| JP | H0867255 A | 3/1996 |
| JP | H09109604 A | 4/1997 |
| JP | 2002284015 A | 10/2002 |
| JP | 2003-54209 | 2/2003 |
| JP | 3196047 | 1/2015 |
| JP | 2015013570 A | 1/2015 |
| JP | 2015209182 A | 11/2015 |
| JP | 2017081252 A | 5/2017 |
| JP | 2019077268 A | 5/2019 |
| JP | 2019131025 A | 8/2019 |
| TW | 589261 B | 6/2004 |
| TW | M245120 U | 10/2004 |
| TW | 201043510 A | 12/2010 |
| TW | I434783 B | 4/2014 |
| TW | 201434698 A | 9/2014 |
| TW | 201710135 A | 3/2017 |
| TW | 201711890 A | 4/2017 |
| TW | 201914878 A | 4/2019 |
| TW | 606710 U | 1/2021 |
| WO | 2013149642 A1 | 10/2013 |
| WO | 2016047406 A1 | 3/2016 |

OTHER PUBLICATIONS

The International Search Report of the corresponding PCT Application No. PCT/EP2020/075381 dated Jan. 11, 2021.
International Search Report of the corresponding PCT Application No. PCT/EP2020/066397 dated Sep. 28, 2020.
Office Action of the corresponding Taiwan Patent Application No. 109125001 (English translation) dated Mar. 5, 2021.
Office Action of the corresponding Japanese Patent Application No. 2020-102214 (along with an English translation) dated Aug. 30, 2021.
Office Action dated Jun. 7, 2022 on Japanese counterpart 2020-102214 along with English translations thereof.
Office Action dated May 30, 2022 on Indian counterpart 202217009677.

(56) References Cited

OTHER PUBLICATIONS

Canadian First Office Action issued in corresponding Canadian Application No. 3,151,487, dated Mar. 28, 2023, pp. 1-5.
Taiwanese First Office Action issued in corresponding Taiwanese Application No. 111137931, dated Jan. 30, 2023, pp. 1-6.
Taiwanese First Office Action issued in corresponding Taiwanese Application No. 112100025, dated Mar. 3, 2023, pp. 1-13.
Japanese Notice of Reasons for Refusal issued in corresponding Japanese Application No. JP2020-151702, dated Jun. 29, 2021, pp. 1-6.
Japanese 2nd Notice of Reasons for Refusal issued in corresponding Japanese Application No. JP2020-102214, dated Jun. 13, 2021, pp. 1-8.
Taiwanese 1st Office Action issued in corresponding Taiwanese Application No. TW109141101, dated Jul. 5, 2021, pp. 1-12.
Taiwanese 1st Office Action issued in corresponding Taiwanese Application No. TW109131084, dated Oct. 1, 2021, pp. 1-9.
International Search Report issued in corresponding International Application No. PCT-EP2020-075385, dated Mar. 12, 2021, pp. 1-5.
Chinese 1st Office Action issued in corresponding Chinese Application No. CN202010950012.6, dated Aug. 2, 2022, pp. 1-21.
Chinese 1st Office Action issued in corresponding Chinese Application No. CN201910787608.6, dated May 8, 2021, pp. 1-15.
Chinese 2nd Office Action issued in corresponding Chinese Application No. CN201910787608.6, dated Jan. 29, 2022, pp. 1-15.
Chinese 3rd Office Action issued in corresponding Chinese Application No. CN201910787608.6, dated Apr. 18, 2022, pp. 1-11.
European 1st Office Action issued in corresponding European Application No. EP20195526.7, dated Oct. 26, 2022, pp. 1-4.
European 2nd Office Action issued in corresponding European Application No. EP20179828.7, dated Oct. 5, 2022, pp. 1-4.
Notice of Allowance issued in U.S. Appl. No. 17/017,357, dated Feb. 15, 2022, pp. 1-11.
Non Final Office Action issued in U.S. Appl. No. 17/017,401, dated Feb. 3, 2022, pp. 1-10.
Non-Final Office Action issued in corresponding U.S. Appl. No. 17/743,338, dated Apr. 27, 2023, pp. 1-23, U.S. Patent and Trademark Office, Alexandria, VA.
Non-Final Office Action issued in corresponding U.S. Appl. No. 17/945,323, dated Jun. 23, 2023, pp. 1-16, U.S. Patent and Trademark Office, Alexandria, VA.
Australian 2nd Office Action issued in corresponding Australian Application No. 2020293582, dated Nov. 6, 2023, pp. 1-4.
Chinese 3rd Office Action issued in corresponding Chinese Application No. 202010950012.6, dated Sep. 27, 2023, pp. 1-7.
Japanese Notice of Reasons for Refusal issued in corresponding Japanese Application No. 2023-024357, dated Oct. 26, 2023, pp. 1-8.

\* cited by examiner

WHEELED CARRYING APPARATUS

CROSS-REFERENCE TO RELATED APPLICATION(S)

This application respectively claims priority to China patent application no. 201910514627.1 filed on Jun. 13, 2019, to China patent application no. 201910787608.6 filed on Aug. 23, 2019, to China patent application no. 201910858955.3 filed on Sep. 11, 2019, to China patent application no. 201911336477.6 filed on Dec. 23, 2019, and to China patent application no. 202010370191.6 filed on Apr. 30, 2020.

BACKGROUND

1. Field of the Invention

The present invention relates to wheeled carrying apparatuses.

2. Description of the Related Art

Caregivers usually rely on a stroller apparatus to transport babies and children. Most stroller apparatuses typically have front wheels that can freely rotate horizontally relative to the stroller frame for changing the orientation of the wheel axes, and rear wheels that cannot rotate horizontally and have a fixed wheel axis oriented transversally. As a result, it may not be easy for the stroller apparatus to turn around in an environment of limited space.

Therefore, there is a need for an improved design that can offer better maneuverability and address at least the foregoing issues.

SUMMARY

The present application describes a wheeled carrying apparatus having wheel assemblies that can be controllably locked and unlocked in horizontal orientation and can offer better maneuverability.

According to one embodiment, the wheeled carrying apparatus includes a frame structure including a standing frame, a first wheel mount carrying a first wheel and pivotally connected with the standing frame, the first wheel being rotatable relative to the first wheel mount about a first wheel axis, a locking assembly including a first wheel mount latch movably connected with the standing frame, the first wheel mount latch being engaged with the first wheel mount to rotationally lock the first wheel mount with respect to the standing frame, and disengaged from the first wheel mount to unlock the first wheel mount so that the first wheel mount is rotatable relative to the standing frame for changing an orientation of the first wheel axis, an actuating assembly coupled to the first wheel mount latch and including one or more linking part, and a release mechanism including an operating part provided on the frame structure at a location distant from the first wheel mount latch, the release mechanism being operable to cause the actuating assembly to pull the first wheel mount latch so that the first wheel mount latch disengages from the first wheel mount.

According to an embodiment, the release mechanism is operable to cause the actuating assembly to push or pull the first wheel mount latch so that the first wheel mount latch disengages from the first wheel mount.

According to an embodiment, the locking assembly includes a locking spring connected with the first wheel mount latch, the locking spring being adapted to apply a biasing force for engaging the first wheel mount latch with the first wheel mount.

According to an embodiment, the frame structure further includes a handle frame coupled to the standing frame, and the operating part is optionally placed on the handle frame.

According to an embodiment, the operating part is slidably or pivotally connected with the frame structure, in particular with the handle frame.

According to an embodiment, the actuating assembly includes a link actuator and a linking part, the link actuator being movably connected with the frame structure, the linking part coupling the first wheel mount latch to the link actuator.

According to an embodiment, the link actuator is movable to actuate the linking part, in particular to push or pull the linking part, and to urge the first wheel mount latch to disengage from the first wheel mount.

According to an embodiment, the linking part includes a cable.

According to an embodiment, the operating part is coupled to the link actuator via a cable.

According to an embodiment, the actuating assembly includes a link actuator and wherein the frame structure further includes a handle frame that is coupled to the standing frame via a bar linkage, the link actuator being movably connected with the bar linkage.

According to an embodiment, the bar linkage includes a bar having two ends respectively connected pivotally with the handle frame and the standing frame, and the link actuator is slidably connected with the bar.

According to an embodiment, the operating part is placed on the handle frame.

According to an embodiment, the actuating assembly includes a link actuator and wherein the link actuator is slidably assembled with the frame structure, and the operating part has a ramp surface, the release mechanism being operable to cause the first wheel mount latch to unlock the first wheel mount via a sliding contact between the ramp surface and the link actuator.

According to an embodiment, the operating part includes a barrel pivotally connected with the frame structure, and wherein the actuating assembly includes a linking part, and the linking part includes a cable having an end anchored to the barrel, the barrel being rotatable to wind at least partially the cable so that the first wheel mount latch is actuated in movement by the actuating assembly, in particular pushed or pulled in movement by the actuating assembly, and disengages from the first wheel mount.

According to an embodiment, the operating part includes a barrel pivotally connected with the frame structure, and a button slidably connected with the frame structure, and wherein the actuating assembly includes a linking part, and the linking part includes a cable having an end anchored to the barrel, the button being operable to urge the barrel to rotate for operating the cable so that the first wheel mount latch is actuated in movement by the actuating assembly, in particular for pulling the cable so that the first wheel mount latch is pulled in movement by the actuating assembly, and disengages from the first wheel mount.

According to an embodiment, the standing frame includes a leg frame, and the operating part is placed on the leg frame.

According to an embodiment, the leg frame includes a side segment and a transversal segment fixedly connected with each other, and the operating part is placed on the side segment or the transversal segment.

According to an embodiment, the actuating assembly includes a single cable having two opposite ends respectively connected with the operating part and the first wheel mount latch.

In an embodiment, the wheeled carrying apparatus further includes: a second wheel mount carrying a second wheel and pivotally connected with the standing frame, the second wheel being rotatable relative to the second wheel mount about a second wheel axis, the first and second wheel mounts being spaced apart from each other along a lengthwise axis of the wheeled carrying apparatus extending from a rear to a front thereof; and a second locking assembly including a second wheel mount latch movably connected with the standing frame, the second wheel mount latch being adapted to be engaged with the second wheel mount to rotationally lock the second wheel mount with respect to the standing frame, and adapted to be disengaged from the second wheel mount to unlock the second wheel mount so that the second wheel mount is rotatable relative to the standing frame for changing an orientation of the second wheel axis.

According to an embodiment, the frame structure further includes a handle frame that is coupled to the standing frame and is rotatable relative to the standing frame between a first position and a second position, the release mechanism being configured to be operable in any of the first and second position of the handle frame to cause the first wheel mount and the second wheel mount to be unlocked at the same time.

According to an embodiment, the actuating assembly includes: a link actuator movably connected with the frame structure, in particular with the standing frame or the handle frame; and a first linking part coupling the first wheel mount latch to the link actuator, and a second linking part coupling the second wheel mount latch to the link actuator; wherein the link actuator is movable in a first direction to actuate the second linking part, in particular push or pull the second linking part, and to urge the second wheel mount latch to disengage from the second wheel mount and concurrently relax the first linking part so that the first wheel mount latch is allowed to engage with the first wheel mount, and the link actuator is movable in a second direction opposite to the first direction to actuate the first linking part, in particular push or pull the first linking part, and to urge the first wheel mount latch to disengage from the first wheel mount and concurrently relax the second linking part so that the second wheel mount latch is allowed to engage with the second wheel mount.

According to an embodiment, the link actuator is movable in the first direction or the second direction in response to a rotation of the handle frame between the first position and the second position.

According to an embodiment, any of the first linking part and the second linking part includes a cable.

According to an embodiment, the handle frame is rotatable about a pivot axis relative to the standing frame between the first position and the second position, and the link actuator is pivotally connected with the standing frame about the same pivot axis.

According to an embodiment, the release mechanism further includes a coupling part that is operatively connected with the operating part, the coupling part being movable relative to the link actuator between a first state and a second state, the link actuator is rotatable relative to the handle frame or the standing frame in a first direction when the coupling part is in the second state and the handle frame is in first position, and to urge the second wheel mount latch to disengage from the second wheel mount.

According to an embodiment, the link actuator is rotatable relative to the handle frame or the standing frame in a second direction when the coupling part is in the second state and the handle frame is in second position, and to urge the first wheel mount latch to disengage from the first wheel mount in a second direction.

According to an embodiment, the coupling part is carried with the handle frame and being movable relative to the handle frame, wherein the link actuator and the handle frame being coupled to each other so as to be rotatable in unison when the coupling part is in the first state.

According to an embodiment, the actuating assembly further includes: a first spring connected with the link actuator, the first spring being operable to bias the link actuator to rotate relative to the standing frame and the handle frame in the first direction; and/or a second spring connected with the link actuator, the second spring being operable to bias the link actuator to rotate relative to the standing frame and the handle frame in the second direction.

According to an embodiment, the release mechanism further includes a coupling part that is carried with the handle frame and is operatively connected with the operating part, the coupling part being movable relative to the handle frame and the link actuator between a first state and a second state, the link actuator and the handle frame being coupled to each other so as to be rotatable in unison when the coupling part is in the first state, and the link actuator being rotatable relative to the handle frame and the standing frame when the coupling part is in the second state.

According to an embodiment, the coupling part is engaged with the link actuator in the first state so as to prevent rotation of the link actuator relative to the handle frame, and the link actuator is rotatable relative to the handle frame and the standing frame under a biasing force of the first or second spring when the coupling part is in the second state.

According to an embodiment, the handle frame is rotatable between the first position and the second position with the coupling part in the first state, whereby the link actuator is rotatable along with the handle frame in the first direction when the handle frame rotates from the second position to the first position, and the link actuator is rotatable along with the handle frame in the second direction when the handle frame rotates from the first position to the second position.

According to an embodiment, the operating part is operable to cause the coupling part to move relative to the handle frame from the first state to the second state while the handle frame is in the first position so that the link actuator biased by the second spring rotates in the second direction and actuates the first linking part, in particular pushes or pulls the first linking part, for disengaging the first wheel mount latch from the first wheel mount, and the operating part is operable to cause the coupling part to move relative to the handle frame from the first state to the second state while the handle frame is in the second position so that the link actuator biased by the first spring rotates in the first direction and actuates the second linking part, in particular pushes or pulls the second linking part, for disengaging the second wheel mount latch from the second wheel mount.

According to an embodiment, the link actuator has a generally V-shaped slot, and a notch at a bottom of the slot, the coupling part being adapted to be engaged with the notch in the first state and disengaged from the notch in the second state.

According to an embodiment, the operating part is connected with the coupling part via a cable.

According to an embodiment, the actuating assembly further includes a cable assembly that operatively couples the operating part to the first and second wheel mount latches and is operatively decoupled from the link actuator, the operating part being operable to actuate the cable assembly, in particular push or pull the cable assembly, so that the first and second wheel mount latches are respectively disengaged from the first and second wheel mounts.

According to an embodiment, the cable assembly includes a sliding part, a first and a second cable portion connected with the sliding part, and a third cable connected with the sliding part and the operating part, the first cable portion further being connected with the first linking part or the first wheel mount latch, the second cable portion further being connected with the second linking part or the second wheel mount latch.

According to an embodiment, the actuating assembly further includes a rotational coupling mechanism configured to rotationally couple the link actuator to the handle frame during rotation of the handle frame between the first position and the second position, and to rotationally decouple the link actuator from the handle frame when the handle frame rotates for folding the wheeled carrying apparatus.

According to an embodiment, the standing frame includes a first coupling part, the handle frame includes a second coupling part pivotally connected with the first coupling part, and the rotational coupling mechanism includes a guide slot provided on the first coupling part and a catching part carried with the link actuator, the catching part having a protrusion received in the guide slot, the guide slot having a first slot portion and a second slot portion tilted at an angle relative to the first slot portion, and the catching part being movable relative to the link actuator between a first state and a second state, the catching part being engaged with the second coupling part and the protrusion being received in the first slot portion in the first state for rotationally coupling the link actuator to the handle frame, and the catching part being disengaged from the second coupling part and the protrusion being received in the second slot portion in the second state for rotationally decoupling the link actuator from the handle frame.

According to an embodiment, the protrusion of the catching part is adapted to slide along the first slot portion when the handle frame rotates between the first and second position.

According to an embodiment, the rotational coupling mechanism further includes a spring respectively connected with the catching part and the link actuator, the spring biasing the catching part toward the first state.

According to an embodiment, the actuating assembly further includes a spring connected with the link actuator, a rotation of the handle frame from the second position to the first position causing the handle frame to contact and urge the link actuator to move in the first direction, and a rotation of the handle frame from the first position to the second position causing the handle frame to move away from the link actuator so that the link actuator moves in the second direction under a biasing force of the spring.

According to an embodiment, the first linking part and the second linking part are formed by a single cable.

According to an embodiment, the actuating assembly includes: a link actuator disposed adjacent to the handle frame; and a linking part having an intermediate portion that loops at the first wheel mount latch, and a first and a second end respectively anchored to the link actuator and the second wheel mount latch; wherein the link actuator is rotatable along with the handle frame in a first direction to actuate the second end of the linking part, and particular push or pull the second end of the linking part, and to urge the second wheel mount latch to disengage from the second wheel mount and concurrently relax the intermediate portion of the linking part for engagement of the first wheel mount latch with the first wheel mount, and the link actuator is rotatable along with the handle frame in a second direction opposite to the first direction to actuate the intermediate portion of the linking part, in particular push or pull the intermediate portion of the linking part, and to urge the first wheel mount latch to disengage from the first wheel mount and concurrently relax the second end of the linking part for engagement of the second wheel mount latch with the second wheel mount.

According to an embodiment, the locking assembly includes a first locking spring connected with the first wheel mount latch, and the second locking assembly includes a second locking spring connected with the second wheel mount latch, the first locking spring applying a biasing force for engaging the first wheel mount latch with the first wheel mount that is greater than a biasing force applied by the second locking spring for engaging the second wheel mount latch with the second wheel mount.

According to an embodiment, the operating part is connected with the link actuator via a cable, the operating part being operable to cause the link actuator to rotate in a same one of the first and second direction for unlocking the first and second wheel mounts while the handle frame is in any of the first and second position.

According to an embodiment, the operating part is connected with the link actuator or a driving element that is coupled to the link actuator via a cable, so that the operating part is able to be operated to cause the link actuator to rotate.

According to an embodiment, the actuating assembly includes: a link actuator disposed adjacent to the handle frame; and a linking part having an intermediate portion that loops at the link actuator, and a first and a second end respectively anchored to the first wheel mount latch and the second wheel mount latch; wherein the link actuator is rotatable along with the handle frame in a first direction to actuate the second end of the linking part, and particular push or pull the second end of the linking part, and to urge the second wheel mount latch to disengage from the second wheel mount and concurrently relax the intermediate portion of the linking part for engagement of the first wheel mount latch with the first wheel mount, and the link actuator is rotatable along with the handle frame in a second direction opposite to the first direction to actuate the intermediate portion of the linking part, in particular push or pull the intermediate portion of the linking part, and to urge the first wheel mount latch to disengage from the first wheel mount and concurrently relax the second end of the linking part for engagement of the second wheel mount latch with the second wheel mount.

According to an embodiment, the actuating assembly further includes a cable assembly that operatively couples the operating part to the first and second wheel mount latches and is operatively decoupled from the link actuator, the operating part being operable to actuate the cable assembly, in particular to push or pull the cable assembly, so that the first and second wheel mount latches are respectively disengaged from the first and second wheel mounts.

According to an embodiment, the cable assembly includes a sliding part, a first and a second cable portion connected with the sliding part, and a third cable connected with the sliding part and the operating part, the first cable portion further being connected with the first wheel mount latch or a first portion of the linking part, the second cable portion further being connected with the second wheel mount latch or a second portion of the linking part, the first and second portions of the linking part being folded relative to each other.

According to an embodiment, the actuating assembly includes: a first and a second link actuator movably connected with the standing frame; a first linking part coupling the first wheel mount latch to the first link actuator, and a second linking part coupling the second wheel mount latch to the second link actuator; and a coupling part fixedly connected with the handle frame and having an urging portion; wherein a rotation of the handle frame from the second position to the first position causes the urging portion to move away from the first link actuator and to effect movement of the second link actuator, in particular to push or pull the second link actuator in movement, so that the second link actuator actuates the second wheel mount latch to disengage from the second wheel mount, in particular pushes or pulls the second wheel mount latch to disengage from the second wheel mount, and a rotation of the handle frame from the first position to the second position causes the urging portion to move away from the second link actuator and to effect movement of the second link actuator, in particular to push or pull the first link actuator in movement, so that the first link actuator actuates the the first wheel mount latch, and particular pushes or pulls the first wheel mount latch, to disengage from the first wheel mount.

According to an embodiment, the release mechanism further includes a first and a second urging part carried with the handle frame, and a release actuator coupled to the operating part and connected with the first and second urging parts, the first urging part being adjacent to the first link actuator and the second urging part being displaced away from the second link actuator when the handle frame is in the first position, and the second urging part being adjacent to the second link actuator and the first urging part being displaced away from the first link actuator when the handle frame is in the second position, the operating part being operable to cause the first urging part to effect movement of the first link actuator, in particular to push or pull the first link actuator in movement, so that the first link actuator actuates the first wheel mount latch, in particular pushes or pulls the first wheel mount latch to disengage from the first wheel mount while the handle frame is in the first position, and the operating part being operable to cause the second urging part to effect movement of the second link actuator, in particular to push or pull the second link actuator in movement, so that the second link actuator actuates the second wheel mount latch, in particular pushes or pulls the second wheel mount latch, to disengage from the second wheel mount while the handle frame is in the second position.

According to an embodiment, the wheeled carrying apparatus is implemented as a child stroller apparatus.

DETAILED DESCRIPTION OF THE EMBODIMENTS

Figure 1:
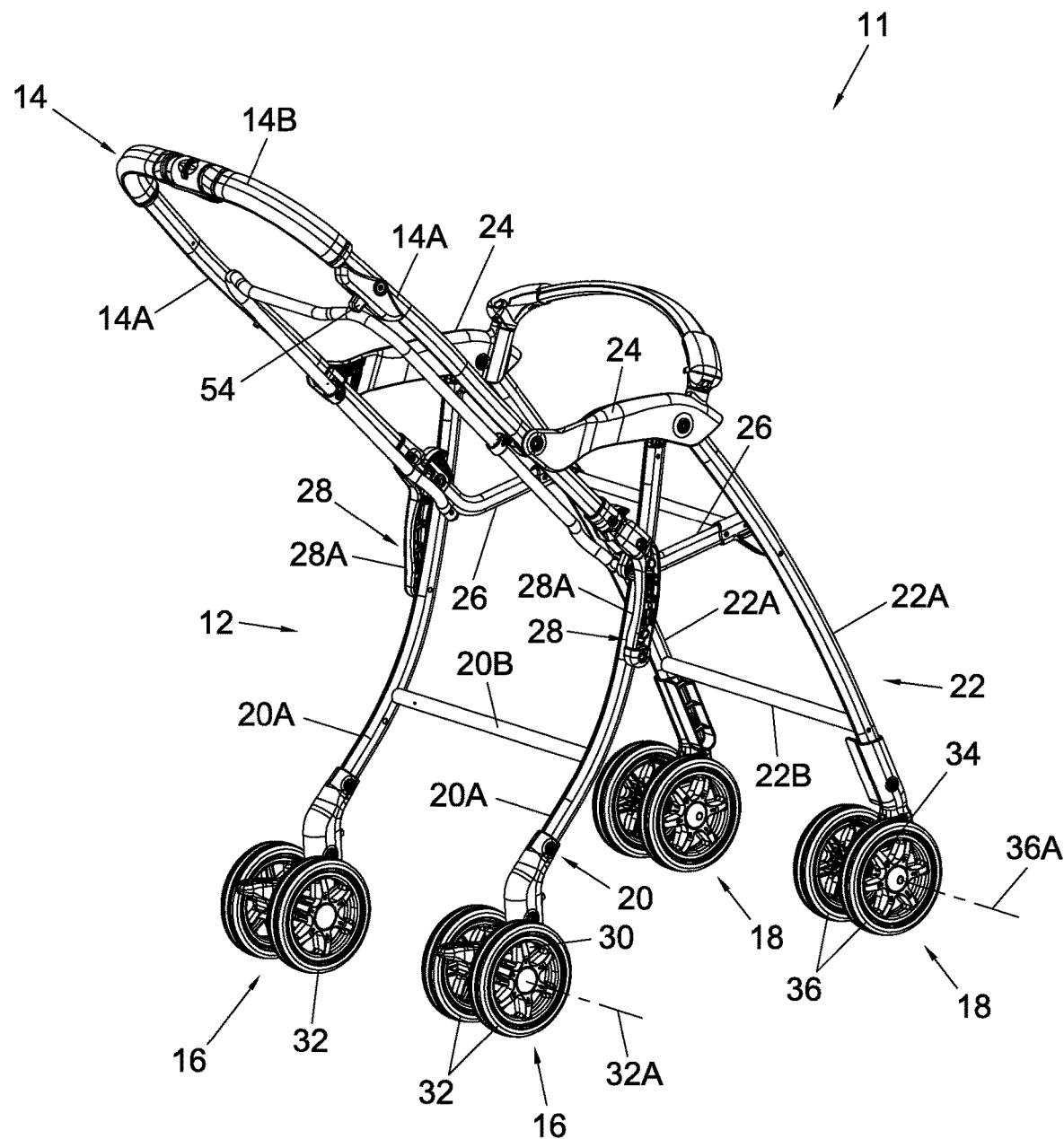
FIG. 1 is a perspective view illustrating an embodiment of a wheeled carrying apparatus.
Figure 2:
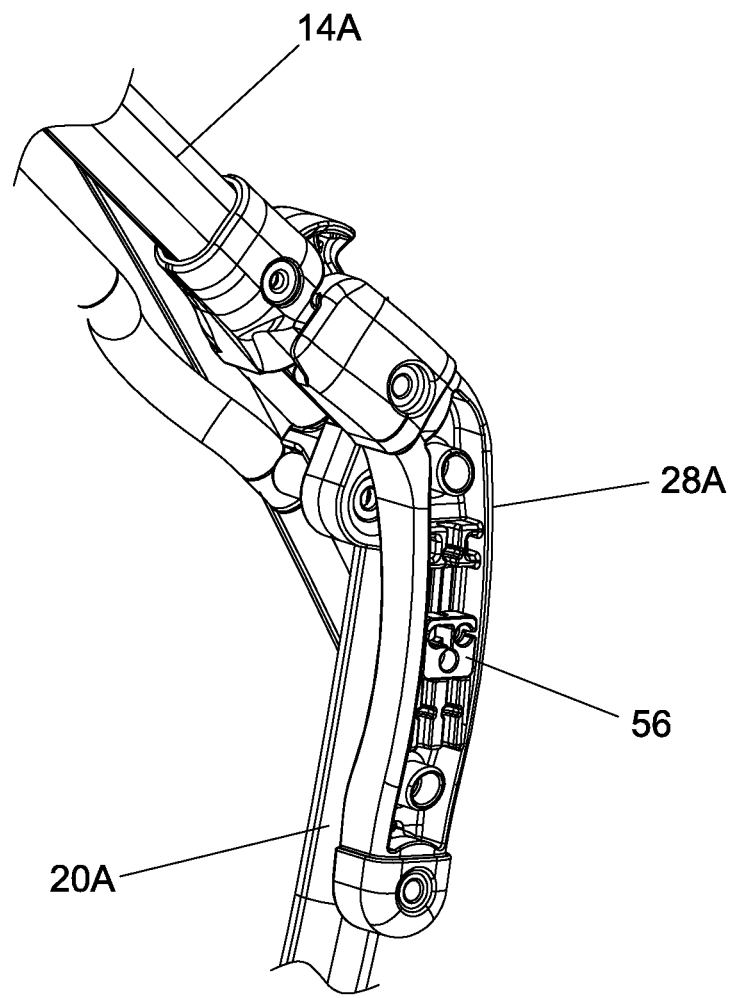
FIG. 2 is an enlarged view illustrating a bar linkage assembled with a link actuator in the wheeled carrying apparatus shown in FIG. 1.

The present application provides a wheeled carrying apparatus that includes a standing frame, and a plurality of wheel assemblies provided at a bottom of the standing frame. The wheel assemblies can be controllably locked and unlocked in horizontal orientation with respect to a standing frame, wherein an unlocked wheel assembly can rotate relative to the standing frame for changing the horizontal orientation of a wheel axis. According to the needs, some of the wheel assemblies are locked while others are unlocked, or all of the wheel assemblies can be unlocked at the same time as desired. Accordingly, the wheeled carrying apparatuses can be more flexible in use and have better maneuverability. Embodiments of the wheeled carrying apparatus described herein include child stroller apparatuses. However, it will be appreciated that wheeled carrying apparatuses that may incorporate the structures and features described herein can include, without limitation, child stroller apparatuses, trolleys, shopping carts, and the like. Accordingly, it is understood that the structures and features described herein may be generally applicable to any types of products having wheels, and the wheeled carrying apparatuses as described and claimed herein are not limited to the examples illustrated hereinafter.

FIGS. 1-5 are various schematic views illustrating an embodiment of a wheeled carrying apparatus 10, which is exemplarily a child stroller apparatus. Referring to FIGS. 1-5, the wheeled carrying apparatus 10 can include a frame structure 11 comprised of a standing frame 12 and a handle frame 14 coupled to each other, and a plurality of wheel assemblies 16 and 18 provided at a bottom of the standing frame 12.

According to an example of construction, the standing frame 12 can include two leg frames 20 and 22, two side linking bars 24, and two side support bars 26. The leg frame 20 can be exemplarily a rear leg frame, and the leg frame 22 can be exemplarily a front leg frame. Each of the leg frames 20 and 22 can respectively include two side segments disposed symmetrically at a left and a right side of the standing frame 12, e.g., two side segments 20A for the leg frame 20 and two side segments 22A for the leg frame 22, and a transversal segment fixedly connected with the two side segments, e.g., a transversal segment 20B fixedly connected with the two side segments 20A for the leg frame 20, and a transversal segment 22B fixedly connected with the two side segments 22A for the leg frame 22. At each of the left and right sides, the side segment 20A of the leg frame 20 and the side segment 22A of the leg frame 22 can be respectively coupled pivotally to one side linking bar 24, and one side support bar 26 can extend between side segments 20A and 22A and can be pivotally coupled to the side segment 22A, whereby the leg frames 20 and 22, the side linking bars 24 and the side support bars 26 can rotate relative to one another during folding and unfolding of the wheeled carrying apparatus 10.

The handle frame 14 can be pivotally coupled to the standing frame 12 via two bar linkages 28, wherein each bar linkage 28 can include a bar 28A having two ends respectively connected pivotally with the standing frame 12 and the handle frame 14. More specifically, the handle frame 14 can include two side portions 14A disposed symmetrically at the left and right sides, and a grip portion 14B connected with the two side portions 14A. At each of the left and right sides, the side portion 14A of the handle frame 14 can be pivotally connected with the side linking bar 24, can be pivotally connected with the side support bar 26, and can be pivotally coupled to the side segment 20A of the leg frame 20 via one bar 28A, wherein the bar 28A can have two ends respectively connected pivotally with the side portion 14A of the handle frame 14 and the side segment 20A of the leg frame 20.

Referring to FIGS. 1-5, each of the wheel assemblies 16 and 18 can include a wheel mount that is pivotally connected with the standing frame 12 and carries at least a wheel rotatable relative to the wheel mount about a wheel axis extending generally horizontally, whereby the wheel mount is rotatable relative to the standing frame 12 for changing an orientation of the wheel axis. For example, two wheel assemblies 16 can be provided at the lower ends of the side segments 20A of the leg frame 20, and two wheel assemblies 18 can be respectively provided at the lower ends of the two side segments 22A of the leg frame 22. Each wheel assembly 16 can include a wheel mount 30 that is pivotally connected with the leg frame 20 and carries at least a wheel 32 rotatable relative to the wheel mount 30 about a wheel axis 32A extending generally horizontally, whereby the wheel mount 30 is rotatable for changing a horizontal orientation of the wheel axis 32A. Likewise, each wheel assembly 18 can include a wheel mount 34 that is pivotally connected with the leg frame 22 and carries at least a wheel 36 rotatable relative to the wheel mount 34 about a wheel axis 36A extending generally horizontally, whereby the wheel mount 34 is rotatable for changing a horizontal orientation of the wheel axis 36A. The wheel mounts 30 are spaced apart from the wheel mounts 34 along a lengthwise axis of the wheeled carrying apparatus 10 extending from a rear to a front thereof.

Figure 3:
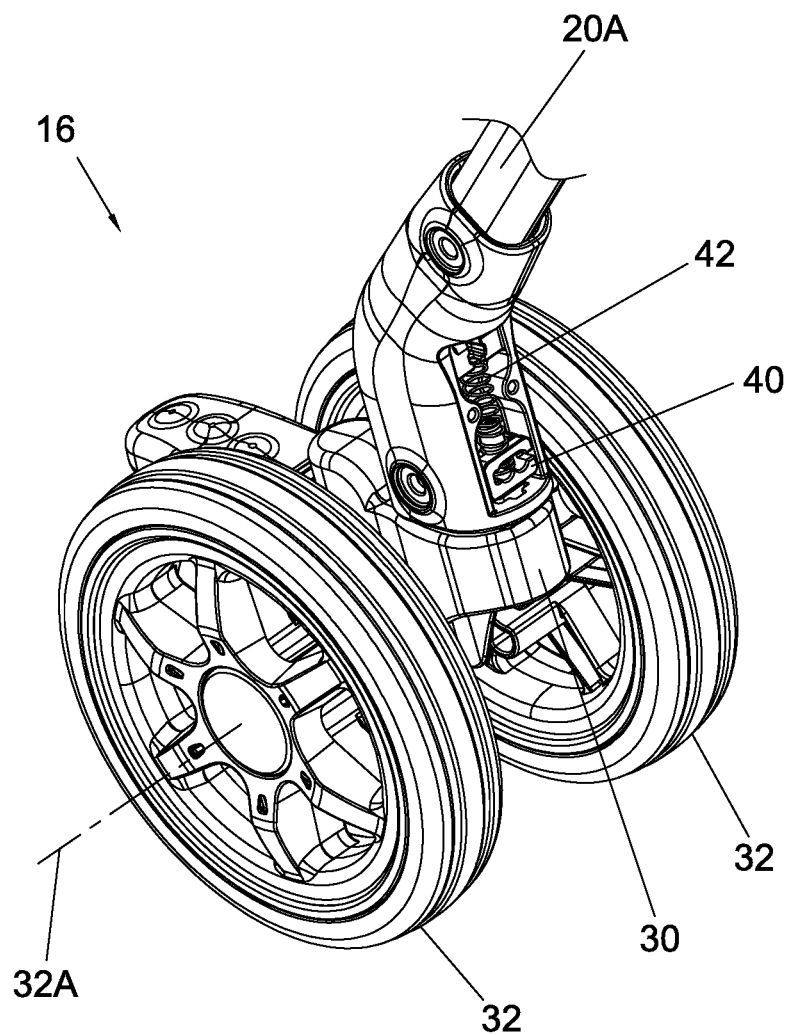
FIG. 3 is an enlarged view illustrating a wheel assembly of the wheeled carrying apparatus shown in FIG. 1.
Figure 5:
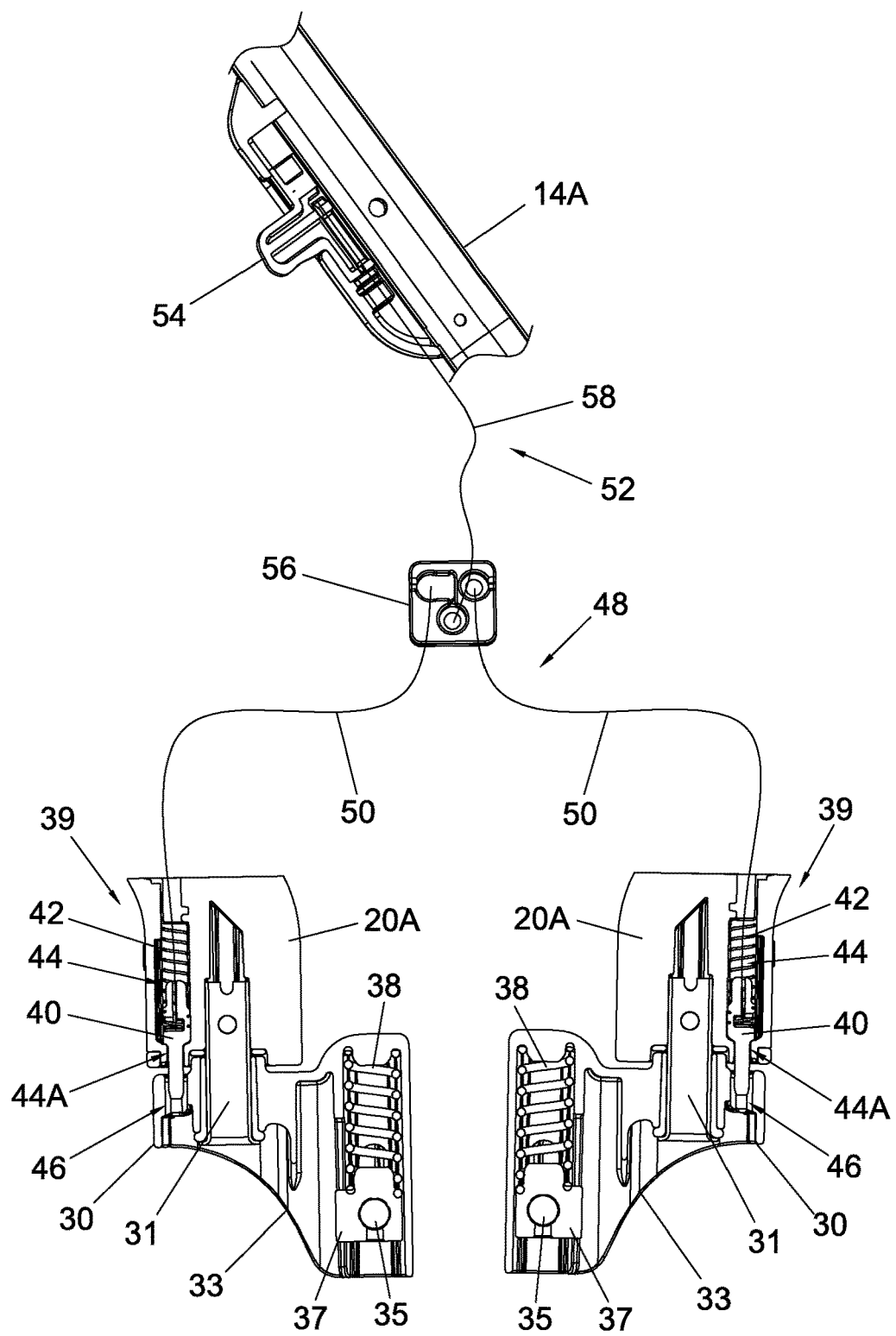
FIG. 5 is a schematic view illustrating an actuating assembly and a release mechanism incorporated in the wheeled carrying apparatus shown in FIG. 1.

Referring to FIGS. 3 and 5, the two wheel assemblies 16 can have a same construction. In each wheel assembly 16, the wheel mount 30 can be pivotally connected with the leg frame 20 about a pivot axle 31 so that the wheel mount 30 and the wheel 32 carried therewith can rotate in unison about the pivot axle 31. According to an example of construction, the wheel mount 30 can include a housing 33 that is pivotally connected with the leg frame 20 via the pivot axle 31. A wheel axle 35 defining the wheel axis 32A can be disposed through the housing 33 for pivotally connecting the wheel 32 with the wheel mount 30. According to an example of construction, the wheel axle 35 can be disposed through a sliding part 37 assembled inside the housing 33 for vertical sliding movement, and a spring 38 can be respectively connected with the sliding part 37 and the housing 33. The spring 38 can cushion a vertical displacement of the wheel 32 relative to the wheel mount 30 for dissipating undesirable shock energy during use.

Referring to FIGS. 3 and 5, a locking assembly 39 is provided to rotationally lock and unlock the wheel mount 30 with respect to the standing frame 12. The locking assembly 39 can include a wheel mount latch 40 movably connected with the standing frame 12, and a locking spring 42 connected with the wheel mount latch 40. According to an example of construction, the wheel mount latch 40 can be slidably connected with the side segment 20A of the leg frame 20. More specifically, the side segment 20A can have a cavity 44, and the wheel mount latch 40 can have an elongate shape slidably received in the cavity 44, whereby the wheel mount latch 40 can slide to protrude outside the cavity 44 or retract inward. The cavity 44 may have an opening 44A that is narrower in size than an interior of the cavity 44, and the wheel mount latch 40 can have an inner portion larger than an outer portion thereof traveling through the opening 44A of the cavity 44, whereby the wheel mount latch 40 can be prevented from falling out of the cavity 44.

The locking spring 42 can be disposed inside the cavity 44, and can have two ends respectively connected with the side segment 20A and the wheel mount latch 40. The locking spring 42 can bias the wheel mount latch 40 to protrude outside the cavity 44 for engagement with the wheel mount 30.

In the locking assembly 39, the wheel mount latch 40 can slide downward to engage with an opening 46 provided in the housing 33 of the wheel mount 30 and thereby rotationally lock the wheel mount 30 with respect to the standing frame 12, and slide upward to disengage from the opening 46 of the wheel mount 30 to unlock the wheel mount 30 so that the wheel mount 30 can rotate relative to the standing frame 12. The locking spring 42 can apply a biasing force for urging the wheel mount latch 40 to engage with the wheel mount 30. The same locking assembly 39 described above may be provided for each of the two wheel assemblies 16.

Referring to FIGS. 1-5, the wheeled carrying apparatus 10 can further include an actuating assembly 48 that is coupled to the wheel mount latch 40 and includes one or more linking parts 50, and a release mechanism 52 including an operating part 54 that is provided on the frame structure 11 at a location distant from the wheel mount latch 40. According to an example of construction, the actuating assembly 48 can include a link actuator 56 movably connected with the frame structure 11, and two linking parts 50 respectively coupling the wheel mount latches 40 of the two wheel assemblies 16 to the link actuator 56.

The link actuator 56 may be movably connected with any suitable portions of the frame structure 11, e.g., the standing frame 12, the handle frame 14, or the bar linkage 28 that couples the handle frame 14 to the standing frame 12. According to an example of construction, the link actuator 56 can be movably connected with the bar linkage 28. For example, the link actuator 56 can be slidably connected with the bar 28A of the bar linkage 28, and can slide relative to the bar 28A as a unitary part.

The two linking parts 50 can include cable portions, and can be routed along at least a portion of the frame structure 11. For example, the two linking parts 50 can include two cable portions provided as two different cables, each of which has an end anchored to the corresponding wheel mount latch 40 and another end anchored to the link actuator 56. According to another example of construction, the two linking parts 50 can include two cable portions provided as one single cable that has two ends respectively anchored to the two wheel mount latches 40 and an intermediate portion connected with the link actuator 56. In this manner, the link actuator 56 is movable in a first direction to pull each linking part 50 and urge the corresponding wheel mount latch 40 to disengage from the wheel mount 30, and in a second direction opposite to the first direction to relax each linking part 50 so that the corresponding wheel mount latch 40 can engage with the wheel mount 30 under the biasing force of the locking spring 42.

Figure 4:
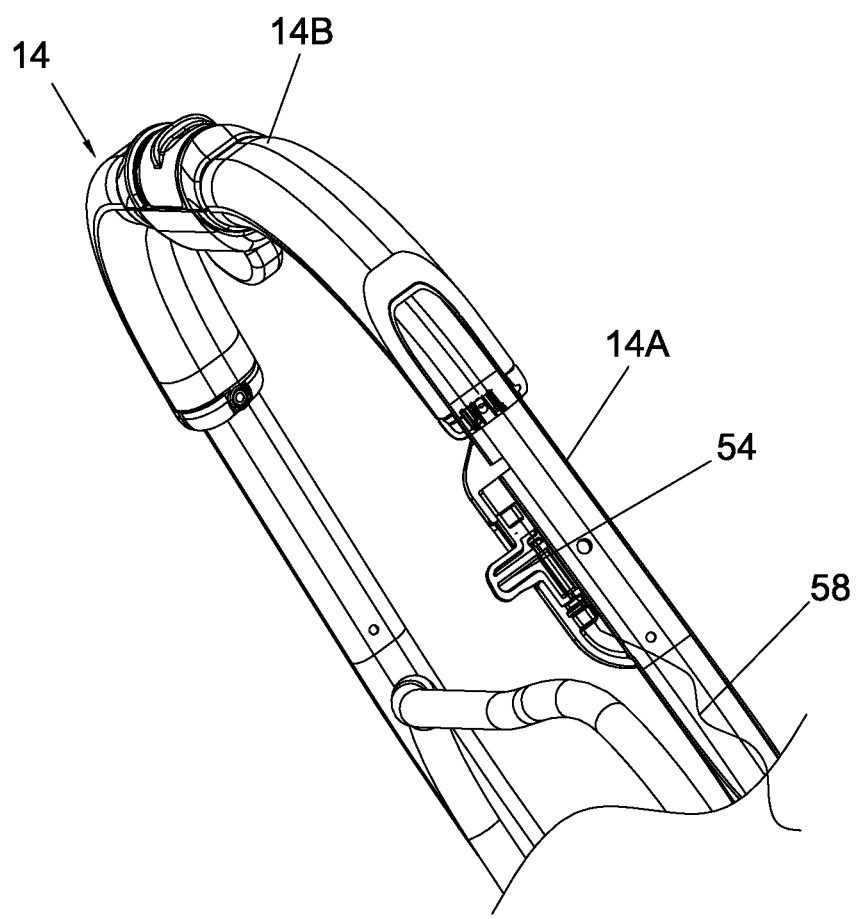
FIG. 4 is a partial cross-sectional view illustrating an operating part provided in the wheeled carrying apparatus shown in FIG. 1.

Referring to FIGS. 1, 4 and 5, the release mechanism 52 is operable to cause the actuating assembly 48 to pull each wheel mount latch 40 so that the wheel mount latch 40 disengages from the wheel mount 30. According to an example of construction, the release mechanism 52 can include an operating part 54 that is placed on the handle frame 14 and is coupled to the actuating assembly 48. The operating part 54 may be placed on one side portion 14A as shown in FIGS. 1 and 4, or on the grip portion 14B of the handle frame 14 (not shown). The operating part 54 is movably connected with the handle frame 14, and can move as a unitary part relative to the handle frame 14. For example, the operating part 54 can be slidably connected with the handle frame 14, and can slide along a lengthwise axis of the side portion 14A of the handle frame 14. According to an example of construction, the release mechanism 52 can include a linking part 58 that couples the operating part 54 to the actuating assembly 48. For example, the linking part 58 can include a cable coupling the operating part 54 to the link actuator 56 of the actuating assembly 48, wherein the cable can exemplarily have two ends respectively anchored to the operating part 54 and the link actuator 56. With this construction, a caregiver can slide the operating part 54 to urge the link actuator 56 in movement, which can consequently pull each wheel mount latch 40 so that the wheel mount latch 40 disengages from the wheel mount 30, thereby allowing rotation of the wheel mounts 30 relative to the standing frame 12.

Figure 6:
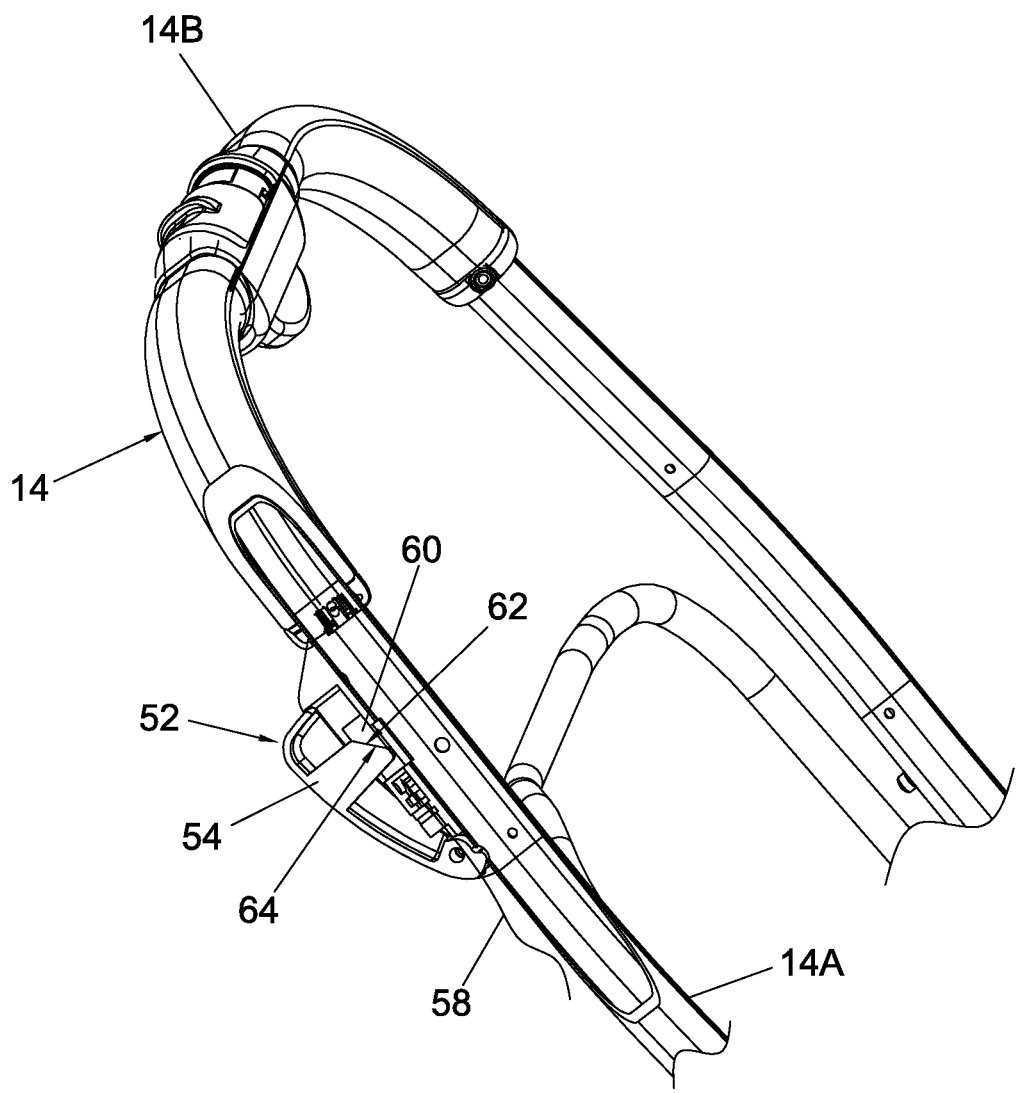
FIGS. 6 and 7 are two partial cross-sectional views illustrating a variant construction of a release mechanism that may be incorporated in the wheeled carrying apparatus shown in FIG. 1.
Figure 7:
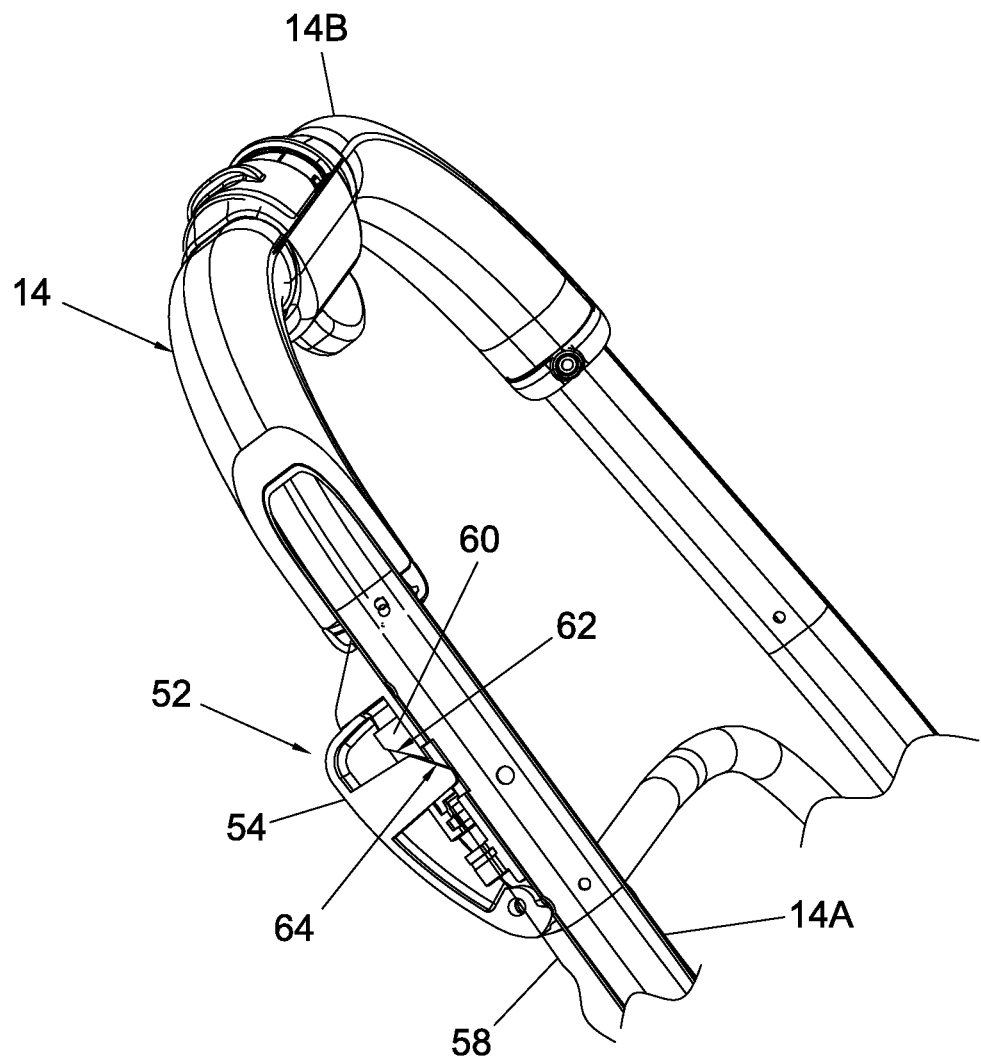

In conjunction with FIGS. 1-5, FIGS. 6 and 7 are two partial cross-sectional views illustrating a variant construction of the release mechanism 52. Referring to FIGS. 6 and 7, the linking part 58 of the release mechanism 52 can be connected with a link actuator 60 that is slidably connected with the handle frame 14, wherein the linking part 58 can include a cable coupled to the link actuator 56 of the actuating assembly 48 like previously described. The link actuator 60 can be disposed adjacent to the operating part 54, and can slide along a lengthwise axis of the side portion 14A of the handle frame 14. The operating part 54 can be slidably or pivotally connected with the handle frame 14, and can be in sliding contact with the link actuator 60 during operation. For example, the link actuator 60 can have a ramp surface 62, and the operating part 54 can have a protrusion 64 in sliding contact with the ramp surface 62. As shown in FIG. 7, a caregiver can press on the operating part 54 to cause the link actuator 60 to slide upward owing to the sliding contact between the ramp surface 62 and the protrusion 64 and thereby urge the link actuator 56 in movement, which can consequently pull each wheel mount latch 40 so that the wheel mount latch 40 disengages from the wheel mount 30, whereby rotation of the unlocked wheel mounts 30 relative to the standing frame 12 is allowed.

Figure 8:
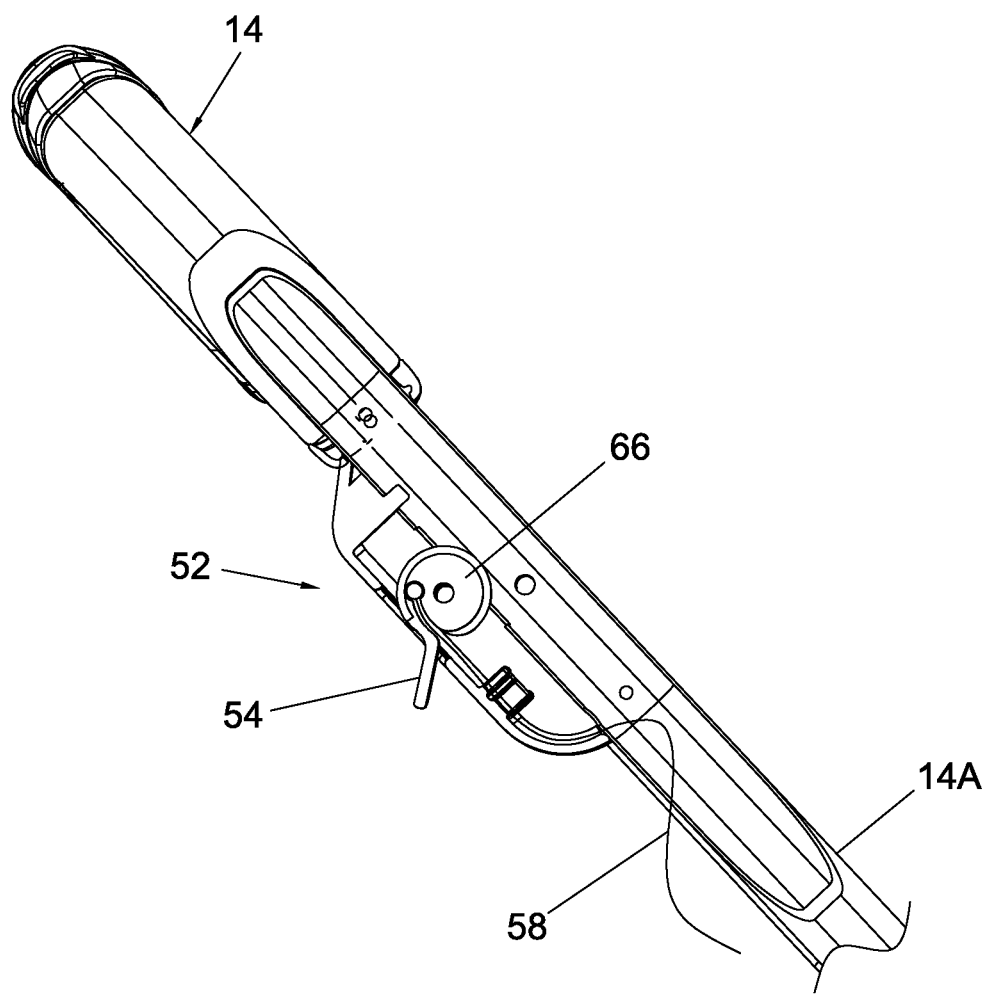
FIGS. 8 and 9 are two partial cross-sectional views illustrating another variant construction of a release mechanism that may be incorporated in the wheeled carrying apparatus shown in FIG. 1.
Figure 9:
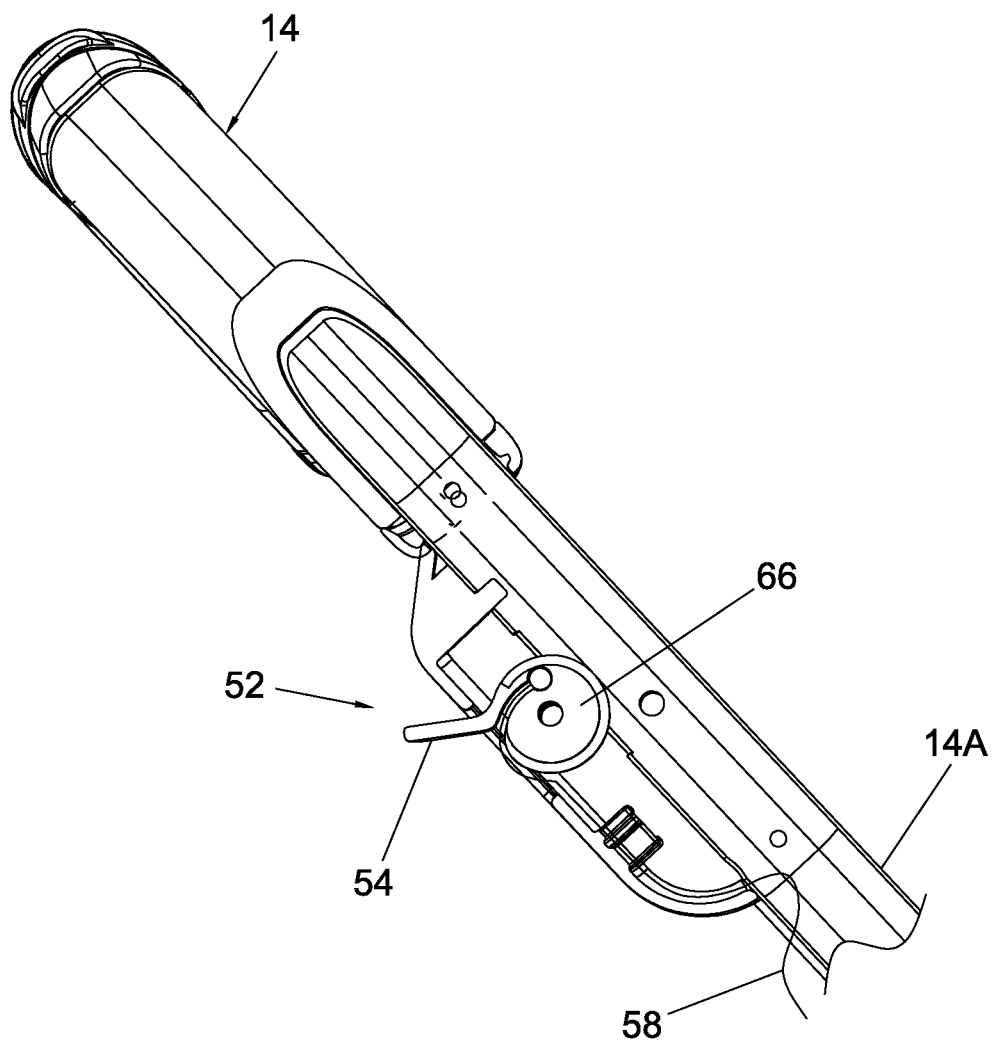

In conjunction with FIGS. 1-5, FIGS. 8 and 9 are two partial cross-sectional views illustrating another variant construction of the release mechanism 52. Referring to FIGS. 8 and 9, the operating part 54 of the release mechanism 52 can include a barrel 66 pivotally connected with the handle frame 14. According to an example of construction, the operating part 54 including the barrel 66 may be provided as a unitary part so that the operating part 54 and the barrel 66 can rotate in unison relative to the handle frame 14. Like previously described, the operating part 54 can be coupled to the actuating assembly 48 via the linking part 58. The linking part 58 can include a cable coupling the operating part 54 to the link actuator 56 of the actuating assembly 48, wherein the cable can exemplarily have two ends respectively anchored to the barrel 66 of the operating part 54 and the link actuator 56. As shown in FIG. 9, a caregiver can operate the operating part 54 so that the barrel 66 rotates relative to the handle frame 14 to wind at least partially the linking part 58 and urge the link actuator 56 in movement, which can consequently pull each wheel mount latch 40 so that the wheel mount latch 40 disengages from the wheel mount 30, thereby allowing rotation of the wheel mounts 30 relative to the standing frame 12.

Exemplary operation of the wheeled carrying apparatus 10 is described hereinafter with reference to FIGS. 1-9. When the wheeled carrying apparatus 10 needs free rotation of the wheel mounts 30 relative to the standing frame 12, a caregiver can actuate the operating part 54 so as to disengage each wheel mount latch 40 from the corresponding wheel mount 30, whereby the wheel mounts 30 are unlocked and can rotate freely relative to the standing frame 12 for modifying the horizontal orientation of the wheel axes 32A. The wheel mounts 30 can be kept unlocked as long as the operating part 54 is not released. By having all of the wheel mounts 30 and 34 rotatable relative to the standing frame 12, the wheeled carrying apparatus 100 can be maneuvered with increased flexibility.

When a regular mode of use is needed, each wheel mount 30 can be rotated to a regular position where the wheel axis 32A is oriented transversally and is generally orthogonal to a lengthwise axis of the wheeled carrying apparatus 10 extending from a rear to a front thereof. The operating part 54 then can be released, and the wheel mount latch 40 can engage with the wheel mount 30 under the biasing force of the locking spring 42. The wheel mounts 30 can be thereby locked to the standing frame 12. As each wheel mount latch 40 moves to the locking state, the operating part 54 can move to an initial position owing to a drive transmission through the linking parts 50 and 58.

FIGS. 10-16 are various schematic views illustrating an embodiment of the wheeled carrying apparatus 10 including an actuating assembly 68 and a release mechanism 70 that can respectively substitute for the actuating assembly 48 and the release mechanism 52 described previously. Referring to FIGS. 10-15, the actuating assembly 68 can include the two linking parts 50 that are respectively connected with the two wheel mount latches 40 like described previously, and two link actuators 72 movably connected with the frame structure 11. More specifically, the two link actuators 72 can be movably connected with the transversal segment 20B of the leg frame 20, and each linking part 50 can couple one wheel mount latch 40 to one link actuator 72. The two linking parts 50 can include cable portions, and can be respectively routed along the two side segment 20A and through the transversal segment 20B of the leg frame 20. For example, the two linking parts 50 can include two cable portions provided as two different cables, each of which having an end anchored to the wheel mount latch 40 (better shown in FIG. 15) and another end anchored to the link actuator 72 (better shown in FIG. 11).

Figure 10:
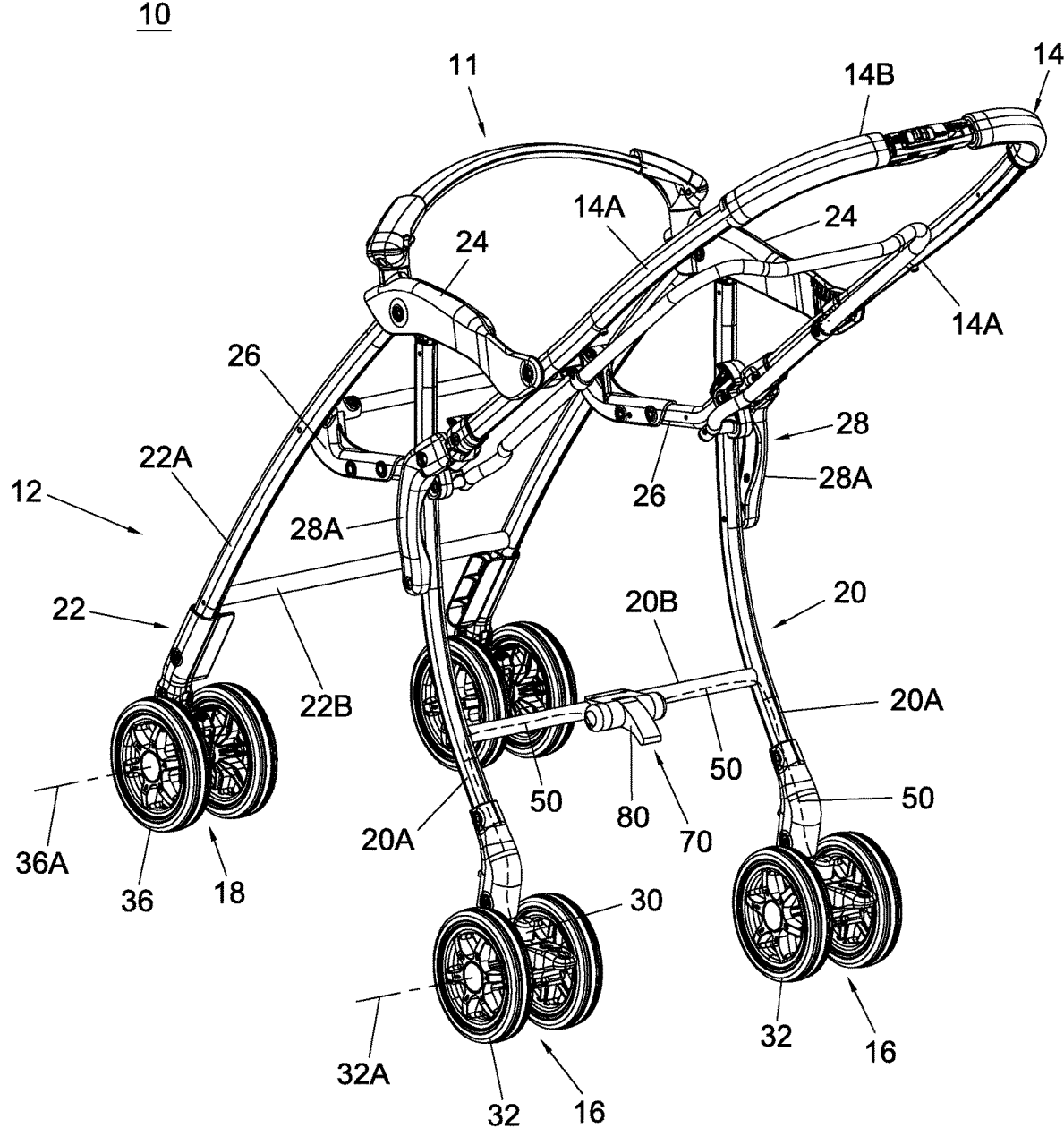
FIG. 10 is a perspective view illustrating the wheeled carrying apparatus of FIG. 1 provided with another actuating assembly and another release mechanism.
Figure 11:
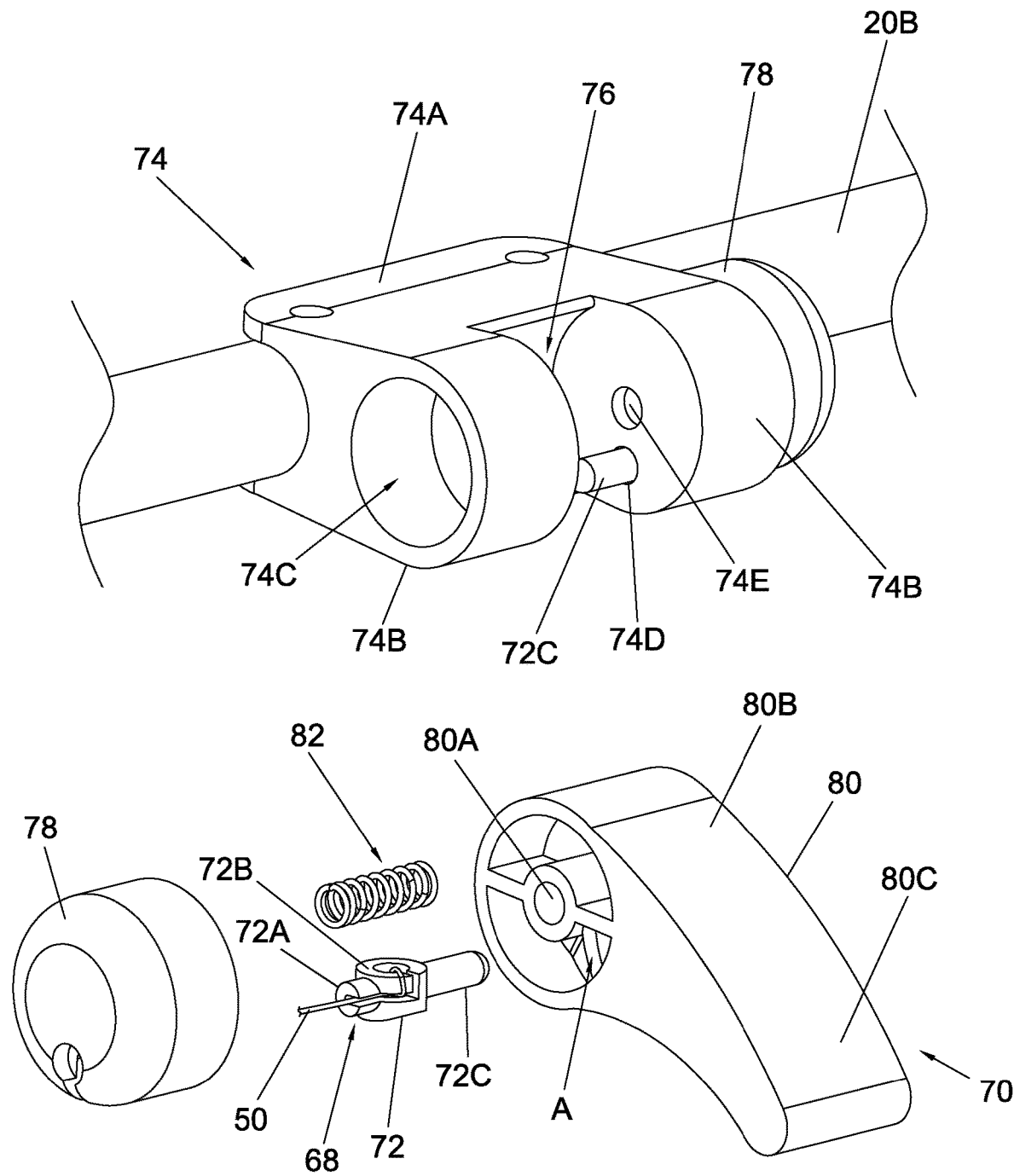
FIG. 11 is an exploded view illustrating the actuating assembly and the release mechanism provided in the wheeled carrying apparatus shown in FIG. 10.
Figure 12:
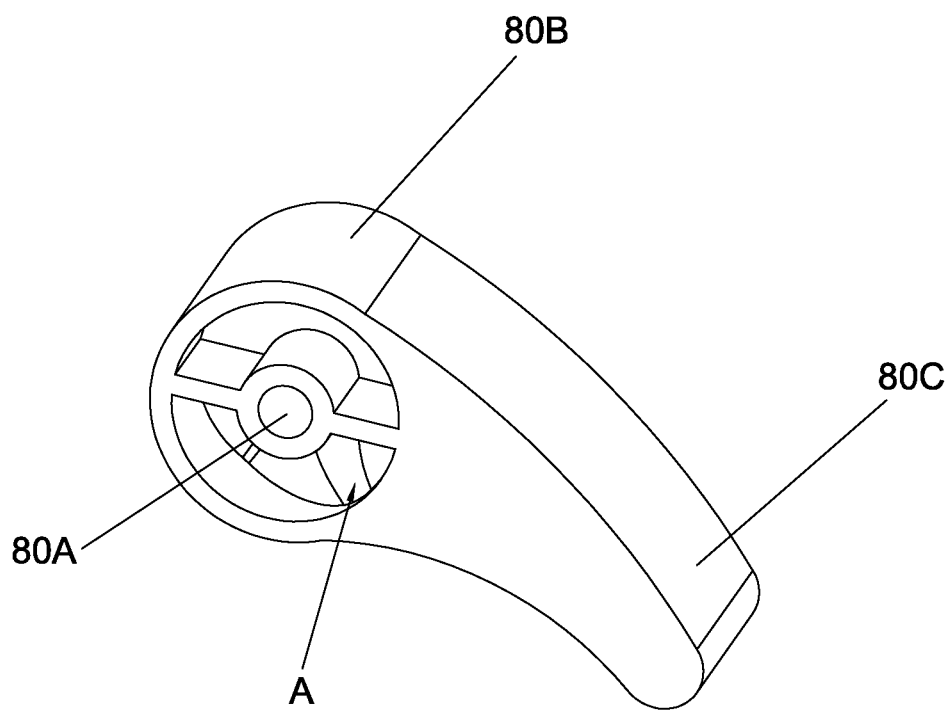
FIG. 12 is a perspective view illustrating an operating part provided in the wheeled carrying apparatus shown in FIG. 10.
Figure 13:
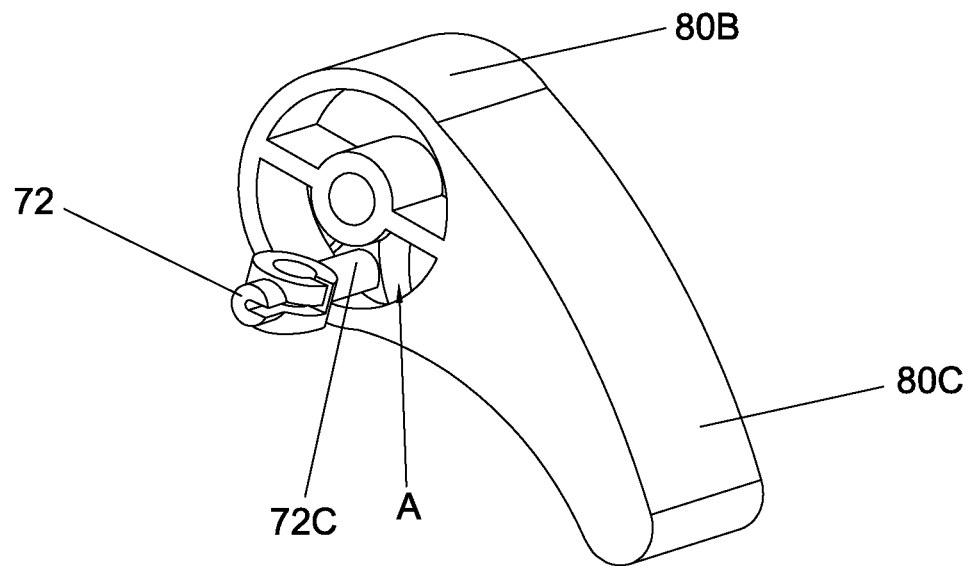
FIGS. 13 and 14 are perspective views illustrating the interaction between the operating part and a link actuator of the actuating assembly shown in FIG. 11.
Figure 14:
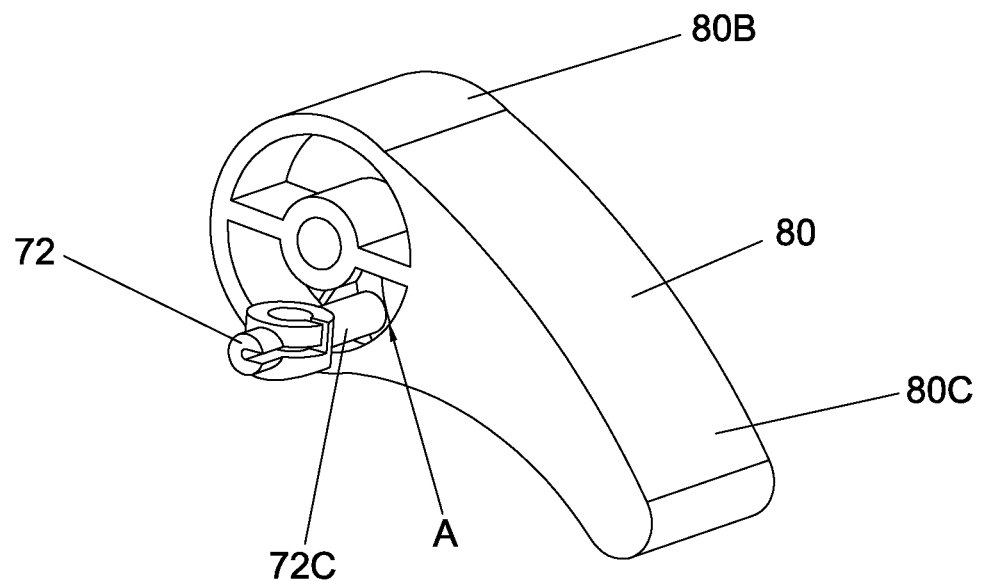

Referring to FIGS. 10 and 11, the two link actuators 72 can be slidably connected with the transversal segment 20B of the leg frame 20. For example, the transversal segment 20B of the leg frame 20 can be fixedly connected with a bracket 74, and the two link actuators 72 can be disposed for sliding transversally inside the bracket 74 relative to the transversal segment 20B. According to an example of construction, the bracket 74 can have a base portion 74A and two mount portions 74B, the base portion 74A being fixedly connected with the transversal segment 20B, and the two mount portions 74B projecting from the base portion 74A parallel to each other with a gap 76 defined between the two mount portions 74B. The bracket 74 including the base portion 74A and the mount portions 74B may be formed integrally as a single part. The two mount portions 74B can have a hollow interior 74C closed with a cover 78, and the two link actuators 72 can be respectively received in the hollow interior 74C of the two mount portions 74B and extend into the gap 76 through openings 74D provided on the mount portions 74B.

The two link actuators 72 can have a same construction, and can be respectively disposed in the two mount portions 74B in a symmetrical manner. According to an example of construction, each link actuator 72 can be formed to include a stem portion 72A, an anchoring portion 72B and a pin 72C. The stem portion 72A can be slidably supported in the mount portion 74B, the anchoring portion 72B can be fixedly connected with an end of the linking part 50 that can be routed through a hole provided in the cover 78 into the hollow interior 74C of the mount portion 74B, and the pin 72C can extend through the opening 74D into the gap 76. In this manner, the link actuator 72 is movable in a first direction toward the gap 76 to pull the linking part 50 and urge the corresponding wheel mount latch 40 to disengage from the wheel mount 30, and in a second direction opposite to the first direction to relax the linking part 50 so that the corresponding wheel mount latch 40 can engage with the wheel mount 30 under the biasing force of the locking spring 42.

Referring to FIGS. 10-14, the release mechanism 70 can include an operating part 80 that is placed on the leg frame 20. For example, the operating part 80 can be pivotally connected with the transversal segment 20B of the leg frame 20. According to an example of construction, the operating part 80 can be received at least partially in the gap 76, and can be pivotally connected with the bracket 74 about a shaft (not shown) that is disposed through a hole 80A provided in the operating part 80 and two holes 74E respectively provided in the two coupling portions 74B of the bracket 74. More specifically, the operating part 80 may have a coupling portion 80B and an actuating portion 80C, wherein the coupling portion 80B is disposed in the gap 76 adjacent to the pins 72C of the two link actuators 72, and the actuating portion 80C protrudes outside the gap 76. The hole 80A can be provided in the coupling portion 80B, and each of two opposite sides of the coupling portion 80B can have a ramp surface A eccentric from the hole 80A that is in sliding contact with the pin 72C of one link actuator 72. A spring 82 can be provided for biasing the link actuator 72 toward the gap 76 so that the link actuator 72 can be kept in sliding contact with the ramp surface A of the operating part 80. The spring 82 can be disposed in the mount portion 74B, and can exemplarily have two opposite ends with the link actuator 72 and the cover 78.

Figure 15:
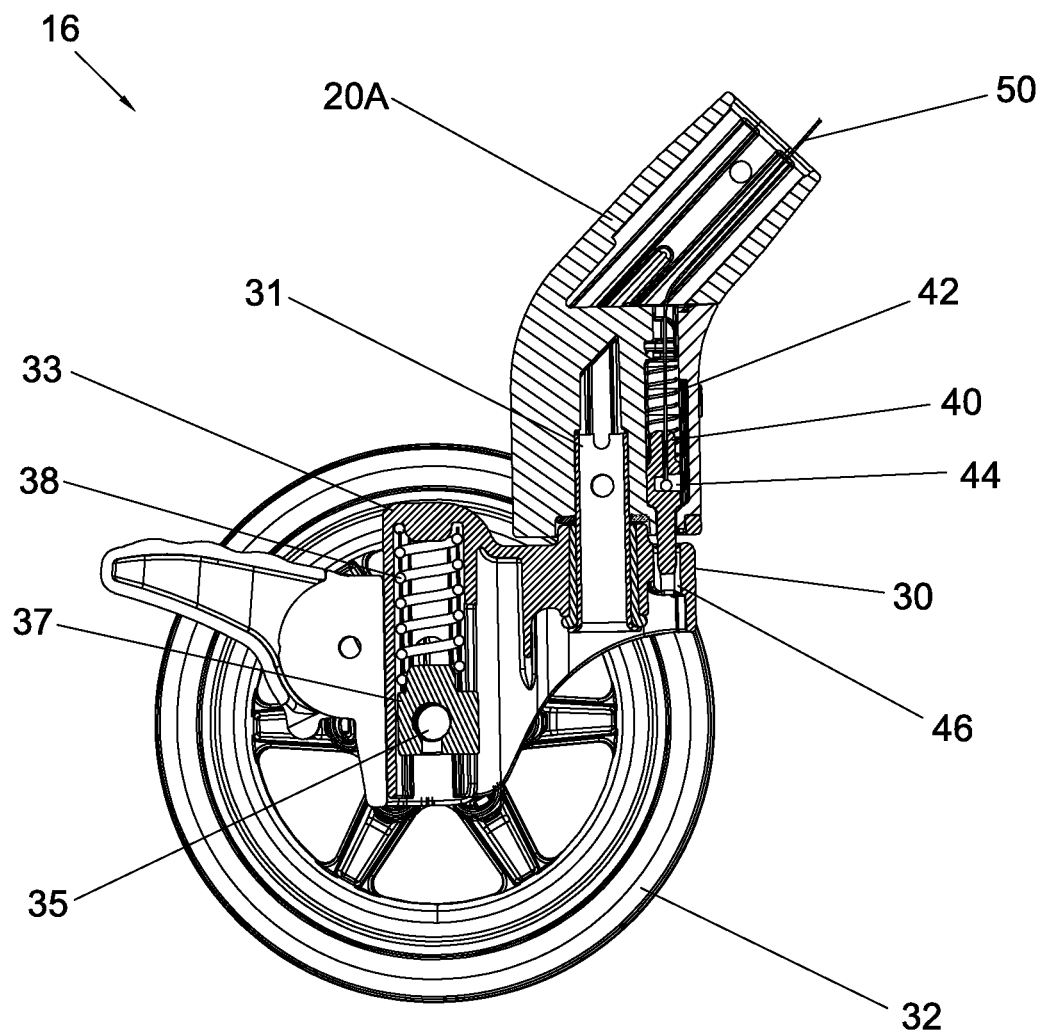
FIG. 15 is a cross-sectional view illustrating a wheel assembly of the wheeled carrying apparatus shown in FIG. 10 in a locked state with respect to the standing frame.
Figure 16:
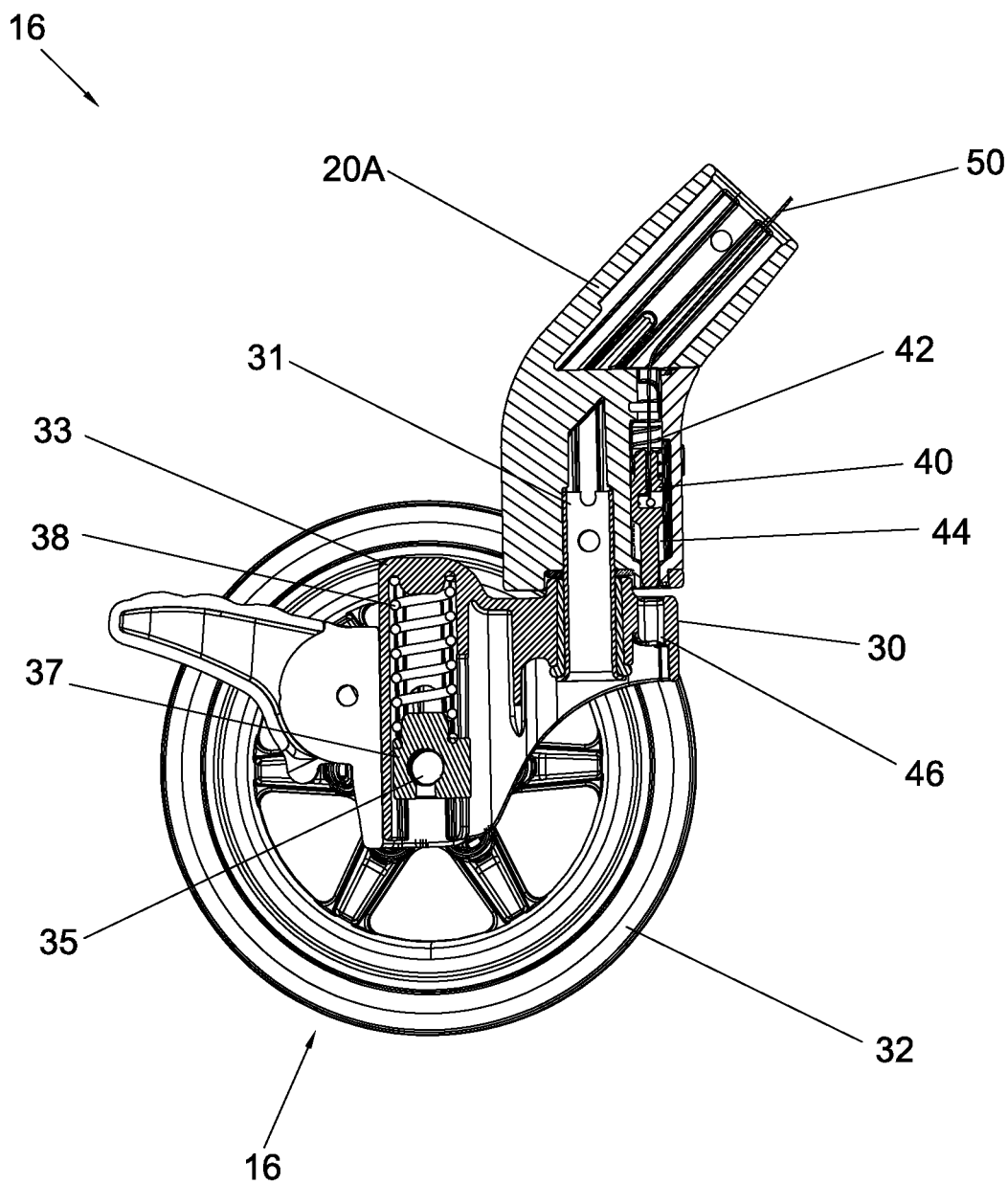
FIG. 16 is a cross-sectional view illustrating the wheel assembly of FIG. 15 in an unlocked state with respect to the standing frame.

Owing to the sliding contact between the ramp surface A and the link actuator 72, the link actuator 72 can slide either toward the gap 76 or away from the gap 76 to respectively pull or relax the linking part 50 depending on the direction of rotation of the operating part 80. Accordingly, the operating part 80 can rotate in one direction to cause the wheel mount latch 40 to engage and lock the wheel mount 30 under the biasing force of the locking spring 42, and in an opposite direction to cause the wheel mount latch 40 to disengage and unlock the wheel mount 30. FIG. 15 illustrates the wheel mount 30 in the locked state, and FIG. 16 illustrates the wheel mount 30 in the unlocked state. Since the operating part 80 is similarly coupled to each of the two link actuators 72, the operating part 80 can drive unlocking and locking of the two wheel mount latches 40 of the leg frame 20 in a concurrent manner.

Figure 17:
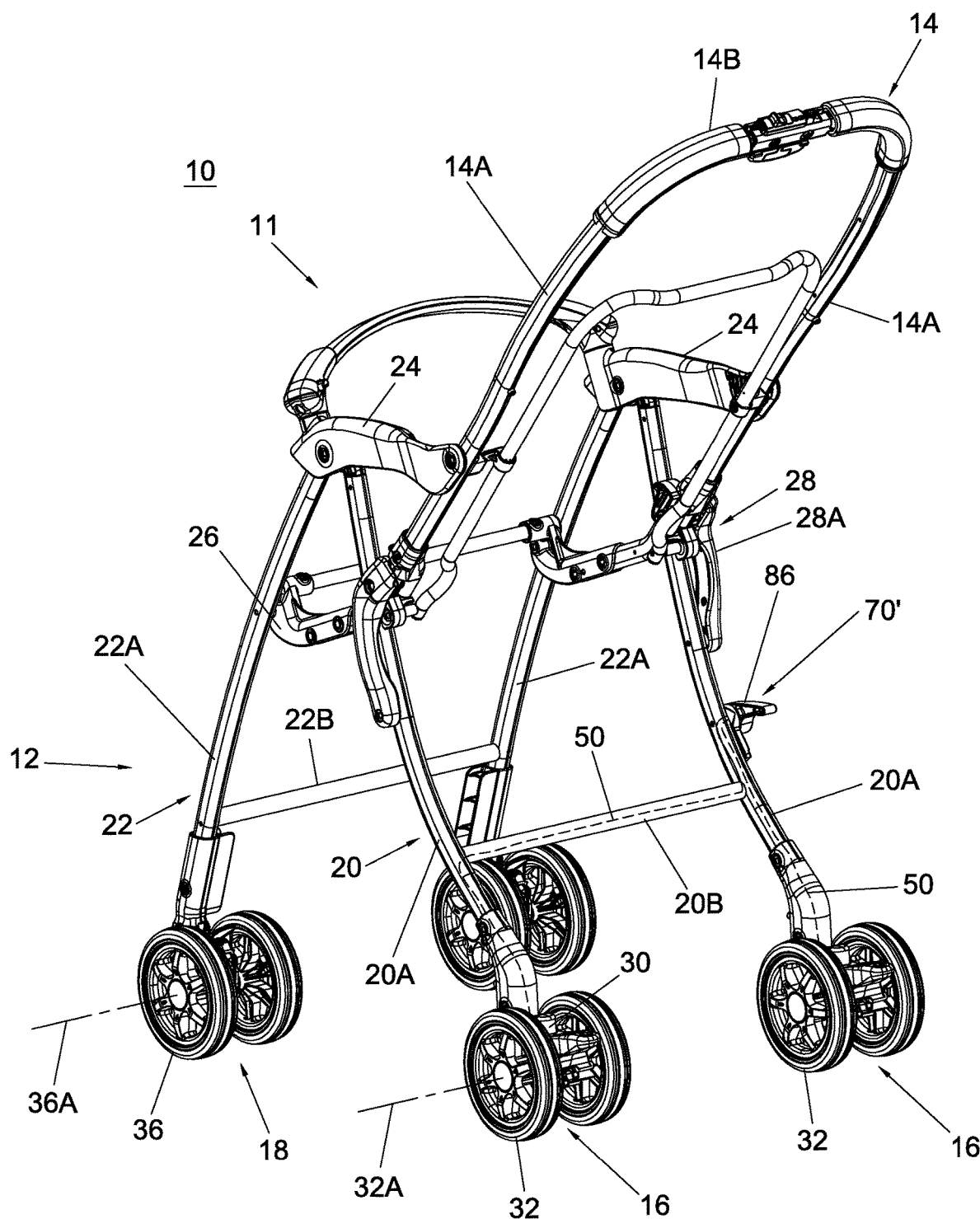
FIG. 17 is a perspective view illustrating the wheeled carrying apparatus of FIG. 1 provided with a variant construction of an actuating assembly and release mechanism.
Figure 18:
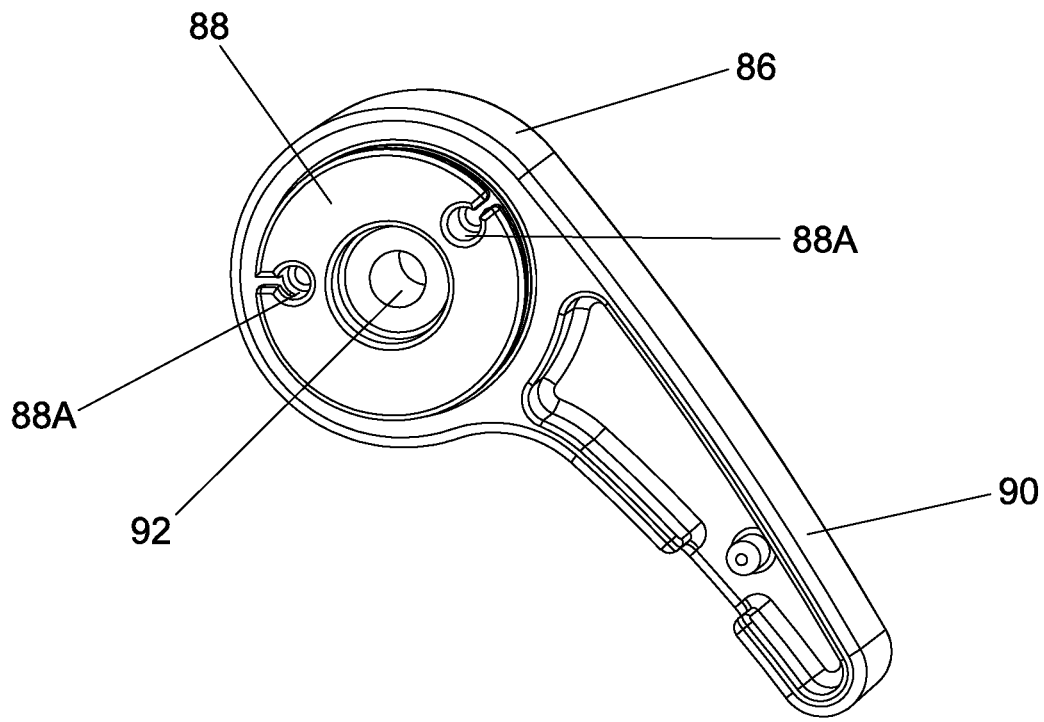
FIG. 18 is a perspective view illustrating an operating part of the release mechanism provided in the wheeled carrying apparatus of FIG. 17.
Figure 19:
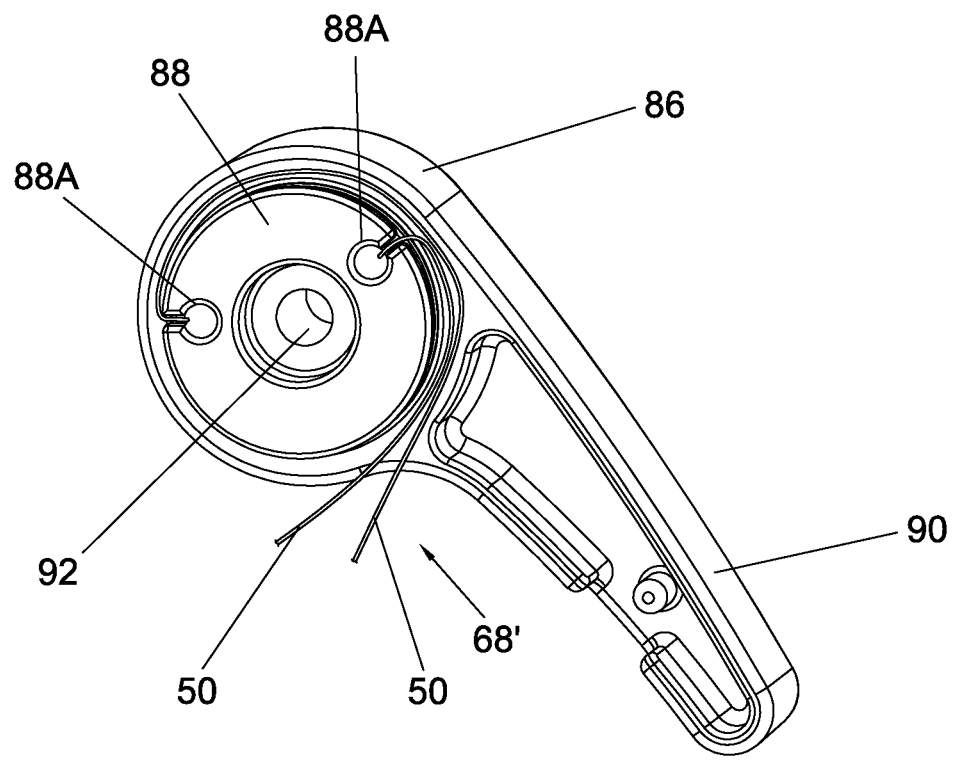
FIG. 19 is a perspective view illustrating a connection of the operating part with the actuating assembly provided in the wheeled carrying apparatus of FIG. 17.

FIGS. 17-19 are various views illustrating a variant construction of an actuating assembly 68' and a release mechanism 70' that can respectively substitute for the actuating assemblies and the release mechanisms described previously. Referring to FIGS. 17-19, the actuating assembly 68' can include the two linking parts 50 that are respectively connected with the two wheel mount latches 40 like described previously, but omit the two link actuators 72. The release mechanism 70' can include an operating part 86 that is placed on one of the two side segments 20A of the leg frame 20 and is connected with the linking parts 50. More specifically, the operating part 86 can include a barrel 88 pivotally connected with the side segment 20A of the leg frame 20, and an actuating portion 90 protruding from the barrel 88. According to an example of construction, the operating part 86 including the barrel 88 and the actuating portion 90 can be formed integrally as a single part. The operating part 86 may be pivotally connected with the side segment 20A of the leg frame 20 about a shaft (not shown) that is disposed through a hole 92 provided in the barrel 88.

Each linking part 50 can exemplarily include a single cable having an end anchored to the barrel 88 of the operating part 86 and an opposite end anchored to the wheel mount latch 40 (as shown in FIGS. 15 and 16). For example, the barrel 88 can have two notches 88A for anchoring the respective ends of the two linking parts 50. In this manner, the barrel 88 can rotate in one direction to unwind and relax the linking parts 50 so that the wheel mount latches 40 can respectively engage and lock the wheel mounts 30 under the biasing force of the locking springs 42, and in an opposite direction to wind at least partially the linking parts 50 so that the wheel mount latches 40 are respectively pulled by the linking parts 50 and respectively disengage from the wheel mounts 30.

Figure 20:
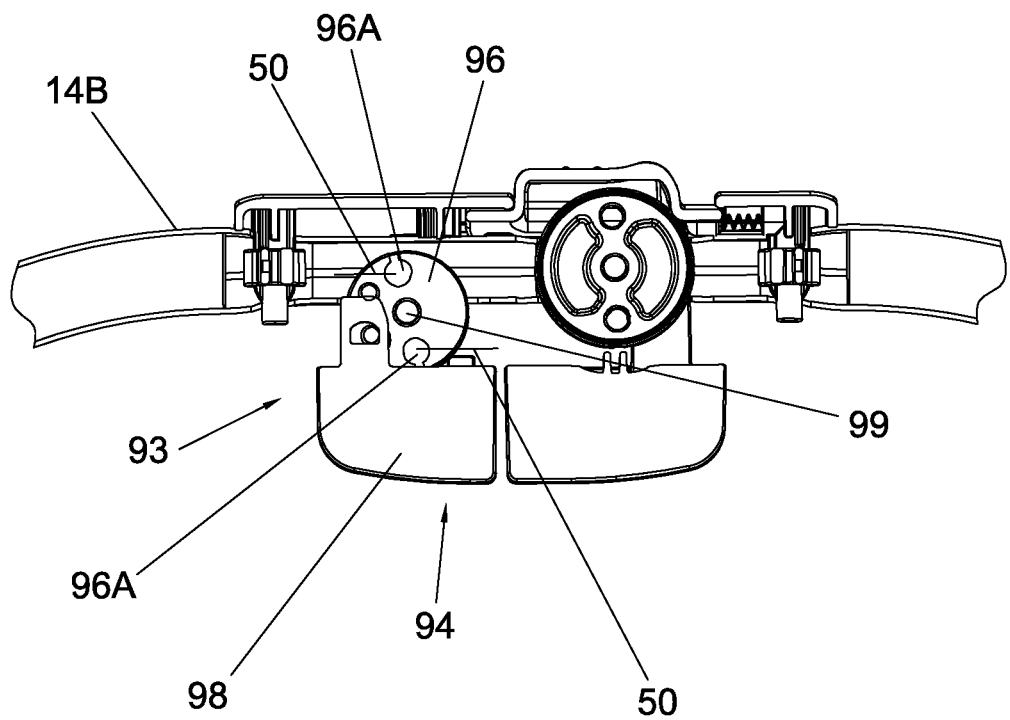
FIGS. 20 and 21 are schematic views illustrating a variant construction of an operating part that may be used in the release mechanism of the wheeled carrying apparatus.
Figure 21:
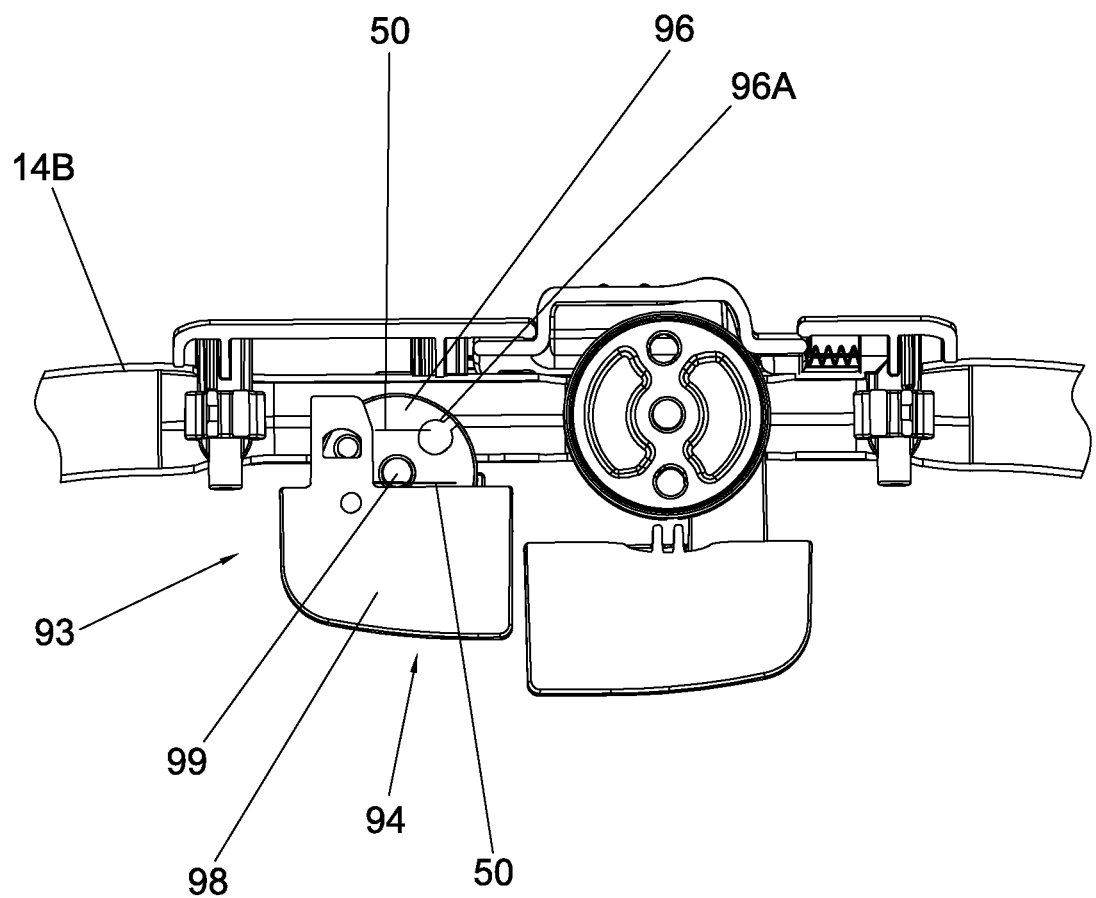

FIGS. 20 and 21 are schematic views illustrating another variant construction of a release mechanism 93 that can substitute for the release mechanisms described previously. Referring to FIGS. 20 and 21, the release mechanism 93 can include an operating part 94 placed on the frame structure of the wheeled carrying apparatus. The operating part 94 can include a barrel 96 and a button 98 that are movably connected with the frame structure, e.g., the grip portion 14B of the handle frame 14. The barrel 96 can be pivotally connected with the grip portion 14B of the handle frame 14 about a pivot axle 99. Like previously described, each linking part 50 can exemplarily include a cable, which can have an end anchored to the barrel 96 and an opposite end anchored to the wheel mount latch 40 (as shown in FIGS. 15 and 16). For example, the barrel 96 can have two notches 96A at two diametrically opposite locations for anchoring the respective ends of the two linking parts 50. In this manner, the barrel 96 can rotate in one direction to relax the linking parts 50 so that the wheel mount latches 40 can respectively engage and lock the wheel mounts 30 under the biasing force of the locking springs 42, and in an opposite direction to pull the linking parts 50 so that the wheel mount latches 40 are respectively pulled by the linking parts 50 and respectively disengage from the wheel mounts 30. The button 98 can be slidably connected with the grip portion 14B, and can be pivotally connected with the barrel 96 at a location eccentric from the pivot axle 99. The button 98 can thereby slide along a plane that is generally orthogonal to the pivot axle 99. With this construction, the button 98 is operable to urge the barrel 96 to rotate for concurrently pulling the two linking parts 50 so that the wheel mount latches 40 are respectively pulled by the linking parts 50 and respectively disengage from the wheel mounts 30.

Figure 22:
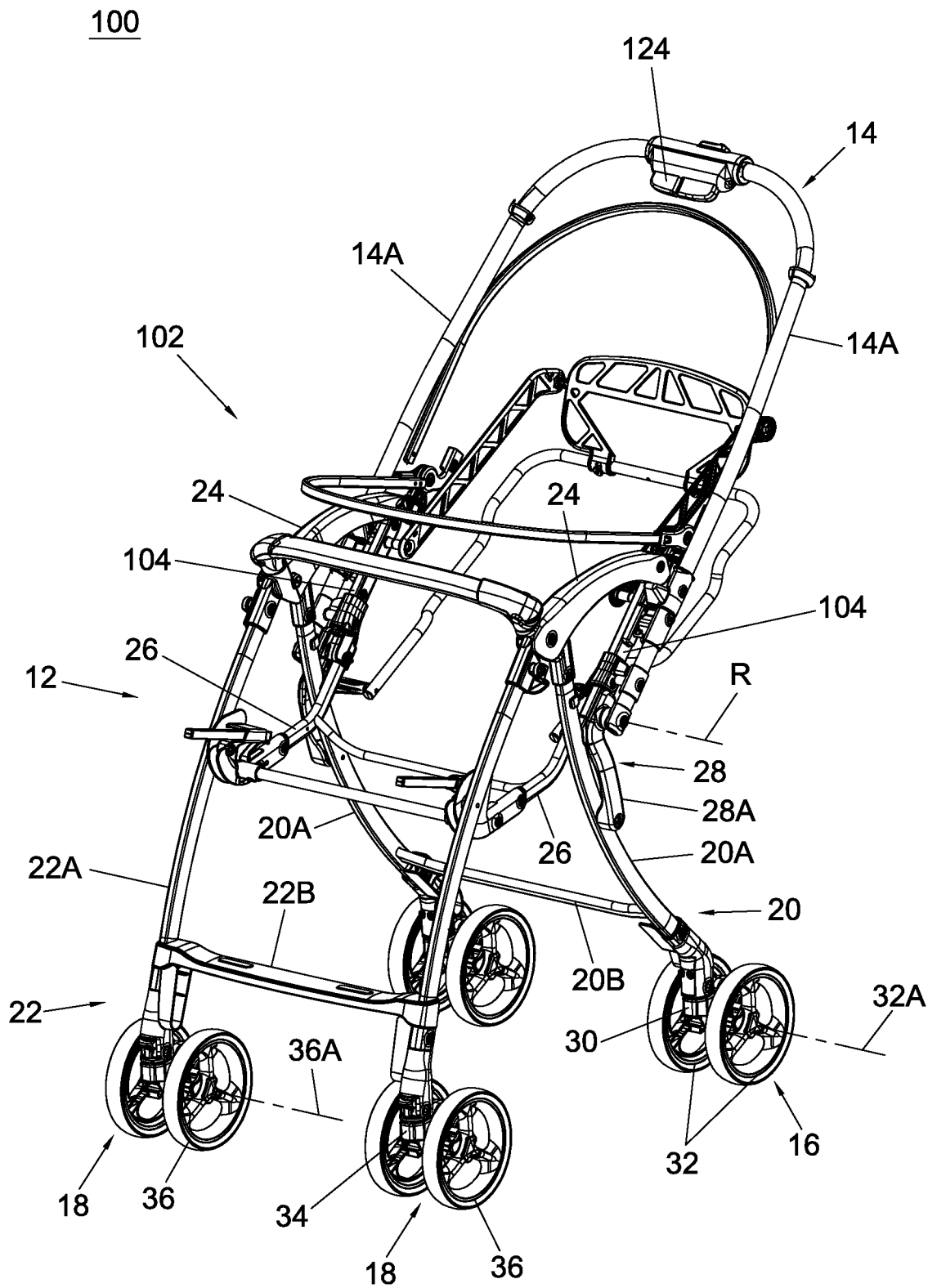
FIG. 22 is a perspective view illustrating another embodiment of a wheeled carrying apparatus.

FIG. 22 is a perspective view illustrating another embodiment of a wheeled carrying apparatus 100, which is exemplarily a child stroller apparatus. Referring to FIG. 22, the wheeled carrying apparatus 100 can include a frame structure 102 that is likewise comprised of the standing frame 12 and the handle frame 14 coupled to each other. In the wheeled carrying apparatus 100, the handle frame 14 is rotatable relative to the standing frame 12 between two positions of different inclinations for pushing the wheeled carrying apparatus 100 in different directions with a child facing forward or rearward. For example, the handle frame 14 can be inclined toward the side of the leg frame 20 in a position, and inclined toward the side of the leg frame 22 in another position.

In the wheeled carrying apparatus 100, the side portions 14A of the handle frame 14 are not pivotally connected with the side linking bars 24 so that the handle frame 14 can rotate over the side linking bars 24 for adjustment of the handle frame 14 between the two positions of different inclinations. The standing frame 12 of the wheeled carrying apparatus 100 is similar to that of the wheeled carrying apparatus 10 described previously and can further include a carrier bar 104 at each of the left and right side, and the handle frame 14 can be likewise respectively coupled to the standing frame 12 at each of the left and right side via the bar linkage 28 including the bar 28A. The carrier bar 104 can have an upper portion pivotally connected with the side linking bar 24, and a lower portion respectively connected pivotally with the side support bar 26, the bar 28A and the side portion 14A of the handle frame 14 about a common pivot axis R. The bar 28A can be respectively connected pivotally with the side segment 20A of the leg frame 20, and with the side portion 14A of the handle frame 14 about the pivot axis R. With this construction, the handle frame 14 of the wheeled carrying apparatus 100 can rotate about the pivot axis R relative to the standing frame 12 and the bar linkage 28 for adjustment between the two positions of different inclinations.

Figure 23:
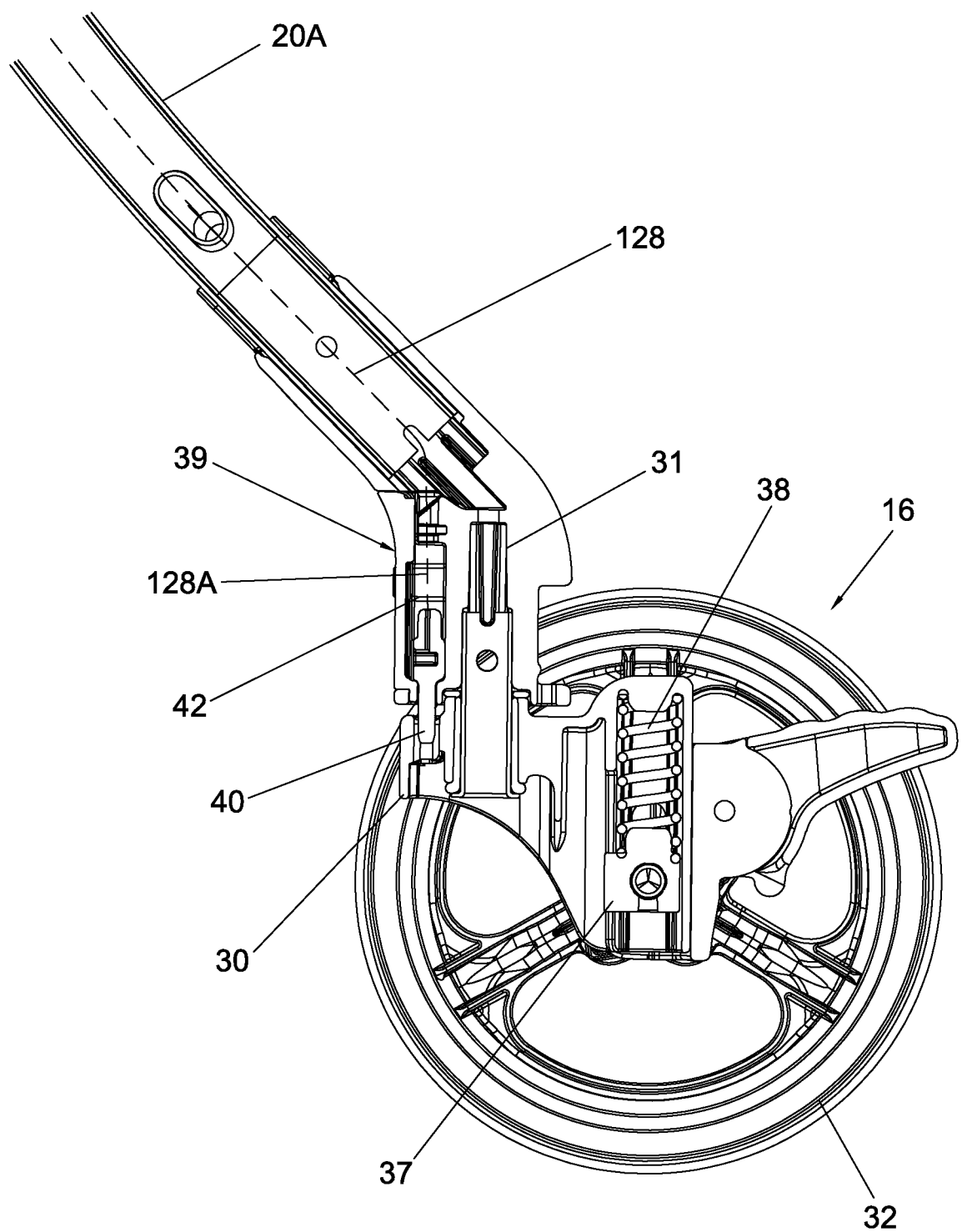
FIG. 23 is a cross-sectional view illustrating a wheel assembly provided in the wheeled carrying apparatus of FIG. 22.

Referring to FIG. 22, the standing frame 12 of the wheeled carrying apparatus 100 can likewise include the two wheel assemblies 16 provided on the leg frame 20, and the two wheel assemblies 18 provided on the leg frame 22. In conjunction with FIG. 22, FIG. 23 is a cross-sectional view illustrating one wheel assembly 16. Referring to FIGS. 22 and 23, the wheel assembly 16 can have the same construction described previously, which can include the wheel mount 30 pivotally connected with the leg frame 20 so that the wheel mount 30 and the wheel 32 carried therewith can rotate in unison relative to the leg frame 20. The same locking assembly 39 described previously can be provided to rotationally lock and unlock the wheel mount 30 with respect to the standing frame 12, wherein the locking assembly 39 can include the wheel mount latch 40 movably connected with the standing frame 12, and the locking spring 42 operable to bias the wheel mount latch 40 to engage with the wheel mount 30.

Figure 24:
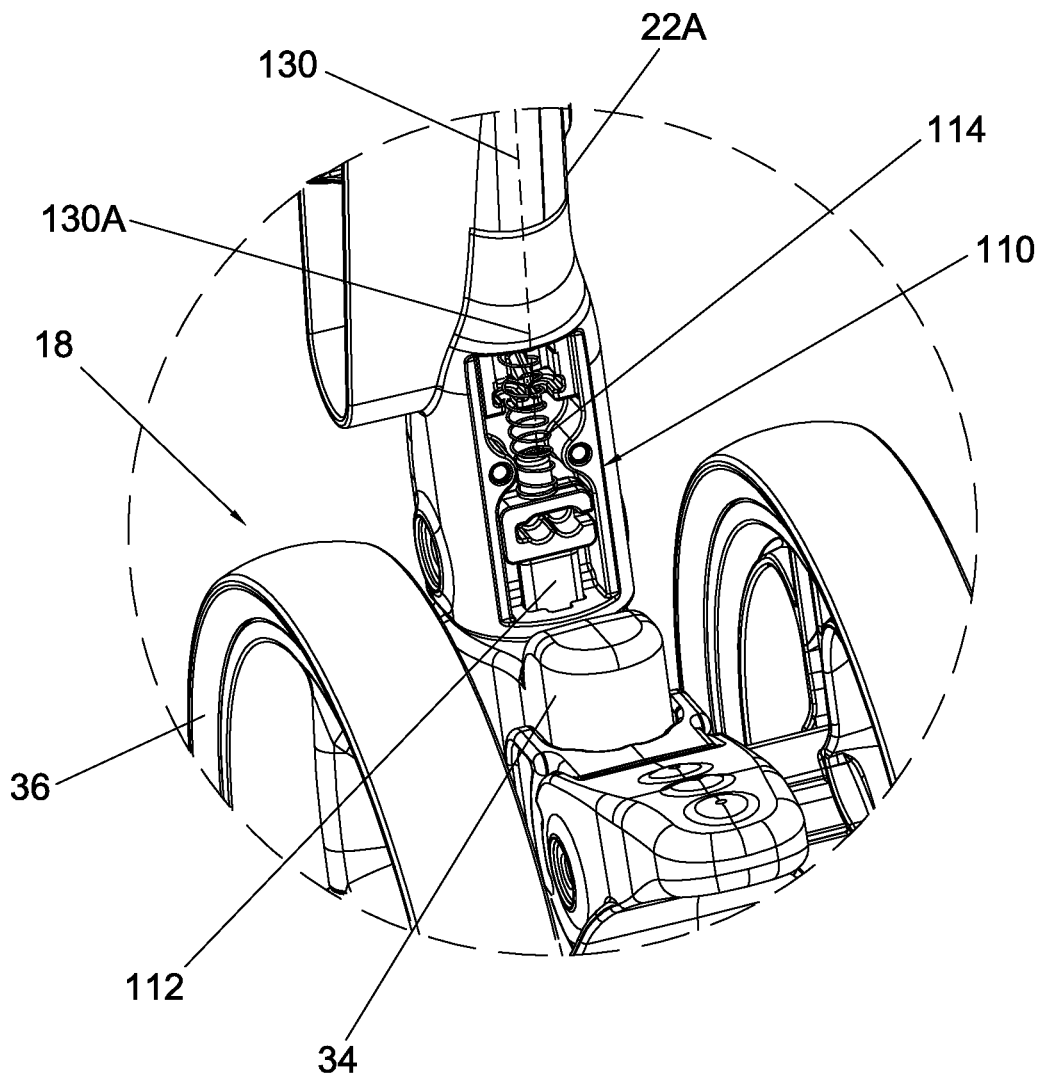
FIG. 24 is a perspective view illustrating another wheel assembly provided in the wheeled carrying apparatus of FIG. 22.
Figure 25:
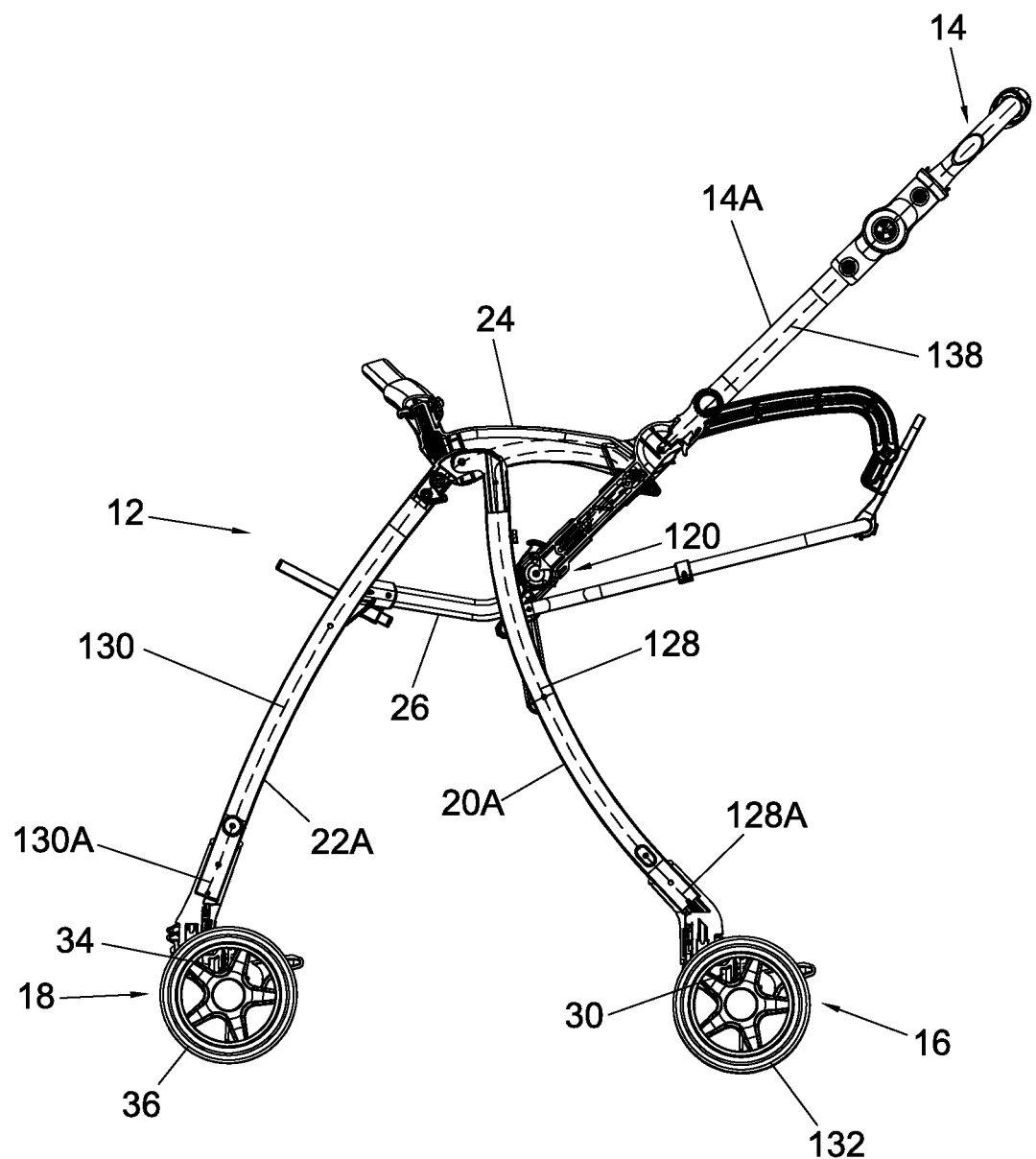
FIG. 25 is a schematic view illustrating an actuating assembly provided in the wheeled carrying apparatus of FIG. 22.
Figure 26:
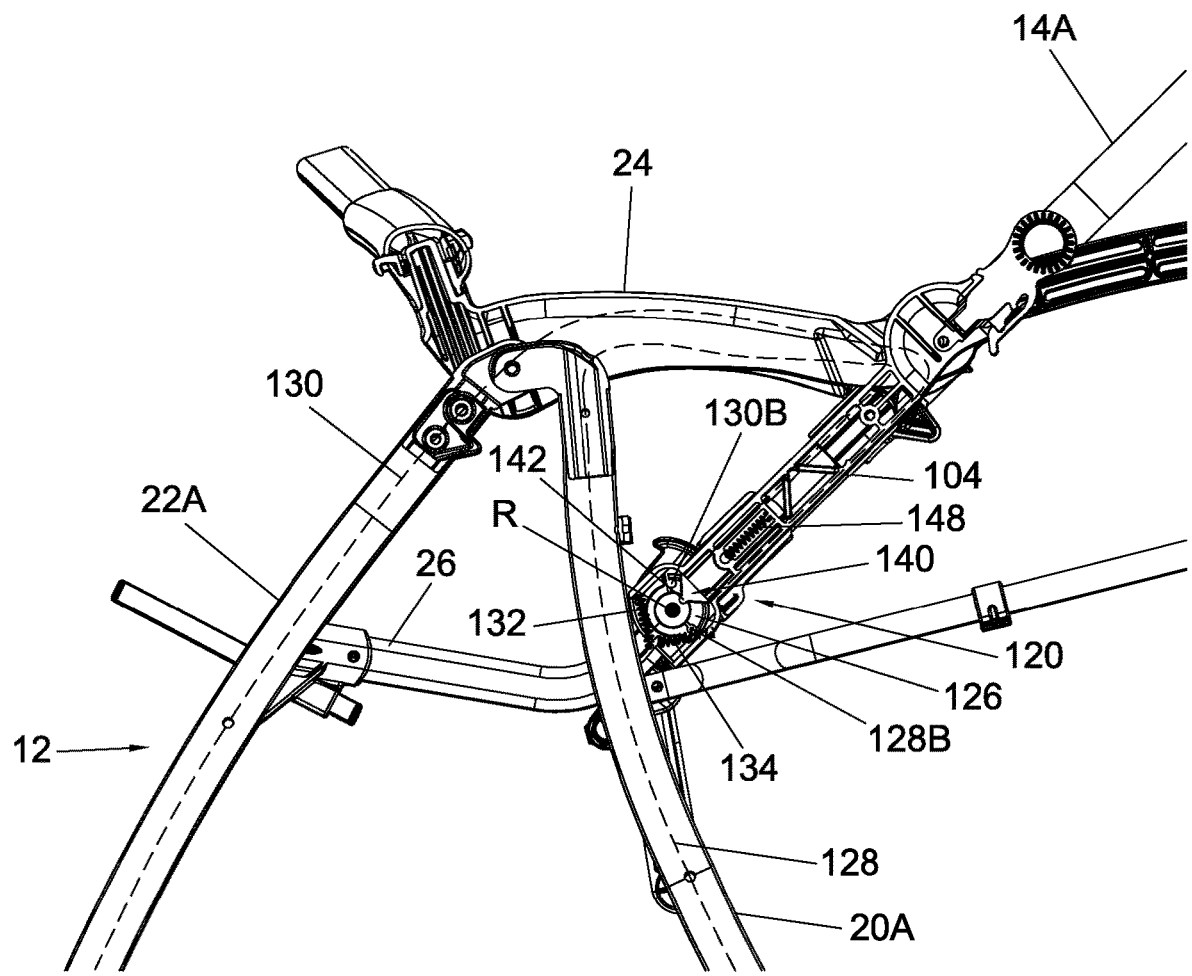
FIG. 26 is schematic view illustrating further construction details of the actuating assembly provided in the wheeled carrying apparatus of FIG. 22.
Figure 27:
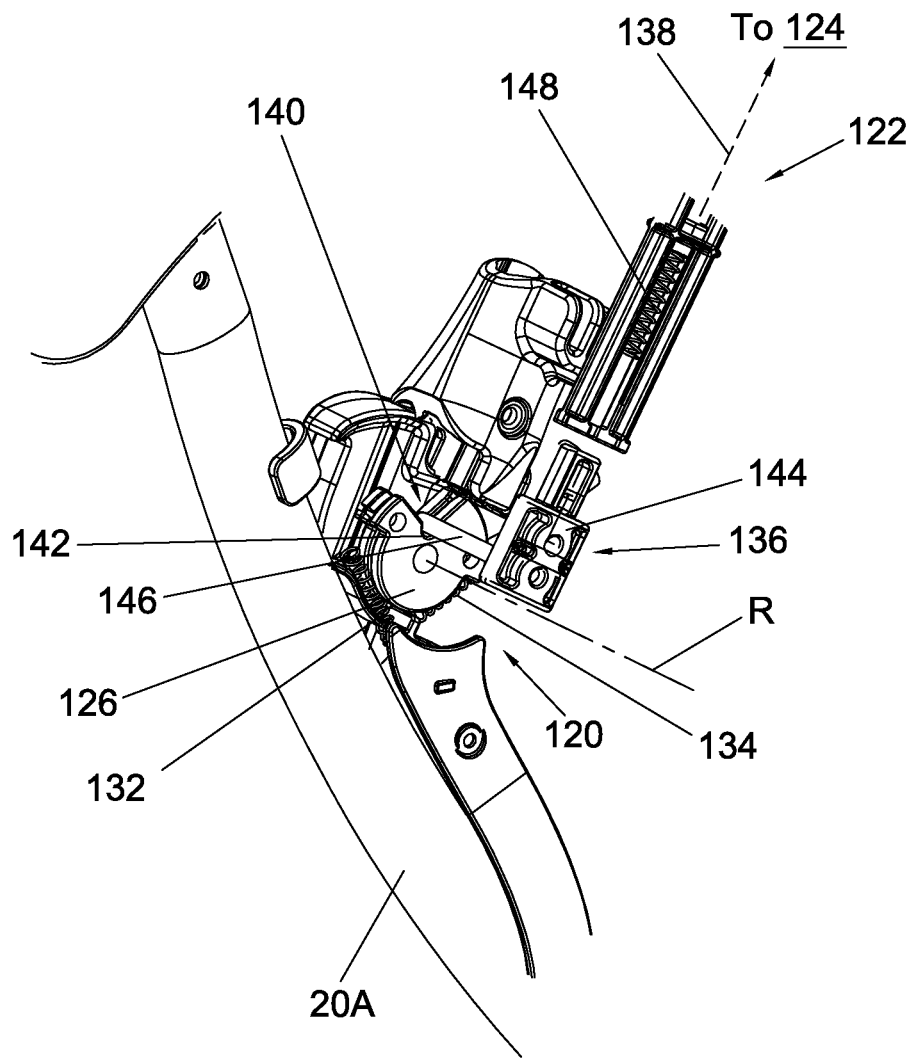
FIG. 27 is a perspective view illustrating some other construction details of the actuating assembly provided in the wheeled carrying apparatus of FIG. 22.

In conjunction with FIG. 22, FIG. 24 is an enlarged perspective view illustrating one wheel assembly 18. Referring to FIGS. 22 and 24, the wheel assembly 18 can have the same construction described previously, which can include the wheel mount 34 pivotally connected with the leg frame 22 so that the wheel mount 34 and the wheel 36 carried therewith can rotate in unison relative to the leg frame 22. Moreover, a locking assembly 110 can be provided to rotationally lock and unlock the wheel mount 34 with respect to the standing frame 12. The locking assembly 110 may have a construction similar to the locking assembly 39 of the wheel assembly 16. According to an example of construction, the locking assembly 110 can include a wheel mount latch 112 movably connected with the standing frame 12, and a locking spring 114 connected with the wheel mount latch 112. For example, the wheel mount latch 112 may be slidably connected with the side segment 22A of the leg frame 22, and the locking spring 114 can have two ends respectively connected with the side segment 22A and the wheel mount latch 112. The wheel mount latch 112 can thereby slide downward to engage with the wheel mount 34 and thereby rotationally lock the wheel mount 34 with respect to the standing frame 12, and can slide upward to disengage and unlock the wheel mount 34 so that the wheel mount 34 can freely rotate relative to the standing frame 12 for changing the horizontal orientation of the wheel axis 36A. The locking spring 114 can bias the wheel mount latch 112 to engage with the wheel mount 34.

In conjunction with FIGS. 22-24, FIGS. 25-27 are schematic views illustrating further construction details of the wheeled carrying apparatus 100. Referring to FIGS. 22-27, the wheeled carrying apparatus 100 can further include an actuating assembly 120 that is coupled to the wheel mount latches 40 and 112, and a release mechanism 122 including an operating part 124 that is provided on the frame structure 102 at a location distant from the wheel mount latches 40 and 112.

The actuating assembly 120 can include a link actuator 126 movably connected with the standing frame 12, a linking part 128 coupling the wheel mount latch 40 to the link actuator 126, and a linking part 130 coupling the wheel mount latch 112 to the link actuator 126, the wheel mount latches 40 and 112 being respectively associated with the wheel assemblies 16 and 18 located at a same side (i.e., a left or right side) of the wheeled carrying apparatus 100.

The link actuator 126 is configured to be movable in a first direction to pull the linking part 130 and urge the wheel mount latch 112 to disengage from the wheel mount 34 and concurrently relax the linking part 128 so that the wheel mount latch 40 can engage with the wheel mount 30, and in a second direction opposite to the first direction to pull the linking part 128 and urge the wheel mount latch 40 to disengage from the wheel mount 30 and concurrently relax the linking part 130 so that the wheel mount latch 112 can engage with the wheel mount 34, the link actuator 126 being movable in the first direction or the second direction in response to a rotation of the handle frame 14 relative to the standing frame 12 between the first position and the second position of different inclinations. According to an example of construction, the link actuator 126 can be pivotally connected with the standing frame 12 about the pivot axis R, and can rotate as a unitary part relative to the standing frame 12 in the first and second direction. For example, the link actuator 126 may be pivotally supported by the carrier bar 104 of the standing frame 12, and can be disposed adjacent to one side portion 14A of the handle frame 14 or the standing frame 12. Examples of suitable structures for the link actuator 126 may include, without limitation, a rotary plate, a lever, and the like.

Referring to FIGS. 22-27, the two linking parts 128 and 130 can include cable portions, and can be routed along the standing frame 12. According to an example of construction, the two linking parts 128 and 130 can respectively include two cable portions provided as two separate cables that respectively couple the wheel mount latches 40 and 112 to the link actuator 126. For example, the linking part 128 can include a cable having an end 128A anchored to the wheel mount latch 40 and another end 128B anchored to the link actuator 126, and the linking part 130 can include a cable having an end 130A anchored to the wheel mount latch 112 and another end 130B anchored to the link actuator 126. The linking part 128 can be exemplarily routed from the wheel mount latch 40 along the side segment 20A of the leg frame 20, the side linking bar 24 and the carrier bar 104 to the link actuator 126. The linking part 130 can be exemplarily routed from the wheel mount latch 112 along the side segment 22A of the leg frame 22, the side linking bar 24 and the carrier bar 104 to the link actuator 126. In this manner, the link actuator 126 is rotatable in a first direction to pull the linking part 130 and urge the wheel mount latch 112 to disengage and unlock the wheel mount 34 and concurrently relax the linking part 128 so that the wheel mount latch 40 can engage and lock the wheel mount 30, and in a second direction opposite to the first direction to pull the linking part 128 and urge the wheel mount latch 40 to disengage and unlock the wheel mount 30 and concurrently relax the linking part 130 so that the wheel mount latch 112 can engage and lock the wheel mount 34.

Referring to FIGS. 22-27, the actuating assembly 120 can further include two springs 132 and 134 respectively connected with the link actuator 126. More specifically, each of the two springs 132 and 134 can have two ends respectively connected with the link actuator 126 and the carrier bar 104, and the two springs 132 and 134 can respectively apply two biasing forces in different directions. For example, the spring 132 can bias the link actuator 126 to rotate relative to the standing frame 12 and the handle frame 14 in the first direction for pulling the linking part 130 and relaxing the linking part 128, and the spring 134 can bias the link actuator 126 to rotate relative to the standing frame 12 and the handle frame 14 in the second direction for pulling the linking part 128 and relaxing the linking part 130.

Referring to FIGS. 22-27, the release mechanism 122 is operable while the handle frame 14 is in any of the first and second position to cause the wheel mounts 30 and 34 to be unlocked at the same time. According to an example of construction, the release mechanism 122 can include an operating part 124 and a coupling part 136 operatively connected with each other via a cable 138. The operating part 124 can be provided on the grip portion 14B of the handle frame 14, and the coupling part 136 can be carried with the side portion 14A of the handle frame 14. The coupling part 136 is movable relative to the handle frame 14 and the link actuator 126 between a first state and a second state, the link actuator 126 and the handle frame 14 being coupled to each other so as to be rotatable in unison about the pivot axis R when the coupling part 136 is in the first state, and the link actuator 126 being rotatable about the pivot axis R relative to the standing frame 12 and the handle frame 14 when the coupling part 136 is in the second state.

According to an example of construction, the link actuator 126 can have a generally V-shaped slot 140, and a notch 142 at a bottom of the slot 140. The two linking parts 128 and 130 can be respectively anchored to the link actuator 126 at two sides of the slot 140. The coupling part 136 can be engaged with the notch 142 in the first state and disengaged from the notch 142 in the second state. According to an example of construction, the coupling part 136 can be slidably connected with the handle frame 14. For example, the coupling part 136 can include a stem portion 144 slidably connected with the side portion 14A of the handle frame 14, and a pin 146 fixedly connected with the stem portion 144 that protrudes sideways from the stem portion 144. The coupling part 136 can thereby slide relative to the handle frame 14 between the first state where the pin 146 is engaged with the notch 142, and the second state where the pin 146 is disengaged from the notch 142. The engagement of the coupling part 136 with the link actuator 126 in the first state can prevent rotation of the link actuator 126 relative to the handle frame 14. When the coupling part 136 is in the second state disengaged from the notch 142, the link actuator 126 can rotate relative to the standing frame 12 and the handle frame 14 under the biasing force of the spring 132 or 134.

Referring to FIGS. 22-27, the release mechanism 122 can further include a spring 148 for biasing the coupling part 136 toward the first state engaged with the link actuator 126. For example, the spring 148 can have two ends respectively connected with the stem portion 144 of the coupling part 136 and the side portion 14A of the handle frame 14.

Figure 28:
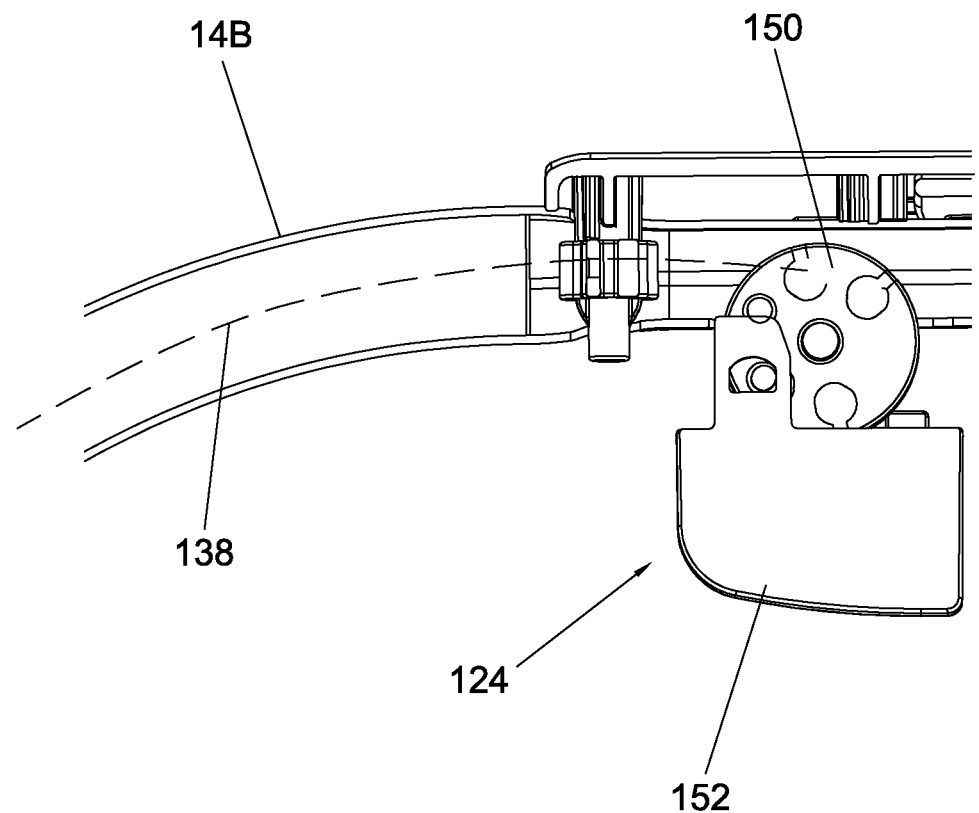
FIG. 28 is a schematic view illustrating an operating part of a release mechanism provided in the wheeled carrying apparatus of FIG. 22.

In conjunction with FIGS. 22-27, FIG. 28 is an enlarged view illustrating construction details of the operating part 124. Referring to FIGS. 22 and 28, the operating part 124 can include a barrel 150 and a button 152. The barrel 150 can be pivotally connected with the grip portion 14B of the handle frame 14, and the cable 138 can have an end anchored to the barrel 150. The button 152 can be slidably connected with the grip portion 14B and pivotally connected with the barrel 150. With this construction, the button 152 can be pressed to urge the barrel 150 to rotate for pulling the cable 138 so that the coupling part 136 is urged to move against the biasing force of the spring 148 and disengages from the link actuator 126.

Since the two wheels assemblies 16 and 18 are provided at each of the left and right side of the wheeled carrying apparatus 100, the actuating assembly 120 and the release mechanism 122 can be symmetrically arranged at the left and right side and coupled to the operating part 124.

With the aforementioned construction, the handle frame 14 can rotate between the first position and the second position with the coupling part 136 in the first state, wherein the handle frame 14 can be inclined toward the side of the leg frame 20 in the first position and toward the side of the leg frame 22 in the second position. Accordingly, the link actuator 126 can rotate along with the handle frame 14 in the first direction for pulling the linking part 130 and relaxing the linking part 128 when the handle frame 14 rotates from the second position to the first position, which can cause the wheel mount latch 112 to disengage and unlock the wheel mount 34 and the wheel mount latch 40 to engage and lock the wheel mount 30. Conversely, the link actuator 126 can rotate along with the handle frame 14 in the second direction for pulling the linking part 128 and relaxing the linking part 130 when the handle frame 14 rotates from the first position to the second position, which can cause the wheel mount latch 40 to disengage and unlock the wheel mount 30 and the wheel mount latch 112 to engage and lock the wheel mount 34.

While the handle frame 14 is in the first position and the operating part 124 is released, the biasing force of the spring 148 keeps the coupling part 136 in the first state engaged with the link actuator 126, the wheel mount latch 40 is engaged with the wheel mount 30 to lock the wheel mount 30 to the standing frame 12, and the wheel mount latch 112 is kept disengaged from the wheel mount 34 by an initial distance so that the wheel mount 34 is unlocked for free rotation relative to the standing frame 12. In the first position of the handle frame 14, the elastic energy stored in the spring 134 may be higher than that stored in the spring 132. For unlocking the wheel mounts 30 and 34 while the handle frame 14 is in the first position, a caregiver can actuate the operating part 124 to cause the coupling part 136 to move relative to the handle frame 14 from the first state to the second state so that the link actuator 126 biased by the spring 134 rotates in the second direction and pulls the linking part 128 for disengaging the wheel mount latch 40 from the wheel mount 30. This angular displacement of the link actuator 126 in the second direction for disengaging the wheel mount latch 40 from the wheel mount 30 would also result in a limited displacement of the wheel mount latch 112 toward the wheel mount 34 that is shorter than the initial distance, so that the wheel mount latch 112 can still remain disengaged from the wheel mount 34. Accordingly, all of the wheel mounts 30 and 34 can be unlocked at the same time in the first position of the handle frame 14.

While the handle frame 14 is in the second position and the operating part 124 is released, the biasing force of the spring 148 keeps the coupling part 136 in the first state engaged with the link actuator 126, the wheel mount latch 112 is engaged with the wheel mount 34 to lock the wheel mount 34 to the standing frame 12, and the wheel mount latch 40 is kept disengaged from the wheel mount 30 by an initial distance so that the wheel mount 30 is unlocked for free rotation relative to the standing frame 12. In the second position of the handle frame 14, the elastic energy stored in the spring 132 may be higher than that stored in the spring 134. For unlocking the wheel mounts 30 and 34 while the handle frame 14 is in the second position, a caregiver can actuate the operating part 124 to cause the coupling part 136 to move relative to the handle frame 14 from the first state to the second state so that the link actuator 126 biased by the spring 132 rotates in the first direction and pulls the linking part 130 for disengaging the wheel mount latch 112 from the wheel mount 34. This angular displacement of the link actuator 126 in the first direction for disengaging the wheel mount latch 112 from the wheel mount 34 would also result in a limited displacement of the wheel mount latch 40 toward the wheel mount 30 that is shorter than the initial distance, so that the wheel mount latch 40 can still remain disengaged from the wheel mount 30. Accordingly, all of the wheel mounts 30 and 34 can be unlocked at the same time in the second position of the handle frame 14.

Figure 29:
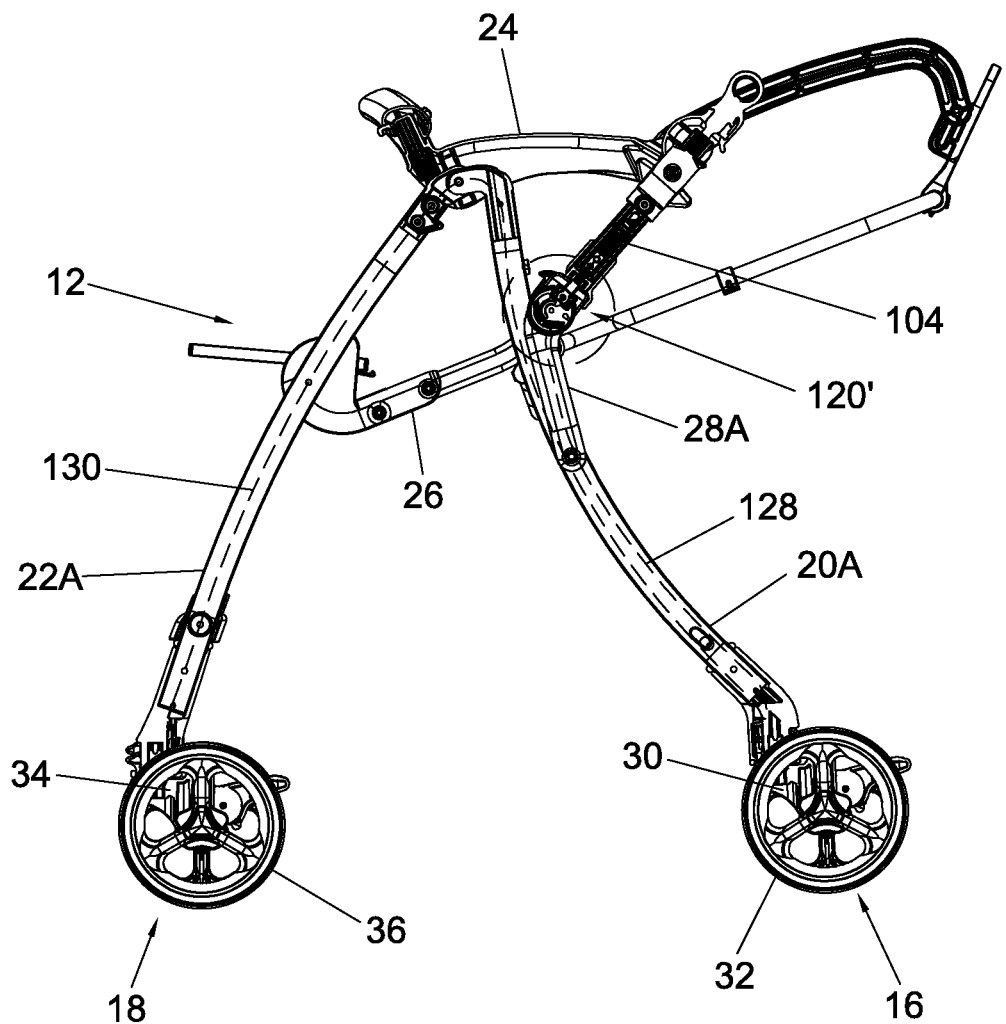
FIG. 29 is a schematic view illustrating the wheeled carrying apparatus of FIG. 22 provided with a variant construction of the actuating assembly.
Figure 30:
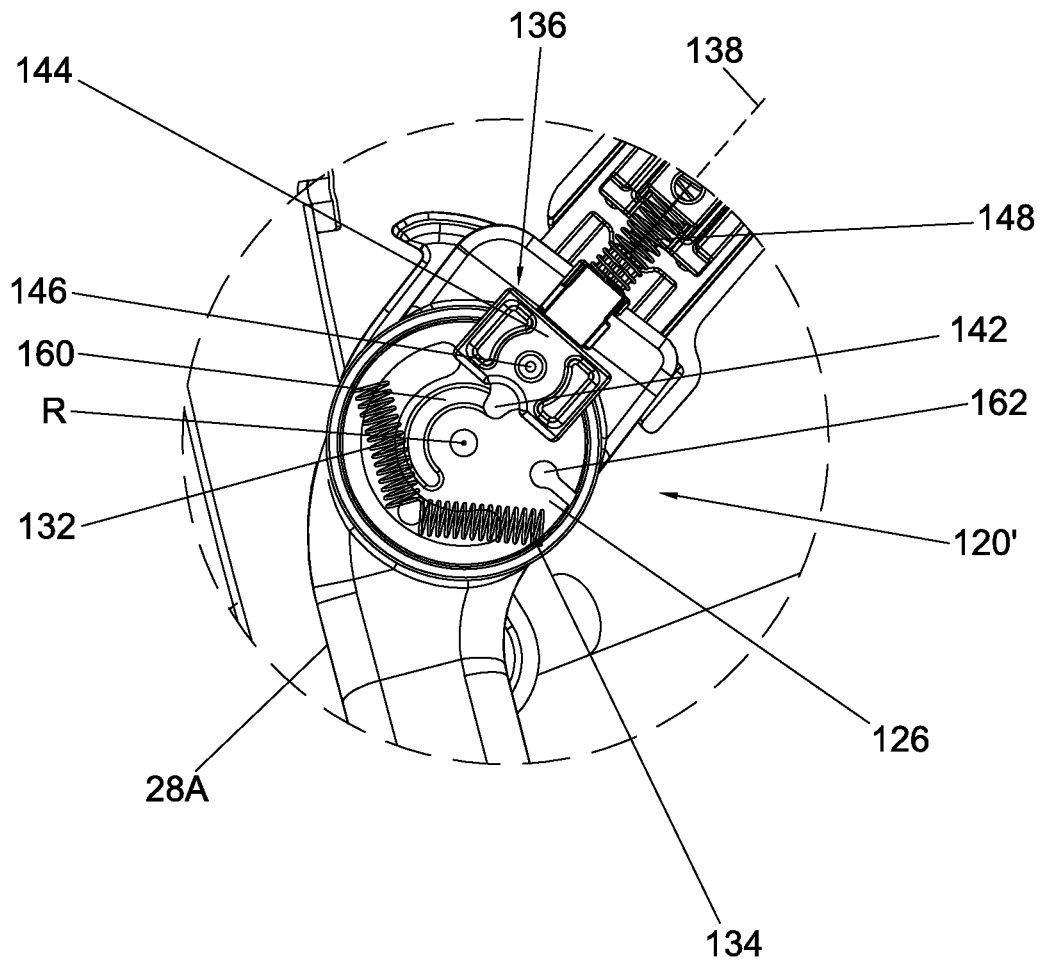
FIG. 30 is an enlarged view illustrating some construction details of the actuating assembly provided in the wheeled carrying apparatus of FIG. 29.
Figure 31:
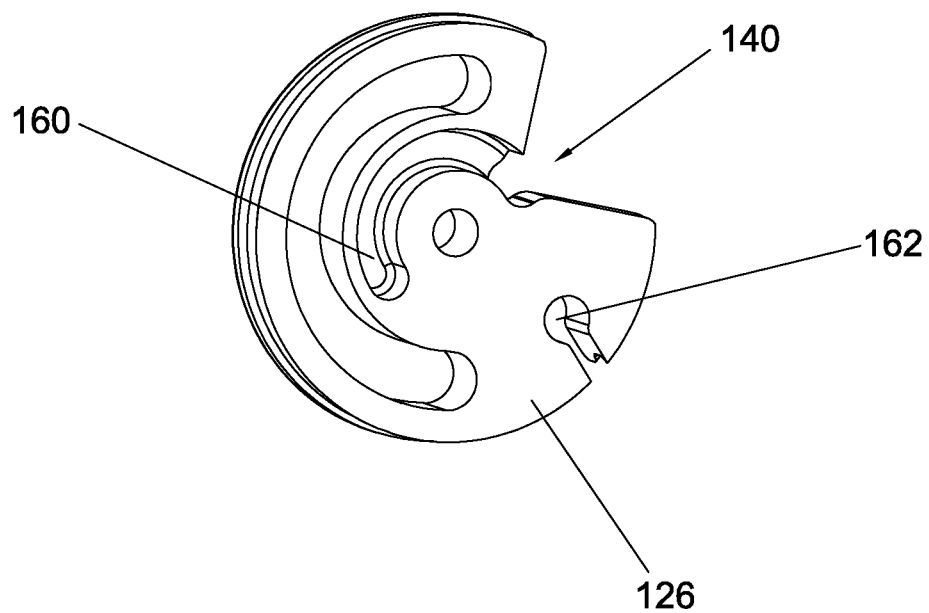
FIG. 31 is a perspective view illustrating a link actuator provided in the actuating assembly shown in FIG. 30.
Figure 32:
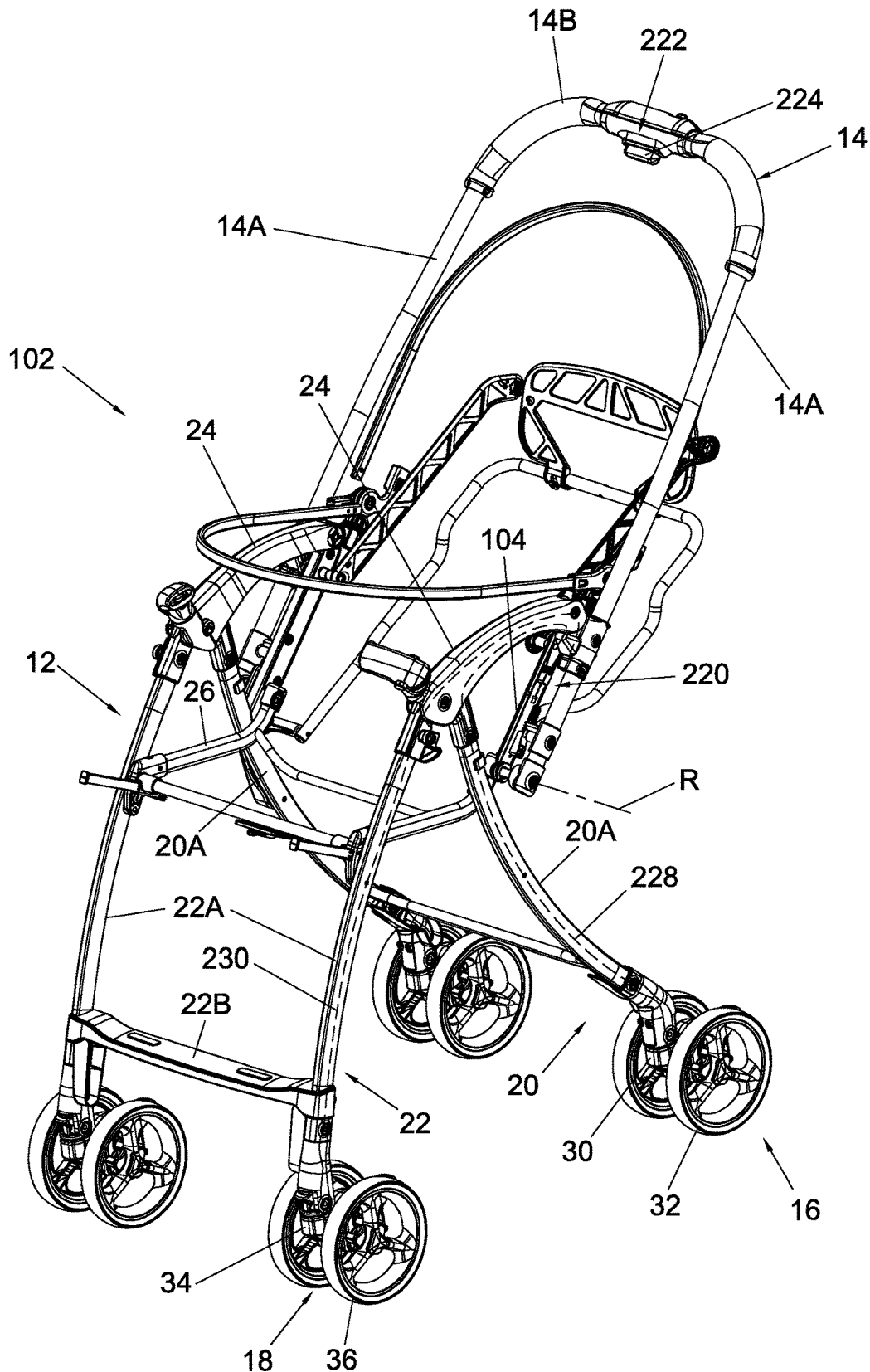
FIG. 32 is a perspective view illustrating the wheeled carrying apparatus provided with another actuating assembly and release mechanism.
Figure 33:
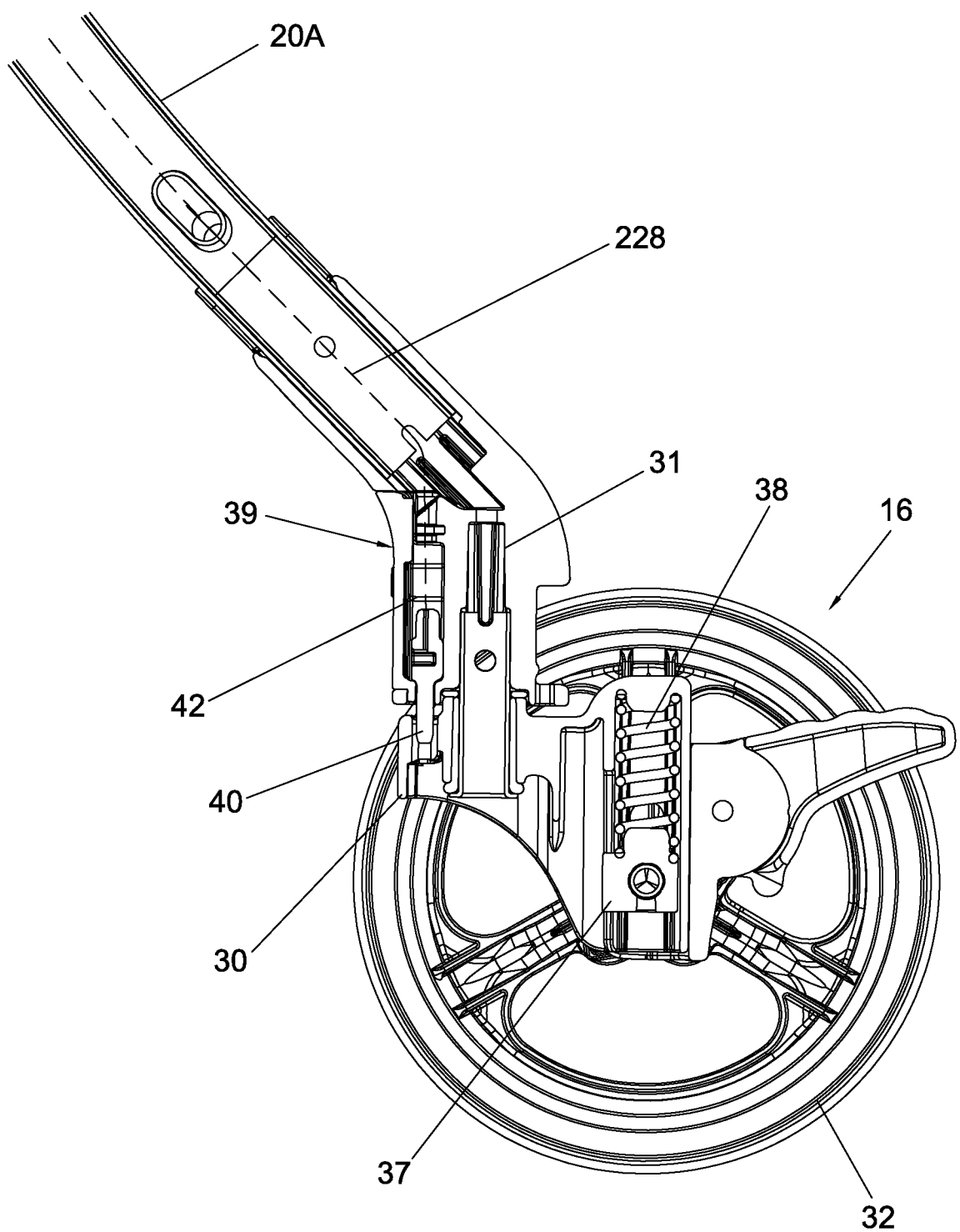
FIG. 33 is a cross-sectional view illustrating a wheel assembly provided in the wheeled carrying apparatus of FIG. 32.
Figure 34:
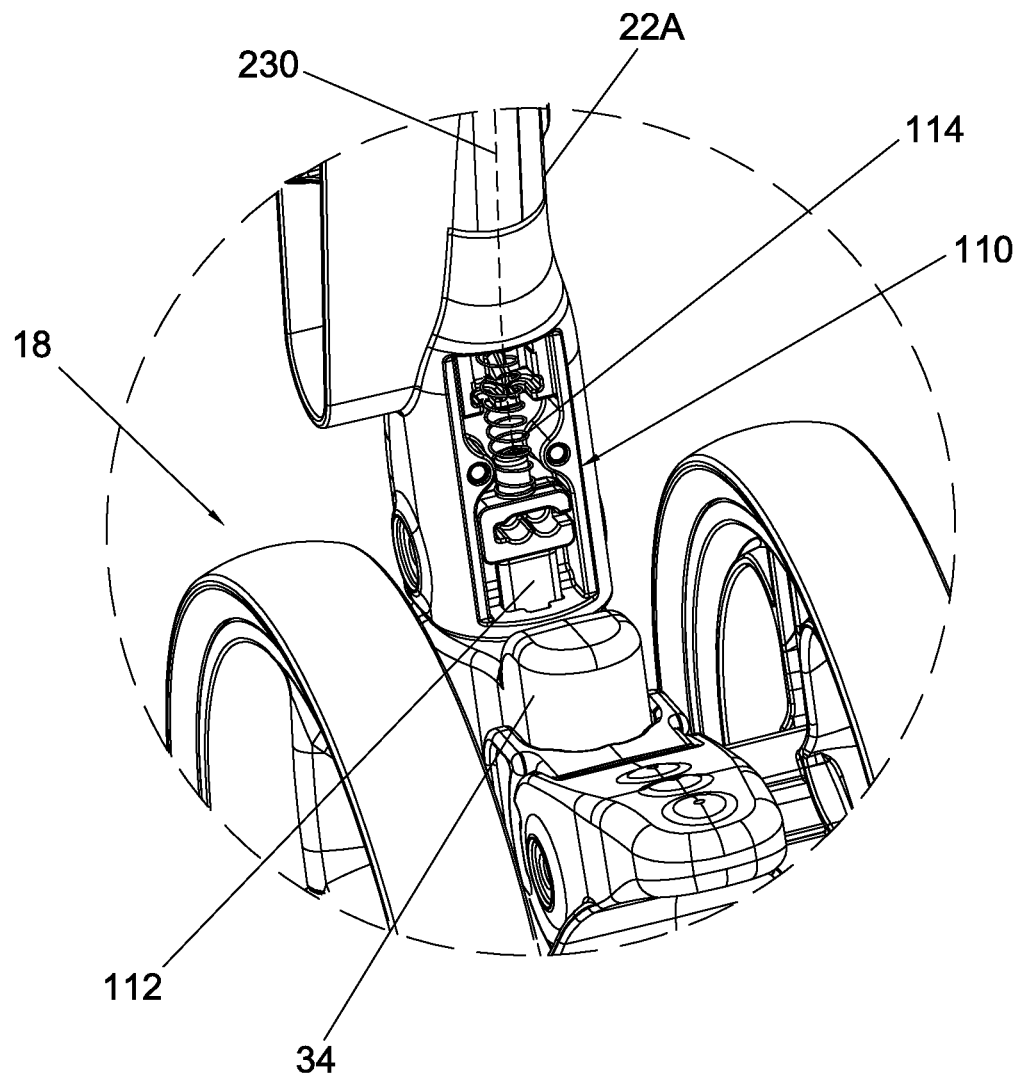
FIG. 34 is a perspective view illustrating another wheel assembly provided in the wheeled carrying apparatus of FIG. 32.
Figure 35:
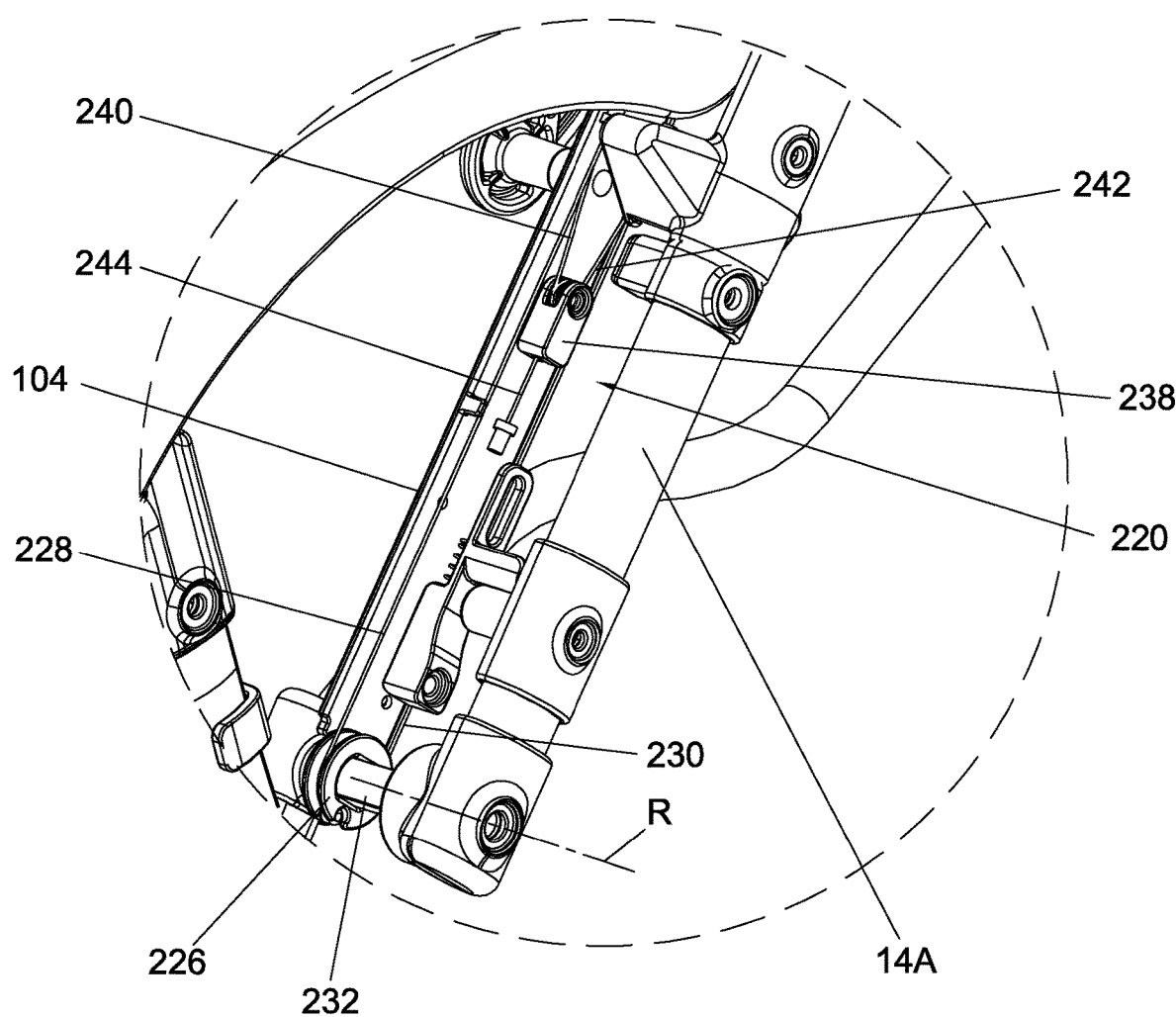
FIG. 35 is an enlarged view illustrating the actuating assembly provided in the wheeled carrying apparatus of FIG. 32.
Figure 36:
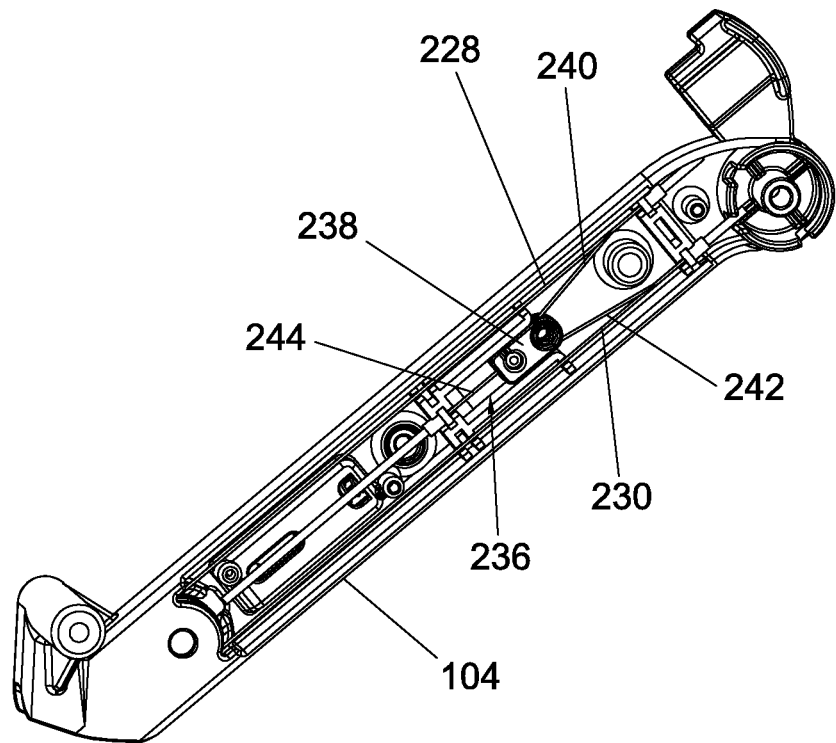
FIG. 36 is a perspective view illustrating a portion of the actuating assembly on a carrier bar of the wheeled carrying apparatus of FIG. 32.

FIGS. 29-31 are schematic views illustrating an embodiment that uses an actuating assembly 120' that can substitute for the actuating assembly 120 described previously. Referring to FIGS. 29-31, the actuating assembly 120' can include the link actuator 126, the two linking parts 128 and 130 respectively coupling the wheel mount latches 40 and 112 to the link actuator 126, and the two springs 132 and 134 respectively connected with the link actuator 126. The link actuator 126 used in the actuating assembly 120' can be generally similar to the link actuator 126 of the actuating assembly 120, and further includes a guide slot 160 having an arcuate shape centered about the pivot axis R. Moreover, the two linking parts 128 and 130 used in the actuating assembly 120' can be formed by a single continuous cable that has two ends respectively anchored to the wheel mount latch 112 and an anchoring opening 162 provided in the link actuator 126, and an intermediate portion looped at and in sliding contact with the wheel mount latch 40. Like previously described, the link actuator 126 of the actuating assembly 120' can rotate along with the handle frame 14 with the coupling part 136 engaged with the link actuator 126 to switch the locking state between the wheel mount latches 40 and 112, and the coupling part 136 can be disengaged from the link actuator 126 so that the link actuator 126 can rotate under the biasing force of the spring 132 or 134 for unlocking all of the wheel mount latches 40 and 112 at the same time. When the wheeled carrying apparatus 100 is folded for storage, the pin 146 of the coupling part 136 can slide along the guide slot 160.

Examples of suitable mechanisms for actuating the link actuator 126 may not be limited to a spring mechanism. In a variant embodiment, the link actuator 126 can be operatively connected with and driven by a driving member (not shown) having a first state and a second state, the driving member actuating the link actuator 126 to rotate when the driving element is in the second state. In this variant embodiment, a single cable 138 can have two opposite ends respectively connected with the operating part 124 and the driving member, so that a caregiver can actuate the operating part 124 to cause the driving member to move relative to the handle frame 14 or the standing frame 12 from the first state to the second state so that the link actuator 126 driven by the driving element moves in the second direction and pulls the linking part 128 or 130 for disengaging the wheel mount latch from the wheel mount.

FIGS. 32-39 are schematic views illustrating another embodiment of a wheeled carrying apparatus 200 implemented as a child stroller apparatus. Referring to FIGS. 32-39, the wheeled carrying apparatus 200 can have the frame structure 102, the wheel assemblies 16 and 18 and the locking assemblies 39 and 110 described previously with reference to FIGS. 22-24, and can further include an actuating assembly 220 and a release mechanism 222 that substitute for the actuating assembly 120 and the release mechanism 122 of the previous embodiment.

Referring to FIGS. 32-39, the actuating assembly 220 can include a link actuator 226 movably connected with the standing frame 12, a linking part 228 coupling the wheel mount latch 40 to the link actuator 226, and a linking part 230 coupling the wheel mount latch 112 to the link actuator 226, the wheel mount latches 40 and 112 being respectively associated with the wheel assemblies 16 and 18 located at a same side (i.e., a left or right side) of the wheeled carrying apparatus 200. The link actuator 226 can move in a first direction to pull the linking part 230 and urge the wheel mount latch 112 to disengage from the wheel mount 34 and concurrently relax the linking part 228 so that the wheel mount latch 40 can engage with the wheel mount 30, and in a second direction opposite to the first direction to pull the linking part 228 and urge the wheel mount latch 40 to disengage from the wheel mount 30 and concurrently relax the linking part 230 so that the wheel mount latch 112 can engage with the wheel mount 34, the link actuator 226 being movable in the first direction or the second direction in response to a rotation of the handle frame 14 relative to the standing frame 12 between the first position and the second position of different inclinations. In this embodiment, the link actuator 226 can be pivotally connected with the standing frame 12 about the pivot axis R, and can rotate as a unitary part relative to the standing frame 12 in the first and second direction. According to an example of construction, the side portion 14A of the handle frame 14 can be fixedly connected with a shaft portion 232 extending along the pivot axis R, and the link actuator 226 can be disposed adjacent to the carrier bar 104 and can be rotationally coupled to the handle frame 14 by engaging the shaft portion 232 through a hole 226A provided in the link actuator 226, whereby both the the link actuator 226 and the handle frame 14 can rotate in unison about the pivot axis R. Examples of suitable structures for the link actuator 226 may include, without limitation, a rotary plate, a ring and the like.

Referring to FIGS. 32-39, the two linking parts 228 and 230 can include cable portions provided as separate cables or defined from a single cable, and can be routed along the standing frame 12. According to an example of construction, the two linking parts 228 and 230 can respectively include two cable portions that respectively couple the wheel mount latches 40 and 112 to the link actuator 226. For example, the linking part 228 can include a cable portion that is anchored to the link actuator 226 via an attachment part 234 and has an end anchored to the wheel mount latch 40, and the linking part 230 can include a cable portion that is anchored to the link actuator 226 via the attachment part 234 and has an end anchored to the wheel mount latch 112. The linking part 228 can be exemplarily routed from the wheel mount latch 40 along the side segment 20A of the leg frame 20, the side linking bar 24 and the carrier bar 104 to the link actuator 226. The linking part 230 can be exemplarily routed from the wheel mount latch 112 along the side segment 22A of the leg frame 22, the side linking bar 24 and the carrier bar 104 to the link actuator 226. The linking parts 228 and 230 may extend substantially parallel to each other along the carrier bar 104. According to an example of construction, the two linking parts 228 and 230 may be defined from a single cable that thereby forms a single-body linking part, which can have an intermediate portion that loops at the link actuator 226 and a first and a second end respectively anchored to the wheel mount latch 40 and the wheel mount latch 112. In this manner, the link actuator 226 is rotatable along with the handle frame 14 in a first direction to pull the linking part 230 and urge the wheel mount latch 112 to disengage and unlock the wheel mount 34 and concurrently relax the linking part 228 so that the wheel mount latch 40 is allowed to engage and lock the wheel mount 30, and in a second direction opposite to the first direction to pull the linking part 228 and urge the wheel mount latch 40 to disengage and unlock the wheel mount 30 and concurrently relax the linking part 230 so that the wheel mount latch 112 is allowed to engage and lock the wheel mount 34.

Referring to FIGS. 32-39, the release mechanism 222 can include an operating part 224 provided on the grip portion 14B of the handle frame 14, which may be similar to the previous operating part 124 in construction. The release mechanism 222 is likewise operable while the handle frame 14 is in any of the first and second position to cause the wheel mounts 30 and 34 to be unlocked at the same time. To this end, the actuating assembly 220 can further include a cable assembly 236 that operatively couples the operating part 224 to the wheel mount latches 40 and 112 and is operatively decoupled from the link actuator 226, whereby the operating part 224 is operable to pull the cable assembly 236 so that the wheel mount latches 40 and 112 are respectively disengaged from the wheel mounts 30 and 34 at the same time.

Figure 37:
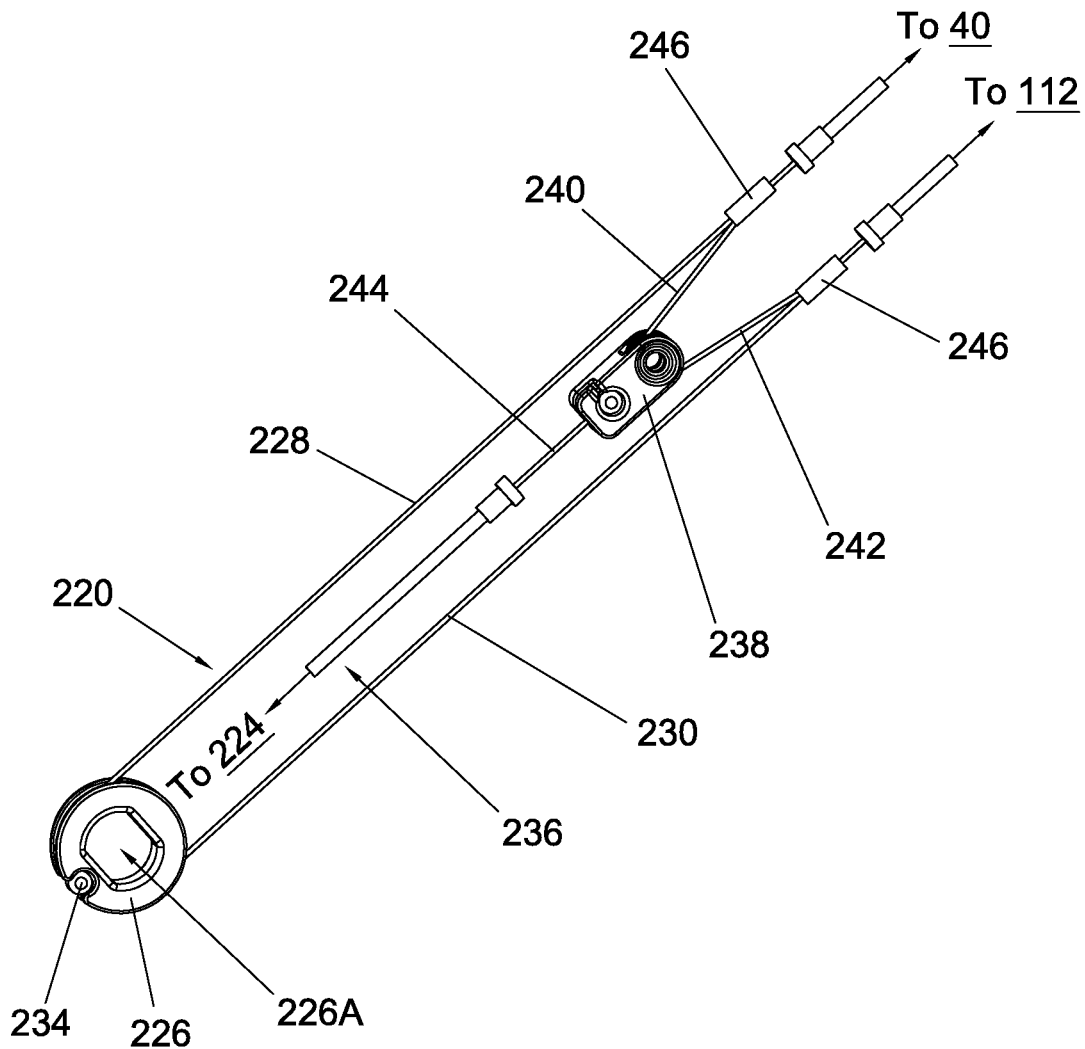
FIG. 37 is a perspective view illustrating the actuating assembly of the wheeled carrying apparatus shown in FIG. 32.
Figure 38:
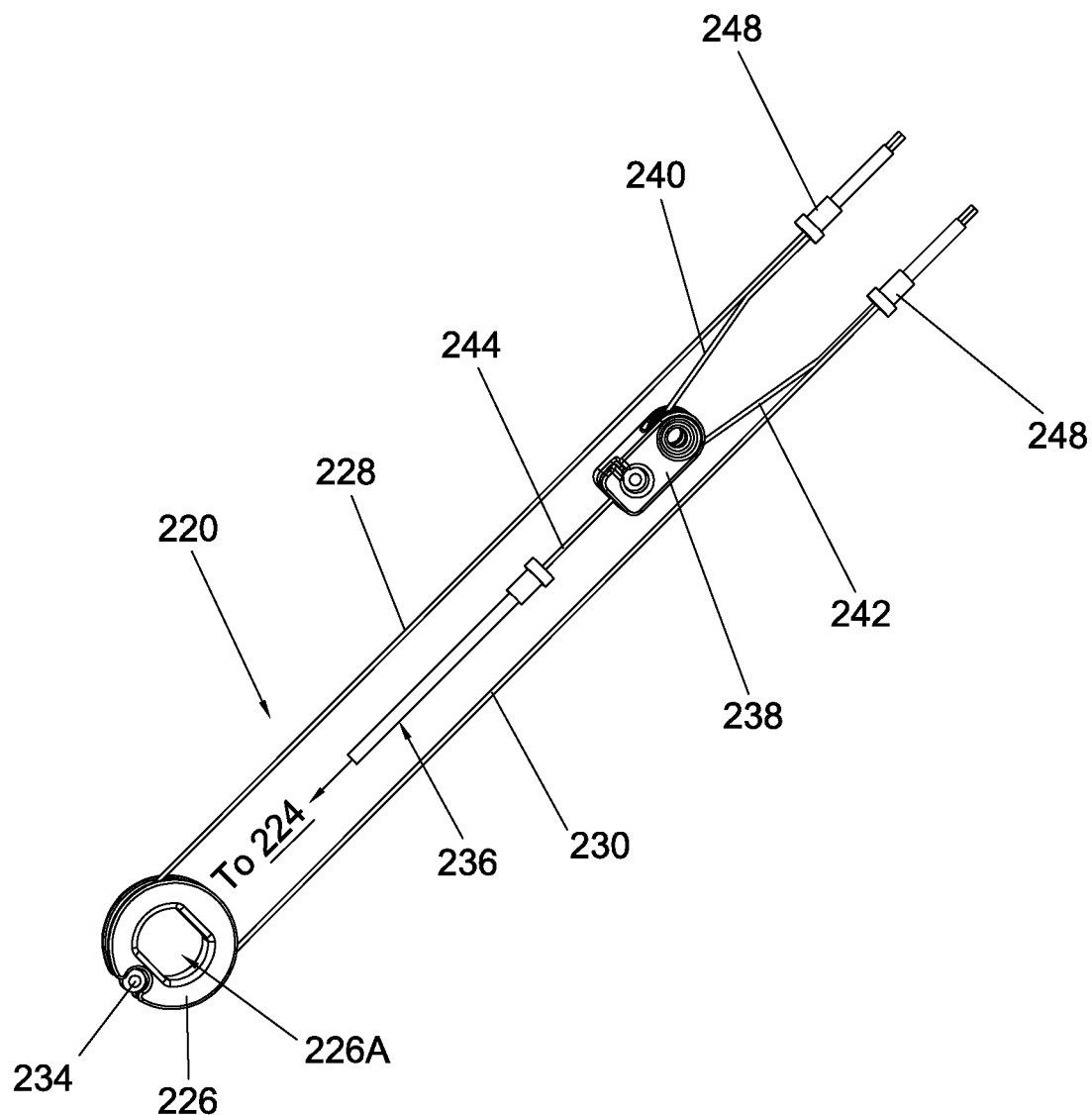
FIG. 38 is a perspective view illustrating a variant construction of the actuating assembly shown in FIG. 37.
Figure 39:
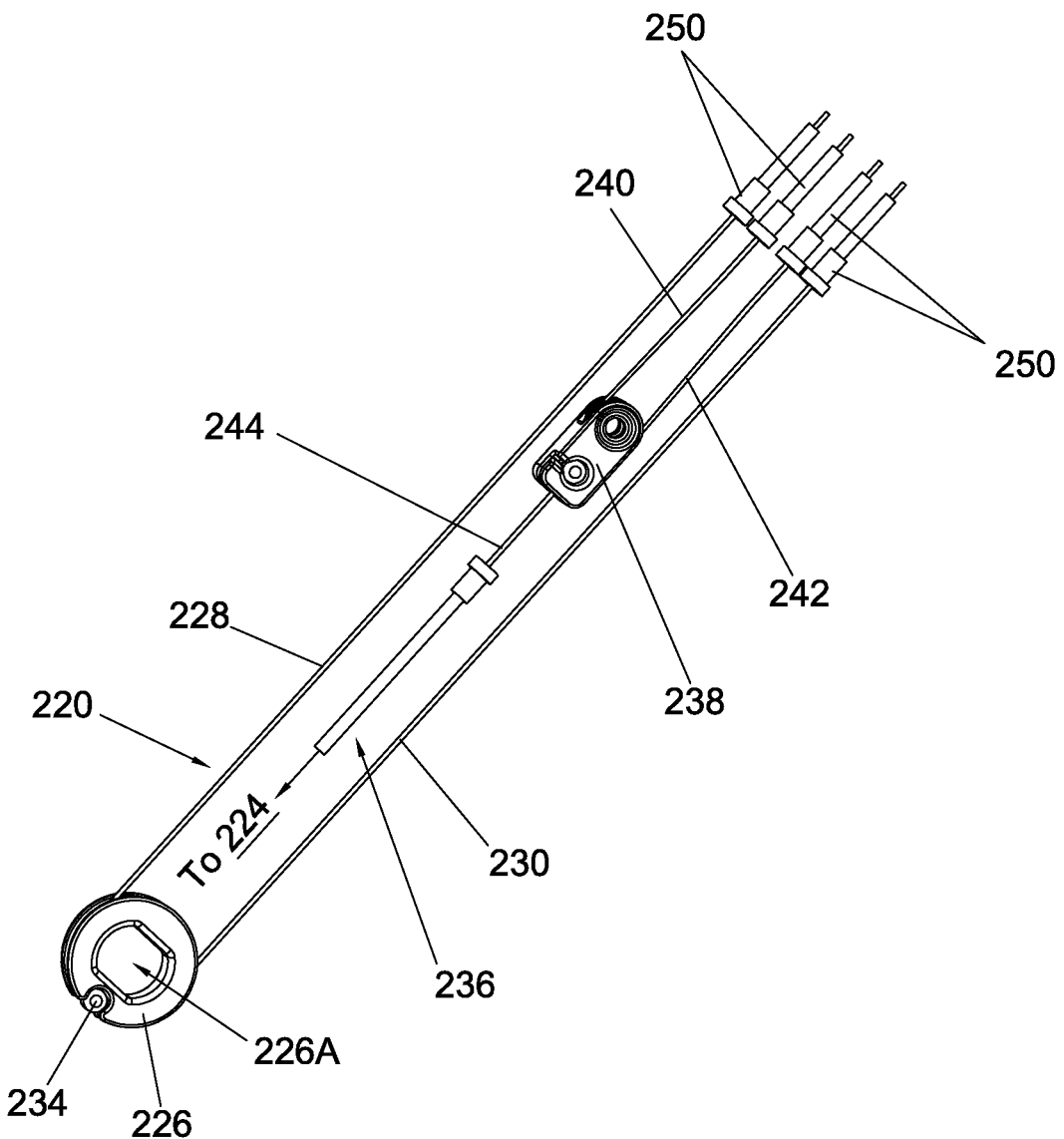
FIG. 39 is a perspective view illustrating another variant construction of the actuating assembly shown in FIG. 37.

According to an example of construction, the cable assembly 236 can include a sliding part 238, two cable portions 240 and 242 connected with the sliding part 238, and a cable 244 respectively connected with the sliding part 238 and the operating part 224. The sliding part 238 can be disposed adjacent to the carrier bar 104, and can slide along a lengthwise axis of the carrier bar 104. The two cable portions 240 and 242 may be provided as two separate cables respectively connected with the sliding part 238, or defined from a single cable that contacts with and loops at the sliding part 238. The cable portion 240 can further be connected with the linking part 228 or the wheel mount latch 40, and the cable portion 242 can further be connected with the linking part 230 or the wheel mount latch 112. FIG. 37 illustrates a construction in which the two cable portions 240 and 242 can be respectively attached to the linking parts 228 and 230 via two fastening members 246. FIG. 38 illustrates a variant construction in which the two cable portions 240 and 242 can respectively have two ends that are respectively connected with the wheel mount latches 40 and 112 redundantly to the linking parts 228 and 230, wherein the cable portion 240 and the linking part 228 may be guided adjacent to each other through a sleeve 248 and the cable portion 242 and the linking part 230 may be guided adjacent to each other through another sleeve 248. FIG. 39 illustrates another variant construction in which the two cable portions 240 and 242 can respectively have two ends that are respectively connected with the wheel mount latches 40 and 112 redundantly to the linking parts 228 and 230, wherein the two linking parts 228 and 230 and the two cable portions 240 and 242 may be respectively guided through four separate sleeves 250 separate from one another.

In the wheeled carrying apparatus 200, the handle frame 14 can be inclined toward the side of the leg frame 20 in the first position and toward the side of the leg frame 22 in the second position. The link actuator 226 can rotate along with the handle frame 14 in the first direction for pulling the linking part 230 and relaxing the linking part 228 when the handle frame 14 rotates from the second position to the first position, which can cause the wheel mount latch 112 to disengage and unlock the wheel mount 34 and cause the wheel mount latch 40 to engage and lock the wheel mount 30. Conversely, the link actuator 226 can rotate along with the handle frame 14 in the second direction for pulling the linking part 228 and relaxing the linking part 230 when the handle frame 14 rotates from the first position to the second position, which can cause the wheel mount latch 40 to disengage and unlock the wheel mount 30 and cause the wheel mount latch 112 to engage and lock the wheel mount 34.

Since the two wheels assemblies 16 and 18 are provided at each of the left and right side of the wheeled carrying apparatus 200, the actuating assembly 220 can be symmetrically arranged at the left and right side and likewise coupled to the operating part 224.

While the handle frame 14 is in the first position and the operating part 224 is released, the wheel mount latch 40 is engaged with the wheel mount 30 to lock the wheel mount 30 to the standing frame 12, and the wheel mount latch 112 is kept disengaged from the wheel mount 34 by an initial distance so that the wheel mount 34 is unlocked for free rotation relative to the standing frame 12. For unlocking the wheel mounts 30 and 34 while the handle frame 14 is in the first position, a caregiver can actuate the operating part 224 to pull the cable assembly 236 and urge the wheel mount latch 40 to disengage from the wheel mount 30 without operation of the link actuator 226. The pulling action applied through the cable assembly 236 can also cause the wheel mount latch 112 to move further away from the wheel mount 34, so that the wheel mount latch 112 still remains disengaged from the wheel mount 34. Accordingly, all of the wheel mounts 30 and 34 can be unlocked at the same time in the first position of the handle frame 14.

While the handle frame 14 is in the second position and the operating part 224 is released, the wheel mount latch 112 is engaged with the wheel mount 34 to lock the wheel mount 34 to the standing frame 12, and the wheel mount latch 40 is kept disengaged from the wheel mount 30 by an initial distance so that the wheel mount 30 is unlocked for free rotation relative to the standing frame 12. For unlocking the wheel mounts 30 and 34 while the handle frame 14 is in the second position, a caregiver can actuate the operating part 224 to pull the cable assembly 236 and urge the wheel mount latch 112 to disengage from the wheel mount 34 without operation of the link actuator 226. The pulling action applied through the cable assembly 236 can also cause the wheel mount latch 40 to move further away from the wheel mount 30, so that the wheel mount latch 40 can still remain disengaged from the wheel mount 30. Accordingly, all of the wheel mounts 30 and 34 can be unlocked at the same time in the first position of the handle frame 14.

FIGS. 40-45 are schematic views illustrating another embodiment of a wheeled carrying apparatus 300 implemented as a child stroller apparatus. Referring to FIGS. 40-45, the wheeled carrying apparatus 300 can have the frame structure 102, the wheel assemblies 16 and 18 and the locking assemblies 39 and 110 described previously with reference to FIGS. 22-24, and can further include an actuating assembly 320 and a release mechanism 322 that substitute for the actuating assemblies and the release mechanisms of the previous embodiments.

Referring to FIGS. 40-45, the actuating assembly 320 can include a link actuator 326, and a linking part 328 coupling the wheel mount latches 40 and 112 to the link actuator 326, the wheel mount latches 40 and 112 being respectively associated with the wheel assemblies 16 and 18 located at a same side (i.e., a left or right side) of the wheeled carrying apparatus 300. The link actuator 326 is disposed adjacent to the handle frame 14, and is rotatable along with the handle frame 14 about the pivot axis R relative to the standing frame 12 and the bar linkage 28. According to an example of construction, the link actuator 326 can be pivotally connected with the standing frame 12 or the bar linkage 28 about the pivot axis R. For example, the bar 28A of the bar linkage 28 can have a cavity 330, and the link actuator 326 can be pivotally assembled in the cavity 330 so as to be rotatable as a unitary part about the pivot axis R. Examples of suitable structures for the link actuator 326 may include, without limitation, a rotary plate, a lever and the like.

Figure 40:
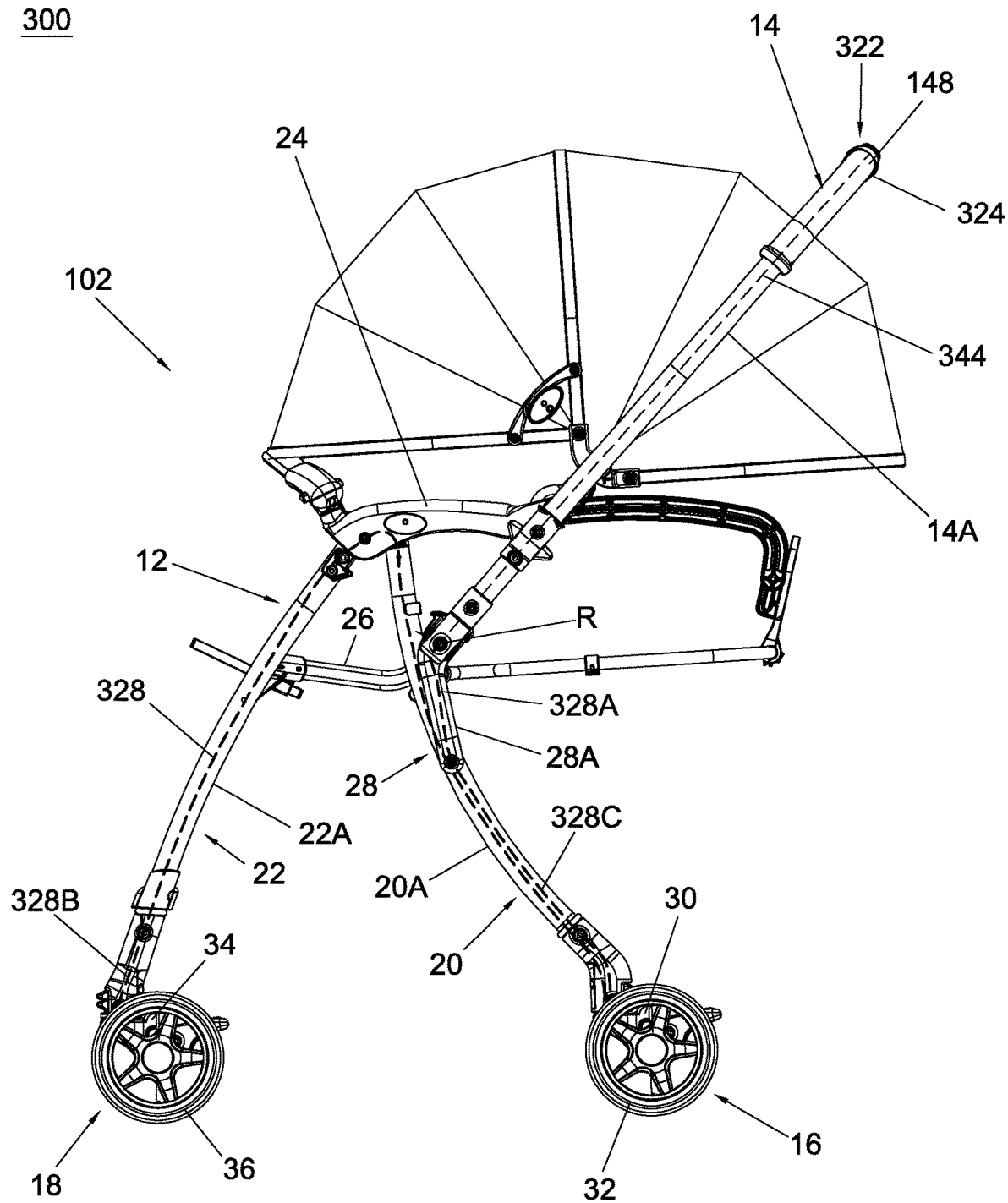
FIG. 40 is a side view illustrating the wheeled carrying apparatus provided with another actuating assembly and release mechanism.
Figure 41:
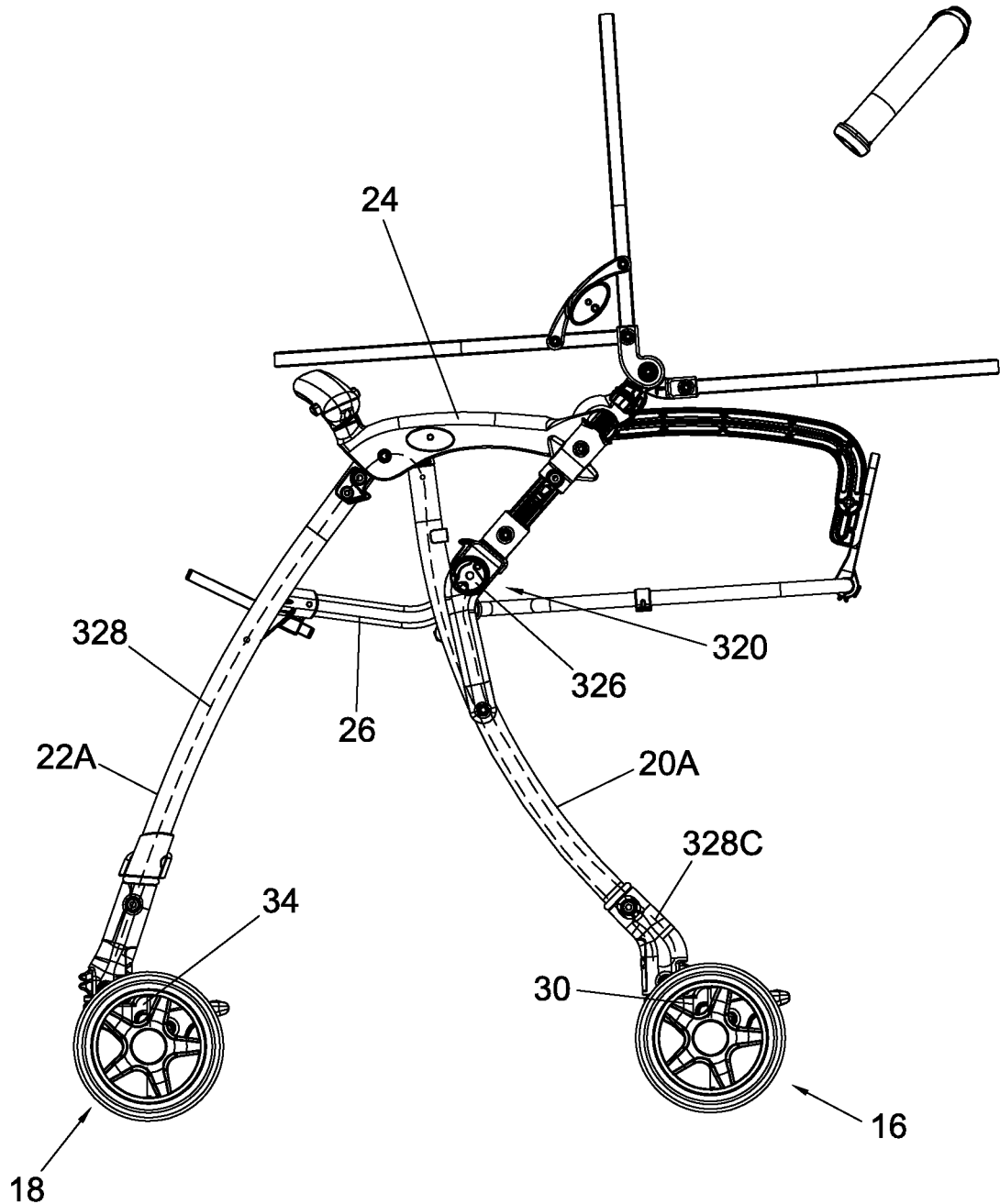
FIG. 41 is a schematic view illustrating some construction details of the actuating assembly provided in the wheeled carrying apparatus of FIG. 40.

Like previously described, the handle frame 14 can rotate about the pivot axis R relative to the standing frame 12 and the bar linkage 28 between a first position inclined toward the side of the leg frame 20 (as shown in FIG. 40) and a second position inclined toward the side of the leg frame 22. A coupling part 332 may be provided on the handle frame 14 so that a rotation of the handle frame 14 between the first and second position can cause the coupling part 332 carried with the handle frame 14 to contact and urge the link actuator 326 to rotate with the handle frame 14. According to an example of construction, the coupling part 332 can include a pin portion, and can be slidably connected with the side portion 14A of the handle frame 14. The coupling part 332 may be slidable relative to the handle frame 14 along a lengthwise axis of the side portion 14A. The link actuator 326 may have an indentation 334 defined between two sidewalls 334A and 334B, and the coupling part 332 may be in sliding contact with any of the two sidewalls 334A and 334B. According to an example of construction, a spring 336 may be provided to bias the coupling part 332 toward the interior of the indentation 334, wherein the spring 336 may have two ends respectively connected with the coupling part 332 and the side portion 14A of the handle frame 14. The biasing force applied by the spring 336 can help to keep the coupling part 332 in contact with the link actuator 326.

Figure 44:
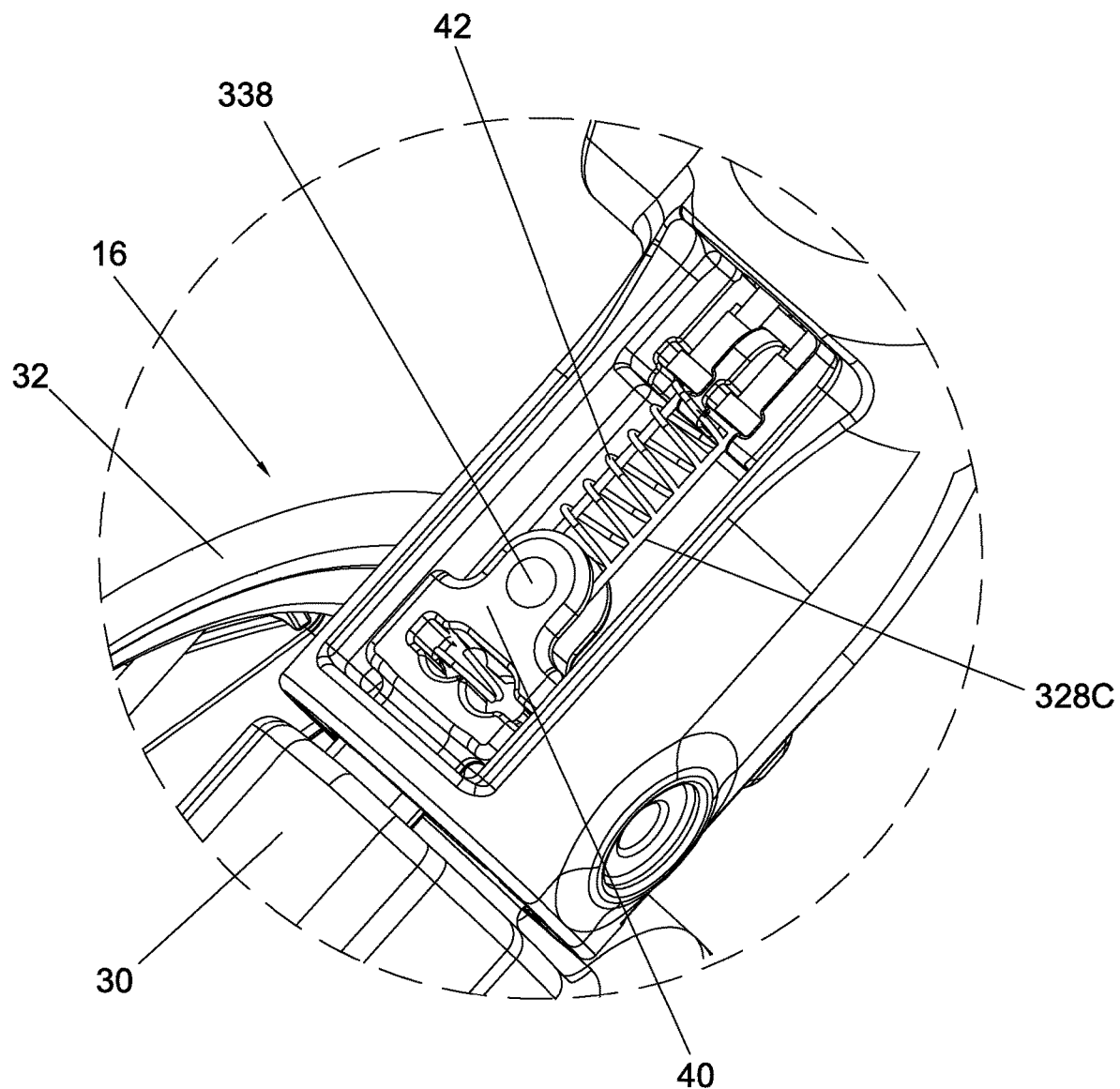
FIG. 44 is an enlarged view illustrating a wheel assembly provided in the wheeled carrying apparatus of FIG. 40.

Referring to FIGS. 40-45, the linking part 328 can loop at the wheel mount latch 40 of the leg frame 20, and can have two ends 328A and 328B respectively anchored to the link actuator 326 and the wheel mount latch 112 of the leg frame 22. According to an example of construction, the linking part 328 can include a continuous cable, which has an intermediate portion 328C looped at the wheel mount latch 40, is routed along the side segment 20A of the leg frame 20 and the side segment 22A of the leg frame 22, and has the two ends 328A and 328B respectively anchored to the the link actuator 326 and the wheel mount latch 112 of the leg frame 22. FIG. 44 illustrates the intermediate portion 328C of the linking part 328 looping around a shaft 338 attached to the wheel mount latch 40. Accordingly, the linking part 328 can be in sliding contact with the wheel mount latch 40.

Figure 45:
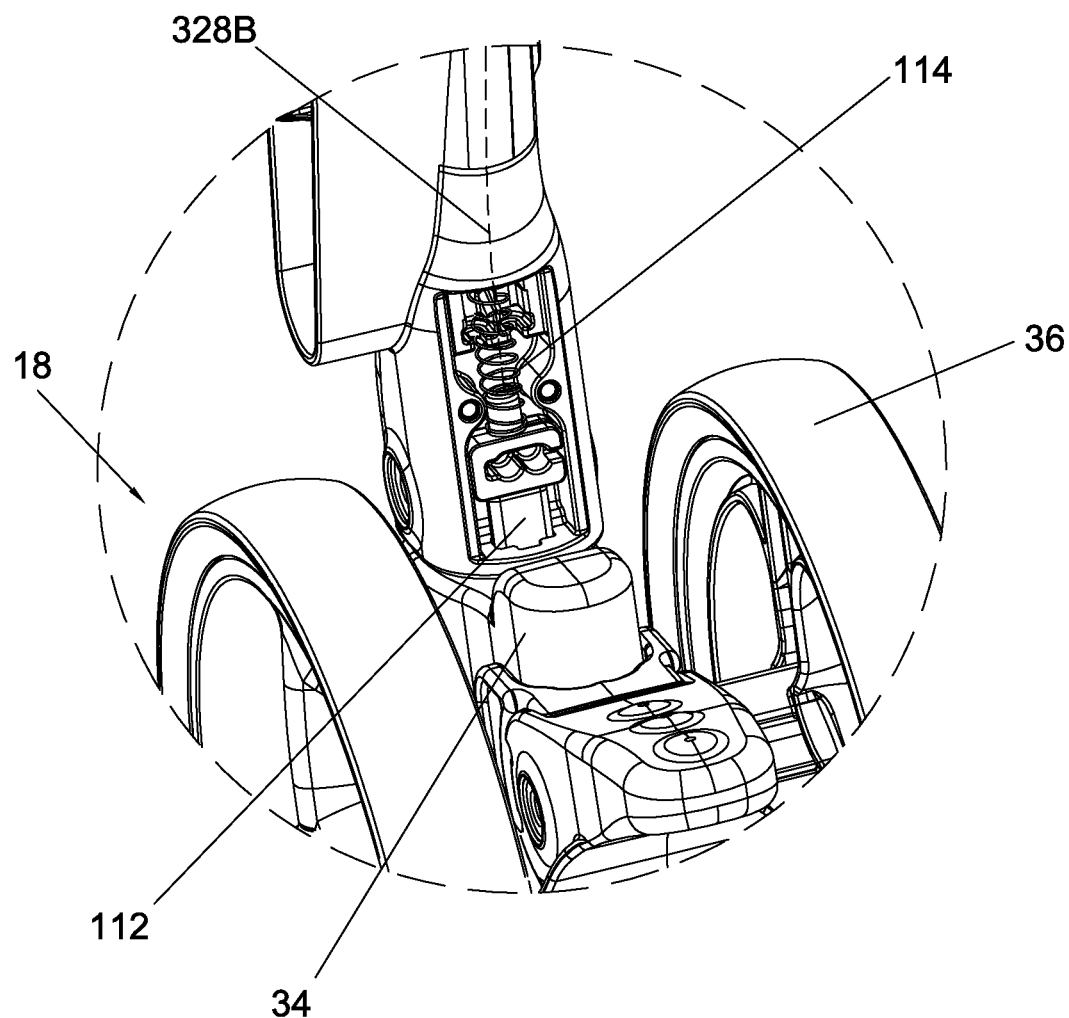
FIG. 45 is an enlarged view illustrating another wheel assembly provided in the wheeled carrying apparatus of FIG. 40.

Referring to FIGS. 44 and 45, the locking spring 42 connected with the wheel mount latch 40 is configured to apply a biasing force for urging the wheel mount latch 40 to engage with the wheel mount 30. This biasing force of the locking spring 42 is greater than the biasing force applied by the locking spring 114 on the wheel mount latch 112 for urging the wheel mount latch 112 to engage with the wheel mount 34. As a result, two different tensioning forces may be respectively applied on the end 328B and the intermediate portion 328C of the linking part 328. This results in the link actuator 326 being rotationally biased in a direction that tends to displace the sidewall 334A of the indentation 334 toward the coupling part 332.

With the aforementioned construction, the link actuator 326 can rotate along with the handle frame 14 to switch the locking state between the wheel mounts 30 and 34 when the handle frame 14 rotates between the first position inclined toward the side of the leg frame 20 and the second position inclined toward the side of the leg frame 22. For example, when the handle frame 14 rotates from the second position to the first position, the link actuator 326 can rotate along with the handle frame 14 owing to the biasing force applied by the locking spring 42 in a first direction to pull the end 328B of the linking part 328 and urge the wheel mount latch 112 to disengage from the wheel mount 34 and concurrently relax the intermediate portion 328C of the linking part 328 so that the wheel mount latch 40 can engage with the wheel mount 30. The rotational displacement of the link actuator 326 in the first direction may be stopped by the contact between a rib 340 provided on the link actuator 326 and a stop protrusion 342 provided in the cavity 330, which can correspond to the first position of the handle frame 14. When the handle frame 14 is in the first position, the wheel mount 30 thus can be locked to the standing frame 12 and the wheel mount 34 unlocked for free rotation relative to the standing frame 12.

Conversely, when the handle frame 14 rotates from the first position to the second position, the coupling part 332 carried with the handle frame 14 can contact with the sidewall 334A of the indentation 334 and urge the link actuator 326 to rotate along with the handle frame 14 in a second direction opposite to the first direction against the biasing force of the locking spring 42. This rotational displacement of the link actuator 326 in the second direction can pull the intermediate portion 328C of the linking part 328 and urge the wheel mount latch 40 to disengage from the wheel mount 30 and concurrently relax the end 328B of the linking part 328 so that the wheel mount latch 112 can engage with the wheel mount 34 under the biasing force of the locking spring 114. When the handle frame 14 is in the second position, the wheel mount 34 thus can be locked to the standing frame 12 and the wheel mount 30 unlocked for free rotation relative to the standing frame 12.

Figure 42:
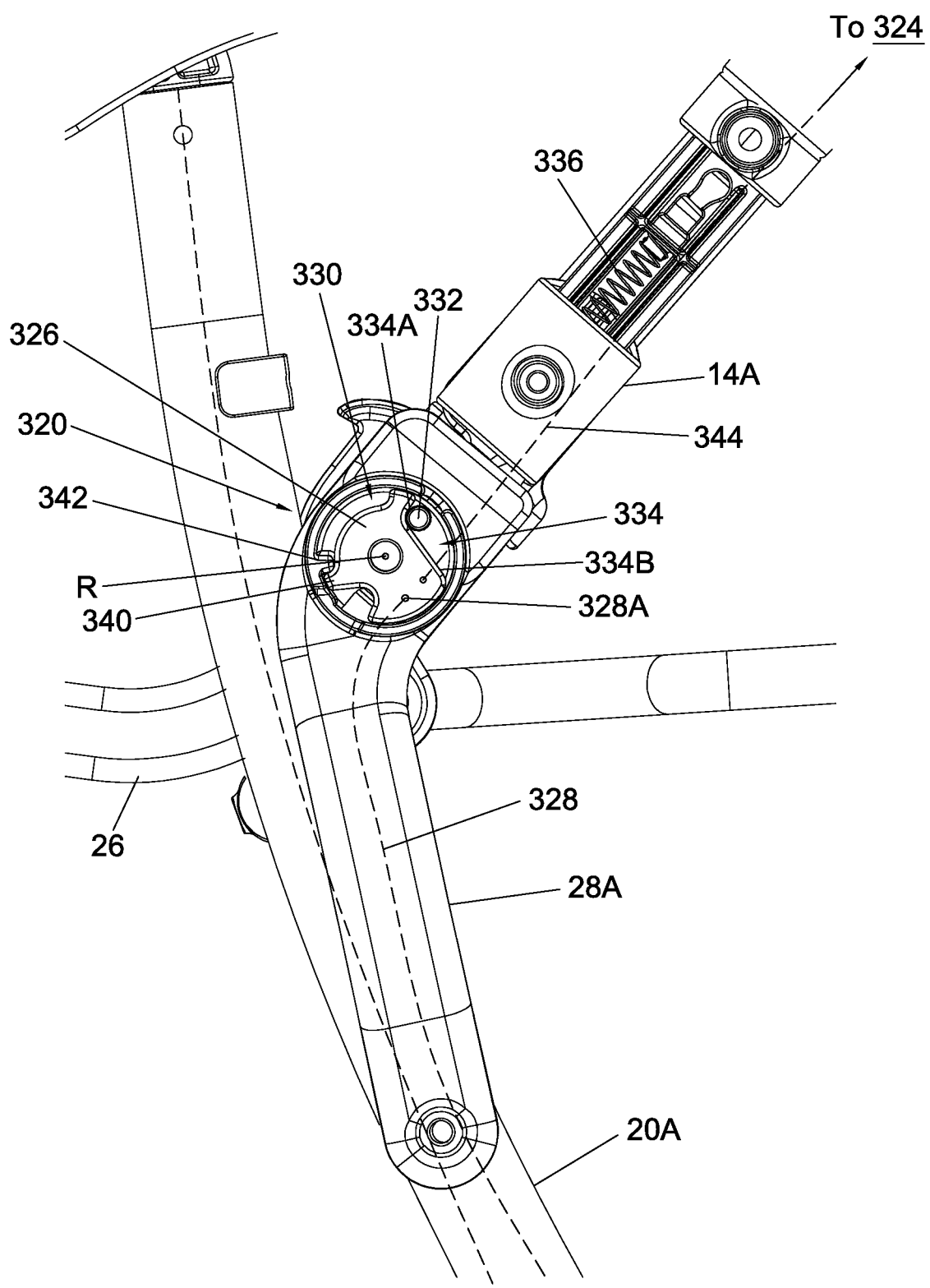
FIG. 42 is a schematic view illustrating a portion of the actuating assembly and a portion of the release mechanism provided in the wheeled carrying apparatus of FIG. 40.
Figure 43:
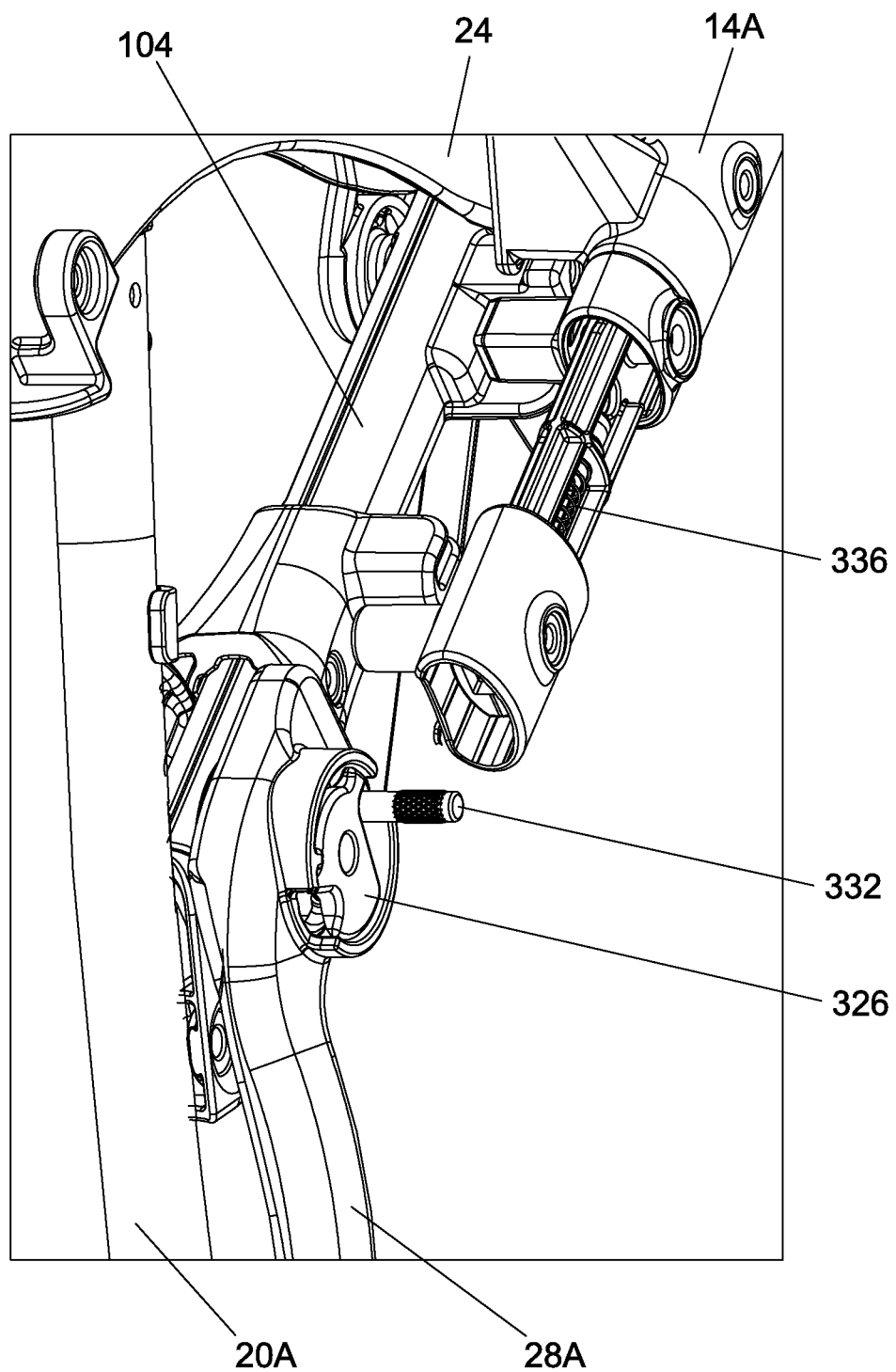
FIG. 43 is a perspective view illustrating a portion of the actuating assembly and a portion of the release mechanism provided in the wheeled carrying apparatus of FIG. 40.

Referring to FIGS. 40 and 42, the release mechanism 322 can include an operating part 324 provided on the grip portion 14B of the handle frame 14, which may be similar to the previous operating part 124 in construction. The release mechanism 322 is likewise operable while the handle frame 14 is in any of the first and second position to cause the wheel mounts 30 and 34 to be unlocked at the same time. According to an example of construction, the operating part 324 may be connected with the link actuator 326 via a cable 344. The operating part 324 is thereby operable in any of the first and second position of the handle frame 14 to pull the cable 344 and cause the link actuator 326 to rotate in one of the first and second direction for unlocking the wheel mounts 30 and 34 at the same time, wherein the coupling part 332 can be in sliding contact with the sidewall 334B of the indentation 334 in the link actuator 326 during the rotation of the link actuator 326 induced by the actuation of the operating part 324. For example, while the handle frame 14 is in the first position, actuation of the operating part 324 can cause the link actuator 326 to rotate in the second direction and pull the linking part 328 so that the wheel mount latch 40 is urged to move and disengage from the wheel mount 30. This rotational displacement of the link actuator 326 induced by the actuation of the operating part 324 is limited and less than the rotational displacement of the link actuator 326 occurring when the handle frame 14 is switched from the first position to the second position, so the wheel mount latch 112 can remain disengaged from the wheel mount 34. Accordingly, all of the wheel mounts 30 and 34 can be unlocked at the same time while the handle frame 14 is in the first position.

While the handle frame 14 is in the second position, actuation of the operating part 324 can likewise cause the link actuator 326 to rotate in the second direction and pull the linking part 328 to slide through the wheel mount latch 40 kept disengaged from the wheel mount 30, whereby the linking part 328 can consequently pulls the wheel mount latch 112 to disengage from the wheel mount 34. Accordingly, all of the wheel mounts 30 and 34 can be unlocked at the same time while the handle frame 14 is in the second position.

According to a variant construction, rather than coupling the operating part 324 to the link actuator 326 via the cable 344, the actuating assembly 320 can incorporate the cable assembly 236 described previously with reference to FIGS. 37-39, which can be configured to operatively couple the operating part 324 to the wheel mount latches 40 and 112 while being operatively decoupled from the link actuator 326. For example, the cable 244 of the cable assembly 236 can be respectively connected with the sliding part 238 and the operating part 324, the cable portion 240 can be connected with the wheel mount latch 40 or a first portion of the linking part 328 extending along the side segment 20A of the leg frame 20, and the cable portion 242 can be connected with the wheel mount latch 112 or a second portion of the linking part 328 extending along the side segment 22A of the leg frame 22, the first and second portions being folded relative to each other. With this variant construction, the operating part 324 can be likewise actuated while the handle frame 14 is in any of the first and second position to pull the cable assembly 236, which can in turn pull the wheel mount latches 40 and 112 to disengage and unlock the wheel mounts 30 and 34 independently of the link actuator 326.

Since the two wheels assemblies 16 and 18 are provided at each of the left and right side of the wheeled carrying apparatus 300, the actuating assembly 320 can be symmetrically arranged at the left and right side and likewise coupled to the operating part 324.

FIGS. 46-49 are schematic views illustrating another embodiment of a wheeled carrying apparatus 400 implemented as a child stroller apparatus. Referring to FIGS. 46-49, the wheeled carrying apparatus 400 can have the frame structure 102, the wheel assemblies 16 and 18 and the locking assemblies 39 and 110 described previously with reference to FIGS. 22-24, and can further include an actuating assembly 420 and a release mechanism 422 that substitute for the actuating assemblies and the release mechanisms of the previous embodiments.

Referring to FIGS. 46-49, the actuating assembly 420 can include a link actuator 426 movably connected with the standing frame 12, a linking part 428 coupling the wheel mount latch 40 to the link actuator 426, a linking part 430 coupling the wheel mount latch 112 to the link actuator 426, and a spring 432, the wheel mount latches 40 and 112 being respectively associated with the wheel assemblies 16 and 18 located at a same side (i.e., a left or right side) of the wheeled carrying apparatus 400. The link actuator 426 can move in a first direction to pull the linking part 430 and urge the wheel mount latch 112 to disengage from the wheel mount 34 and concurrently relax the linking part 428 so that the wheel mount latch 40 can engage with the wheel mount 30, and in a second direction opposite to the first direction to pull the linking part 428 and urge the wheel mount latch 40 to disengage from the wheel mount 30 and concurrently relax the linking part 430 so that the wheel mount latch 112 can engage with the wheel mount 34, the link actuator 426 being movable in the first direction or the second direction in response to a rotation of the handle frame 14 relative to the standing frame 12 between the first position and the second position of different inclinations. According to an example of construction, the link actuator 426 can be slidably connected with the standing frame 12, and can slide as a unitary part relative to the standing frame 12 in the first and second direction. For example, the carrier bar 104 can have a guide slot 434, and the link actuator 426 can be guided for sliding along the guide slot 434. Moreover, the link actuator 426 can be exposed and protrude outward from the carrier bar 104 for operatively interacting with the handle frame 14.

Figure 47:
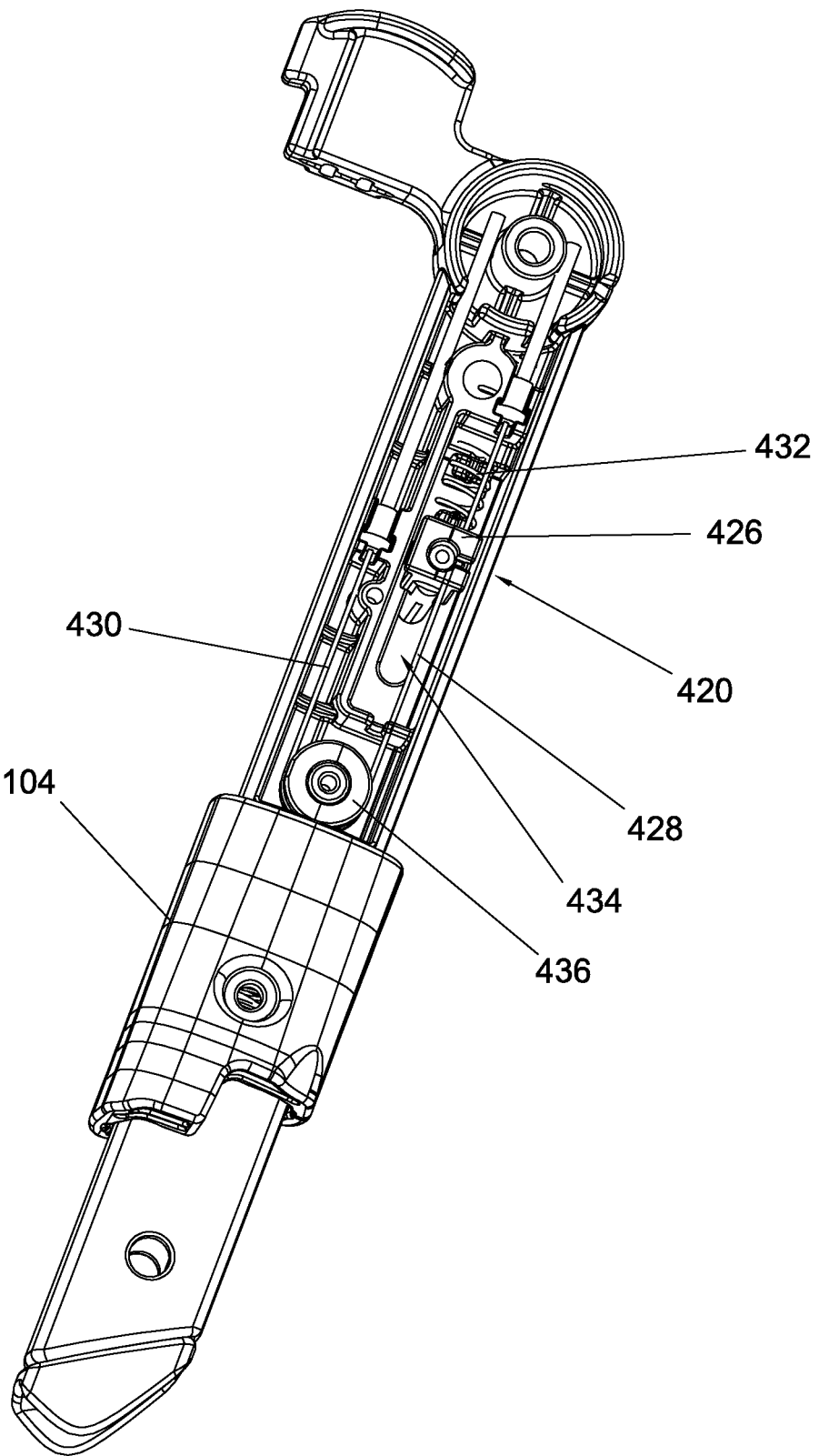
FIG. 47 is a perspective view illustrating some construction details of the actuating assembly provided in the wheeled carrying apparatus of FIG. 46.
Figure 48:
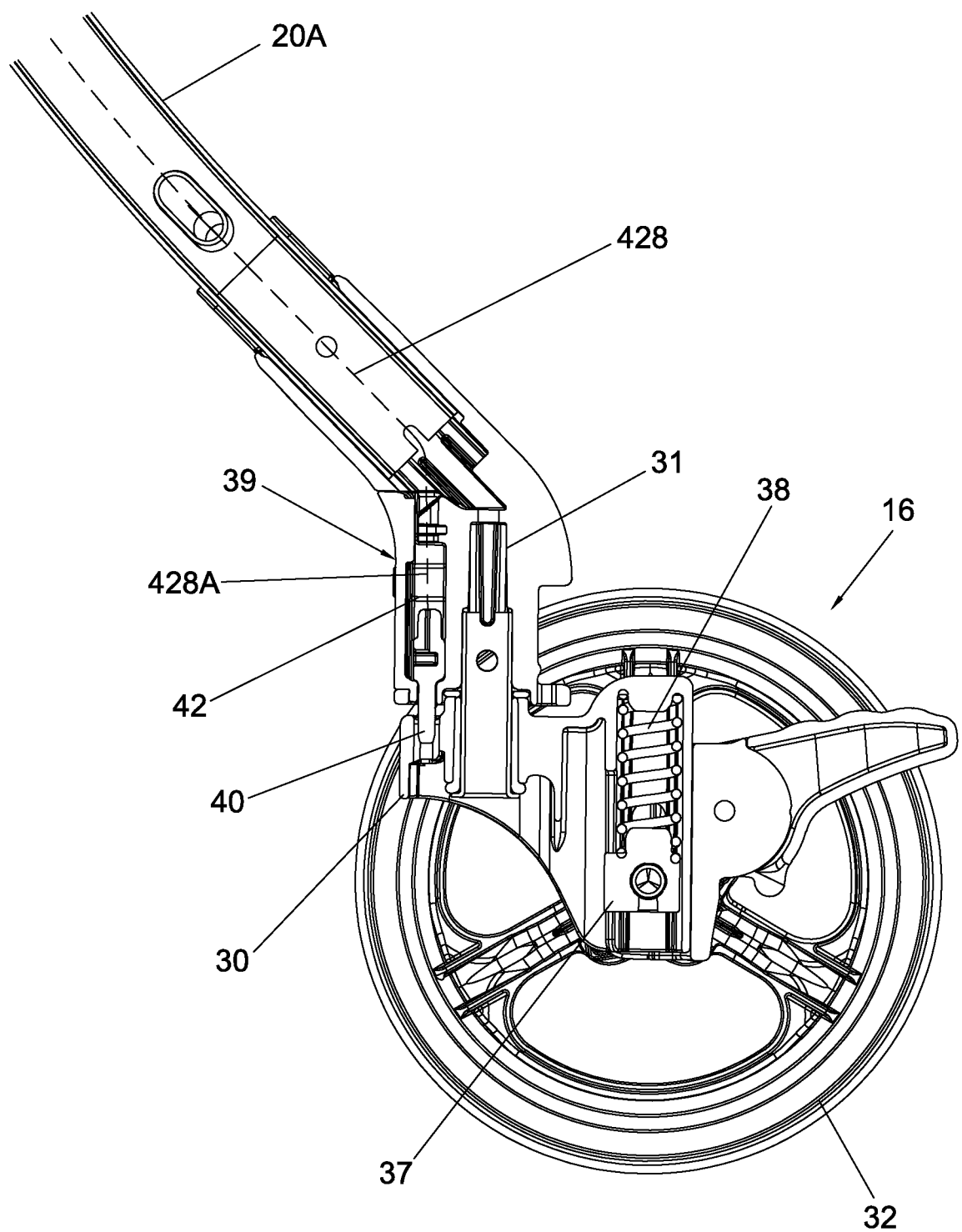
FIG. 48 is a cross-sectional view illustrating a linking part of the actuating assembly coupled to a wheel mount latch of a wheel assembly in the wheeled carrying apparatus of FIG. 46.
Figure 49:
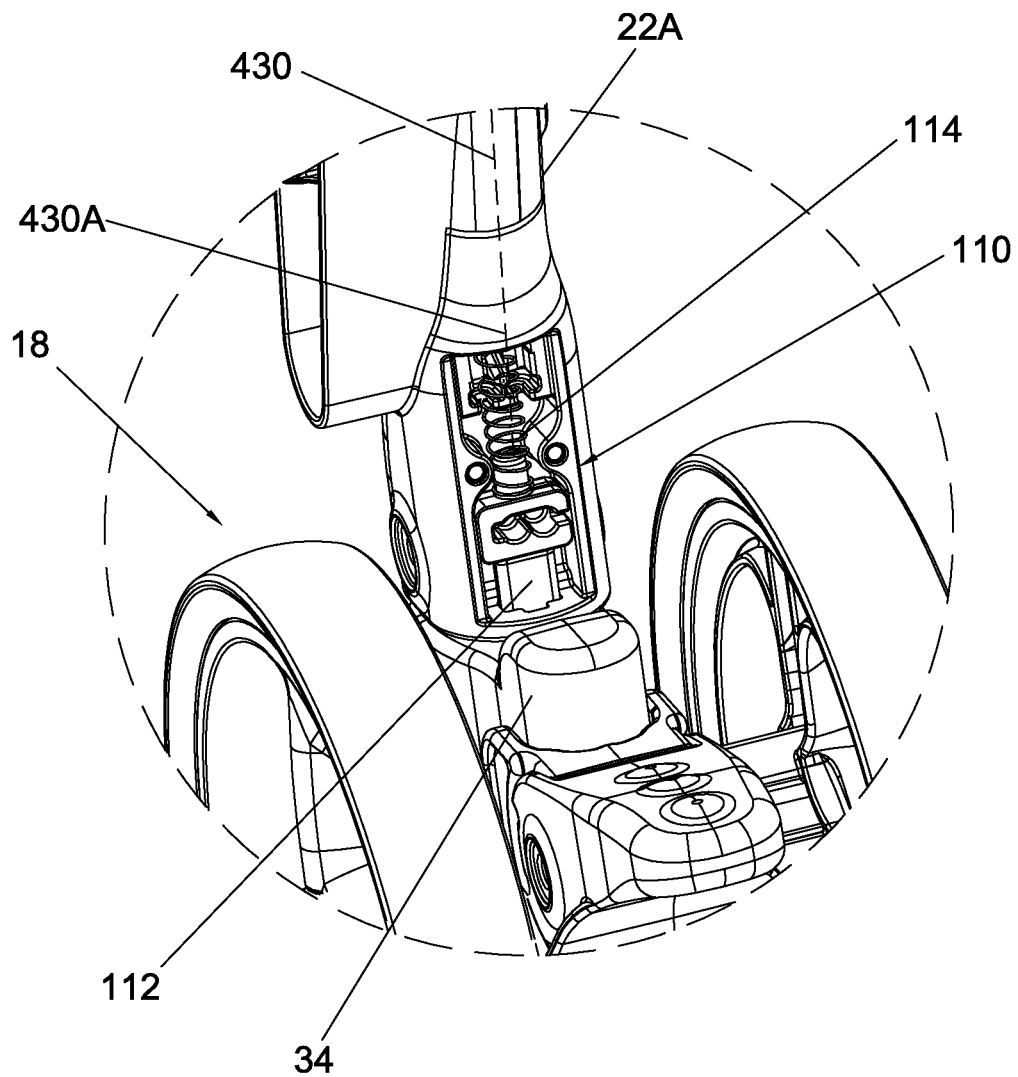
FIG. 49 is a cross-sectional view illustrating another linking part of the actuating assembly coupled to a wheel mount latch of another wheel assembly in the wheeled carrying apparatus of FIG. 46.

Referring to FIG. 47, the two linking parts 428 and 430 can include cable portions provided as separate cables or defined from a single cable, and can be routed along the standing frame 12. According to an example of construction, the two linking parts 428 and 430 can be formed by a single continuous cable. This cable can loop around a guide member 436 connected with the carrier bar 10, can extend alongside the guide slot 434, and can be fixedly connected with the link actuator 426. The two linking parts 428 and 430 defined from the cable can extend at two sides of the guide member 436. The linking part 428 can exemplarily extend from the carrier bar 104 along the side linking bar 24 and the side segment 20A of the leg frame 20, and can have an end 428A anchored to the wheel mount latch 40. The linking part 430 can exemplarily extend from the carrier bar 104 along the side linking bar 24 and the side segment 22A of the leg frame 22, and can have an end 430A anchored to the wheel mount latch 112. The linking parts 428 and 430 may extend substantially parallel to each other along the carrier bar 104. In this manner, the link actuator 426 is slidable along the guide slot 434 relative to the standing frame 12 in a first direction to pull the linking part 430 and urge the wheel mount latch 112 to disengage and unlock the wheel mount 34 and concurrently relax the linking part 428 so that the wheel mount latch 40 is allowed to engage and lock the wheel mount 30, and in a second direction opposite to the first direction to pull the linking part 428 and urge the wheel mount latch 40 to disengage and unlock the wheel mount 30 and concurrently relax the linking part 430 so that the wheel mount latch 112 is allowed to engage and lock the wheel mount 34.

The spring 432 can be connected with the link actuator 426, and can apply a biasing force on the link actuator 426 for urging the link actuator 426 to slide in the second direction. According to an example of construction, the spring 432 can have two ends respectively connected with the link actuator 426 and an anchor structure provided on the carrier bar 104.

Like previously described, the handle frame 14 of the wheeled carrying apparatus 400 is rotatable about the pivot axis R relative to the standing frame 12 and the bar linkage 28 between a first position inclined toward the side of the leg frame 20 and a second position inclined toward the side of the leg frame 22. A rotation of the handle frame 14 from the second position to the first position can cause the side portion 14A of the handle frame 14 to contact and urge the link actuator 426 to move in the first direction against the biasing force of the spring 432. For example, the side portion 14A of the handle frame 14 can be provided with a protrusion (not shown) that can contact and urge the link actuator 426 to move in the first direction when the handle frame 14 rotates to the first position. When the handle frame 14 is in the first position, the wheel mount 30 thus can be locked to the standing frame 12 and the wheel mount 34 unlocked for free rotation relative to the standing frame 12.

Conversely, a rotation of the handle frame 14 from the first position to the second position can cause the side portion 14A of the handle frame 14 to move away out of contact with the link actuator 426 so that the link actuator 426 can move in the second direction under the biasing force of the spring 432. When the handle frame 14 is in the second position, the wheel mount 34 thus can be locked to the standing frame 12 and the wheel mount 30 unlocked for free rotation relative to the standing frame 12.

Figure 46:
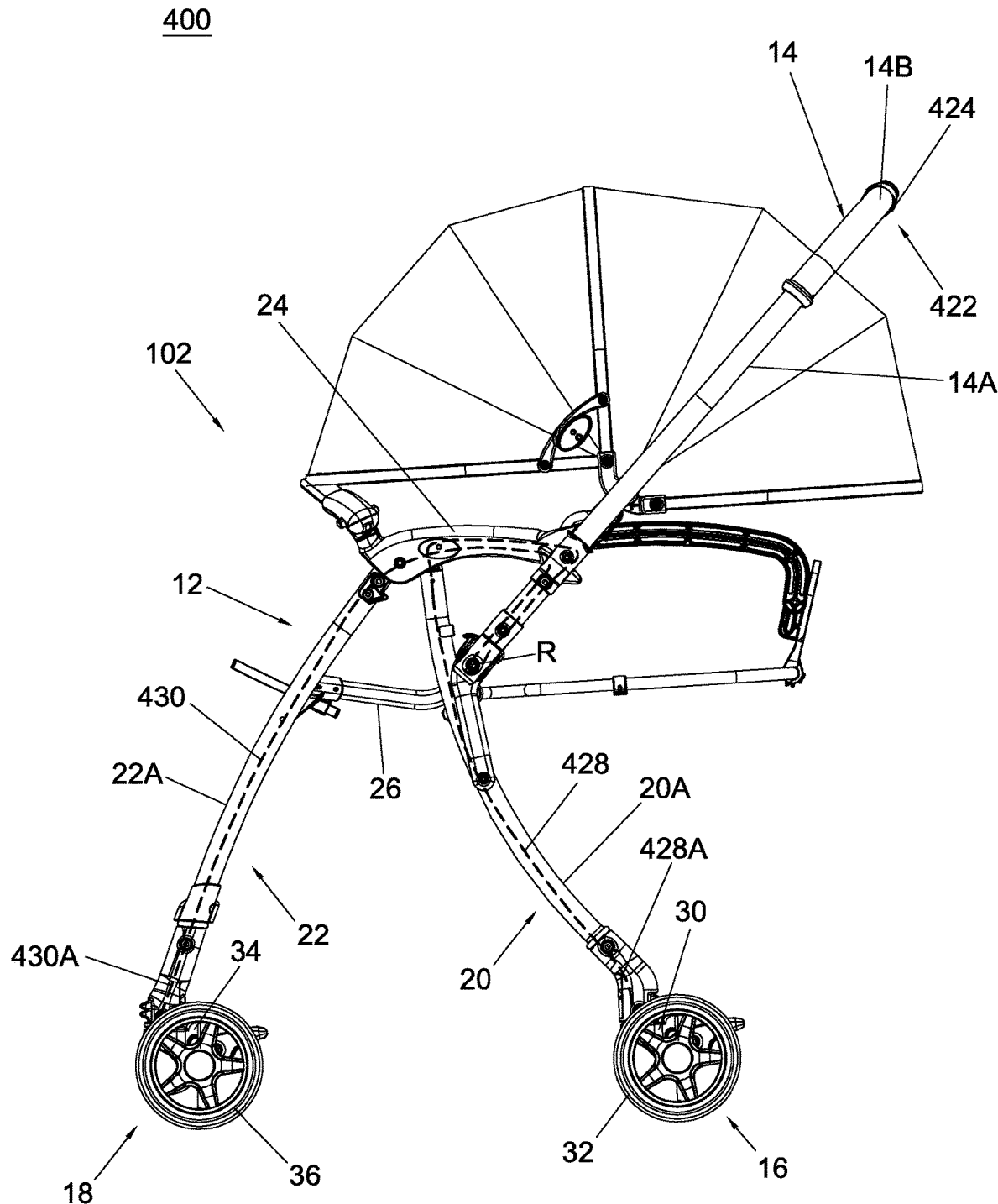
FIG. 46 is a side view illustrating the wheeled carrying apparatus provided with another actuating assembly.

Referring to FIG. 46, the release mechanism 422 can include an operating part 424 provided on the grip portion 14B of the handle frame 14, which may be similar to the previously-described operating part 124 in construction. The release mechanism 422 is likewise operable while the handle frame 14 is in any of the first and second position to cause the wheel mounts 30 and 34 to be unlocked at the same time. To this end, the actuating assembly 420 can further incorporate the cable assembly 236 described previously with reference to FIGS. 37-39, which is not shown in FIGS. 46 and 47 for the sake of clarity. The cable assembly 236 used in the wheeled carrying apparatus 400 can be configured to operatively couple the operating part 424 to the wheel mount latches 40 and 112 while being operatively decoupled from the link actuator 426. For example, the cable 244 of the cable assembly 236 can be respectively connected with the sliding part 238 and the operating part 424, the cable portion 240 can be connected with the wheel mount latch 40 or the linking part 428, and the cable portion 242 can be connected with the wheel mount latch 112 or the linking part 430. Accordingly, the operating part 424 can be likewise actuated while the handle frame 14 is in any of the first and second position to pull the cable assembly 236, which can in turn pull the wheel mount latches 40 and 112 to disengage and unlock the wheel mounts 30 and 34 independently of the link actuator 426.

Since the two wheels assemblies 16 and 18 are provided at each of the left and right side of the wheeled carrying apparatus 400, the actuating assembly 420 can be symmetrically arranged at the left and right side and likewise coupled to the operating part 424.

According to a variant embodiment, the actuating assembly provided in the wheeled carrying apparatus 400 may include a link actuator disposed adjacent to the handle frame 14 or the standing frame 12, and a linking part having an intermediate portion that loops at the link actuator and a first and a second end respectively anchored to the wheel mount latch 40 and the wheel mount latch 112, wherein the link actuator is rotatable along with the handle frame 14 or the standing frame 12 in a first direction to actuate the second end of the linking part, and particular push or pull the second end of the linking part, and to urge the wheel mount latch 112 to disengage from the second wheel mount 34 and concurrently relax the intermediate portion of the linking part for engagement of the wheel mount latch 40 with the first wheel mount 30, and the link actuator is rotatable along with the handle frame 14 in a second direction opposite to the first direction to actuate the intermediate portion of the linking part, in particular push or pull the intermediate portion of the linking part, and to urge the wheel mount latch 40 to disengage from the wheel mount 30 and concurrently relax the second end of the linking part for engagement of the wheel mount latch 112 with the wheel mount 34. In this variant embodiment, the actuating assembly may further include a cable assembly (e.g., such as the cable assembly 236 shown in FIGS. 37-39) that operatively couples the operating part 424 to the wheel mount latches 40 and 112 and is operatively decoupled from the link actuator, the operating part 424 being operable to actuate the cable assembly, in particular to push or pull the cable assembly, so that the wheel mount latches 40 and 112 are respectively disengaged from the wheel mounts 30 and 34. In this variant embodiment, the cable assembly may be similar to the cable assembly 236 described previously with reference to FIGS. 37-39, and include a sliding part, a first and a second cable portion connected with the sliding part, and a third cable connected with the sliding part and the operating part 424, the first cable portion further being connected with the wheel mount latch 40 or a first portion of the linking part, the second cable portion further being connected with the wheel mount latch 112 or a second portion of the linking part, the first and second portions of the linking part being folded relative to each other.

FIGS. 50-61 are schematic views illustrating another embodiment of a wheeled carrying apparatus 500 implemented as a child stroller apparatus. Referring to FIGS. 50-61, the wheeled carrying apparatus 500 can include a frame structure 502 comprised of a standing frame 512 and a handle frame 514 coupled to each other, and a plurality of wheel assemblies 516 and 518 provided at a bottom of the standing frame 512. The standing frame 512 can include two leg frames 520 and 522 pivotally connected with each other. Each of the leg frames 520 and 522 can respectively include two side segments disposed symmetrically at a left and a right side of the standing frame 512, e.g., two side segments 520A for the leg frame 520 and two side segments 522A for the leg frame 522, and a transversal segment fixedly connected with the two side segments, e.g., a transversal segment 520B fixedly connected with the two side segments 520A for the leg frame 520, and a transversal segment 522B fixedly connected with the two side segments 522A for the leg frame 522. At each of the left and right sides, the side segment 520A of the leg frame 520 and the side segment 522A of the leg frame 522 can be respectively pivotally connected with each other, whereby the leg frames 520 and 522 can rotate relative to each other about a pivot axis P during folding and unfolding of the wheeled carrying apparatus 500.

The handle frame 514 can be pivotally coupled to the standing frame 512 about the pivot axis P. More specifically, the handle frame 514 can include two side portions 514A disposed symmetrically at the left and right sides, and a grip portion 514B connected with the two side portions 514A. At each of the left and right sides, the side portion 514A of the handle frame 14 can be pivotally connected with the standing frame 512. For example, at each of the left and the right side, the standing frame 512 can include a coupling part 524, and the handle frame 514 can include a coupling part 526 that is pivotally connected with the coupling part 524 about the pivot axis P. The coupling part 524 may be exemplarily a housing fixedly connected with the side segment 520A of the leg frame 520 or the side segment 522A of the leg frame 522, and the coupling part 526 can be exemplarily a shell fixedly connected with the side portion 514A of the handle frame 514. With this construction, the handle frame 514 is rotatable about the pivot axis P relative to the standing frame 512 between a first position inclined toward the side of the leg frame 520 and a second position inclined toward the side of the leg frame 522.

Figure 50:
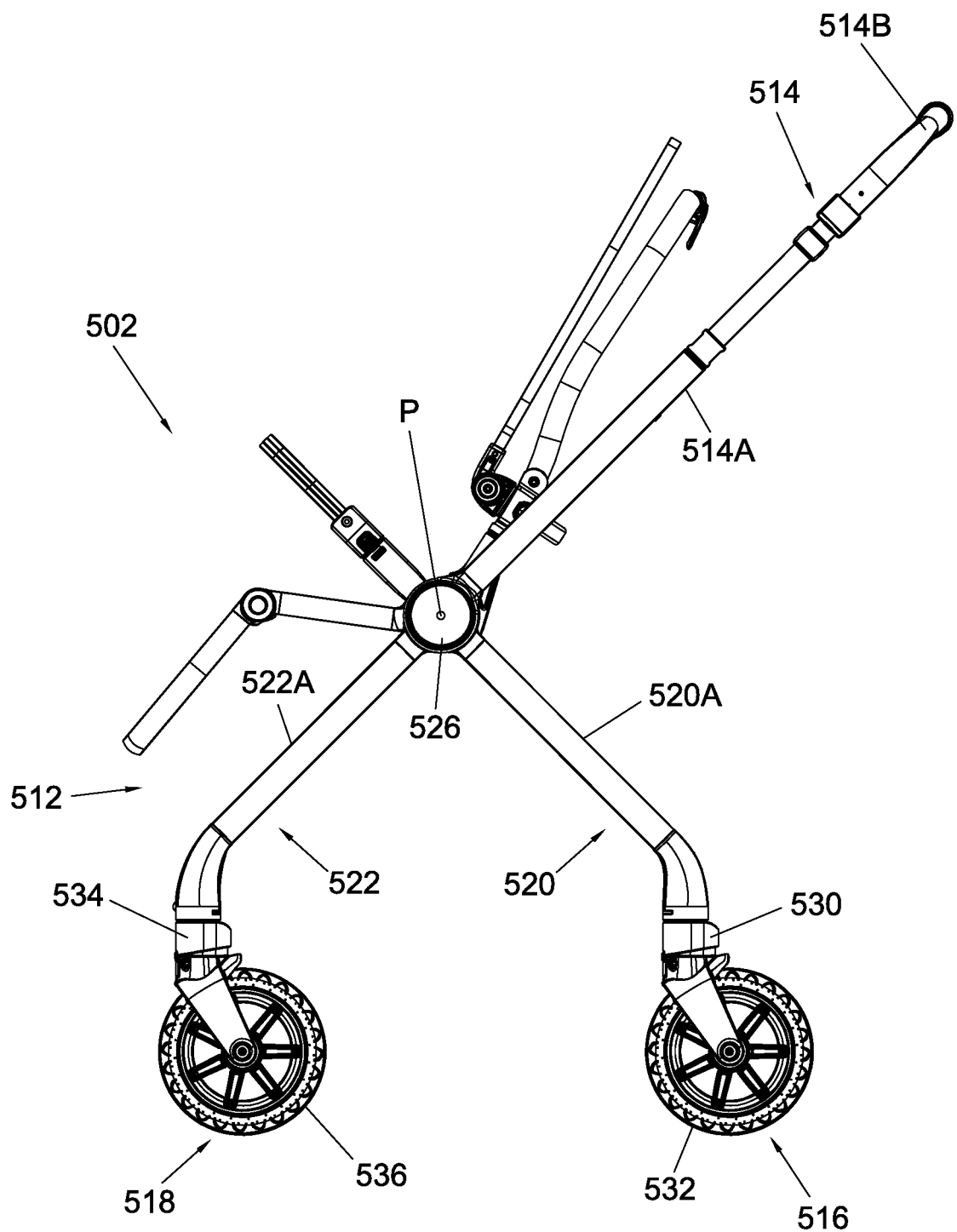
FIG. 50 is a side view illustrating another embodiment of a wheeled carrying apparatus.
Figure 51:
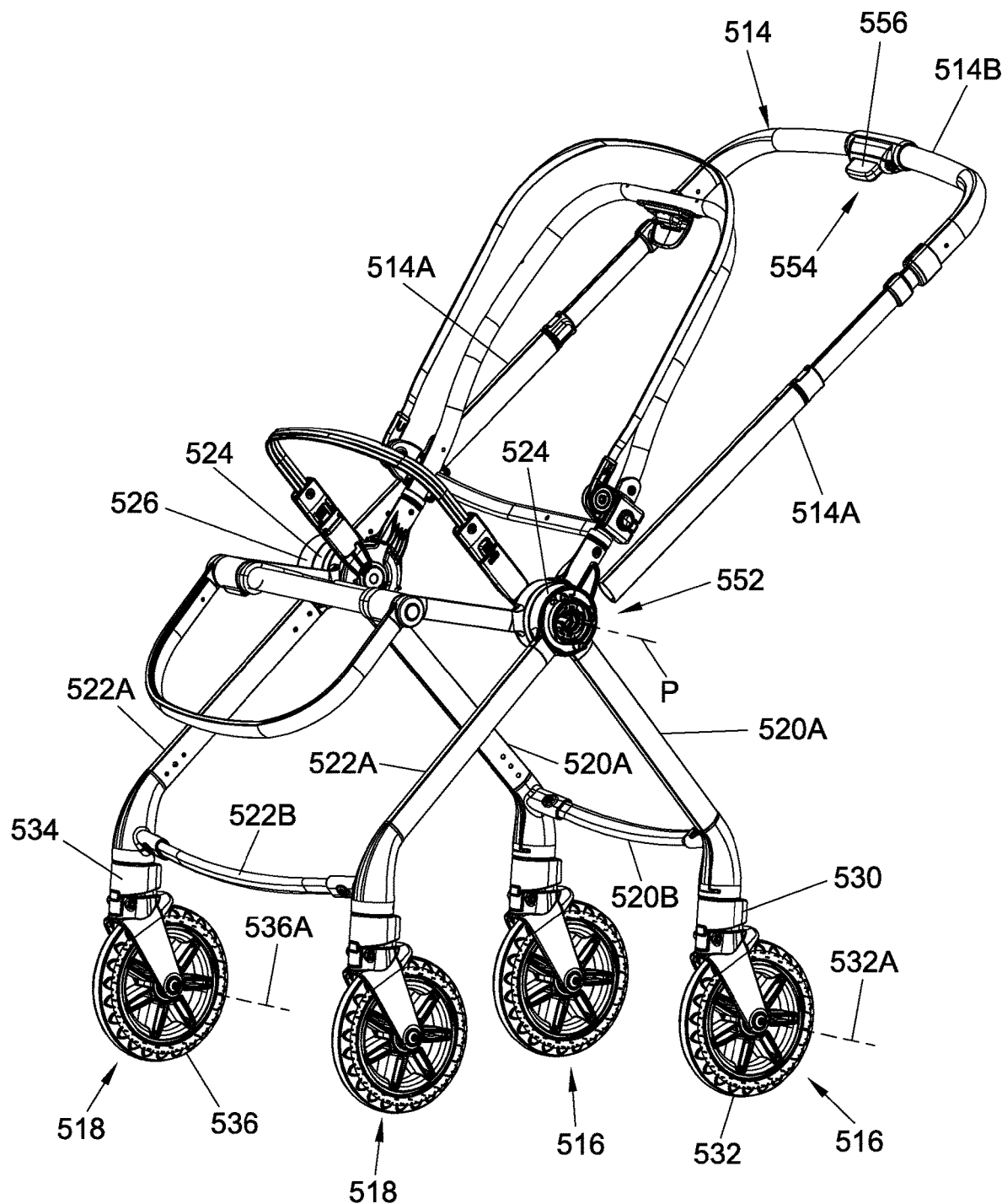
FIG. 51 is a perspective view illustrating an actuating assembly provided in the wheeled carrying apparatus of FIG. 50.

Referring to FIGS. 50 and 51, two wheel assemblies 516 can be provided at the lower ends of the side segments 520A of the leg frame 520, and two wheel assemblies 518 can be respectively provided at the lower ends of the two side segments 522A of the leg frame 522. Each wheel assembly 516 can include a wheel mount 530 that is pivotally connected with the leg frame 520 and carries at least a wheel 532 rotatable relative to the wheel mount 530 about a wheel axis 532A extending generally horizontally, whereby the wheel mount 530 is rotatable relative to the standing frame 512 for changing a horizontal orientation of the wheel axis 532A. Likewise, each wheel assembly 518 can include a wheel mount 534 that is pivotally connected with the leg frame 522 and carries at least a wheel 536 rotatable relative to the wheel mount 534 about a wheel axis 536A extending generally horizontally, whereby the wheel mount 534 is rotatable relative to the standing frame 512 for changing a horizontal orientation of the wheel axis 536A. The wheel mounts 530 are spaced apart from the wheel mounts 534 along a lengthwise axis of the wheeled carrying apparatus 500 extending from a rear to a front thereof.

Figure 52:
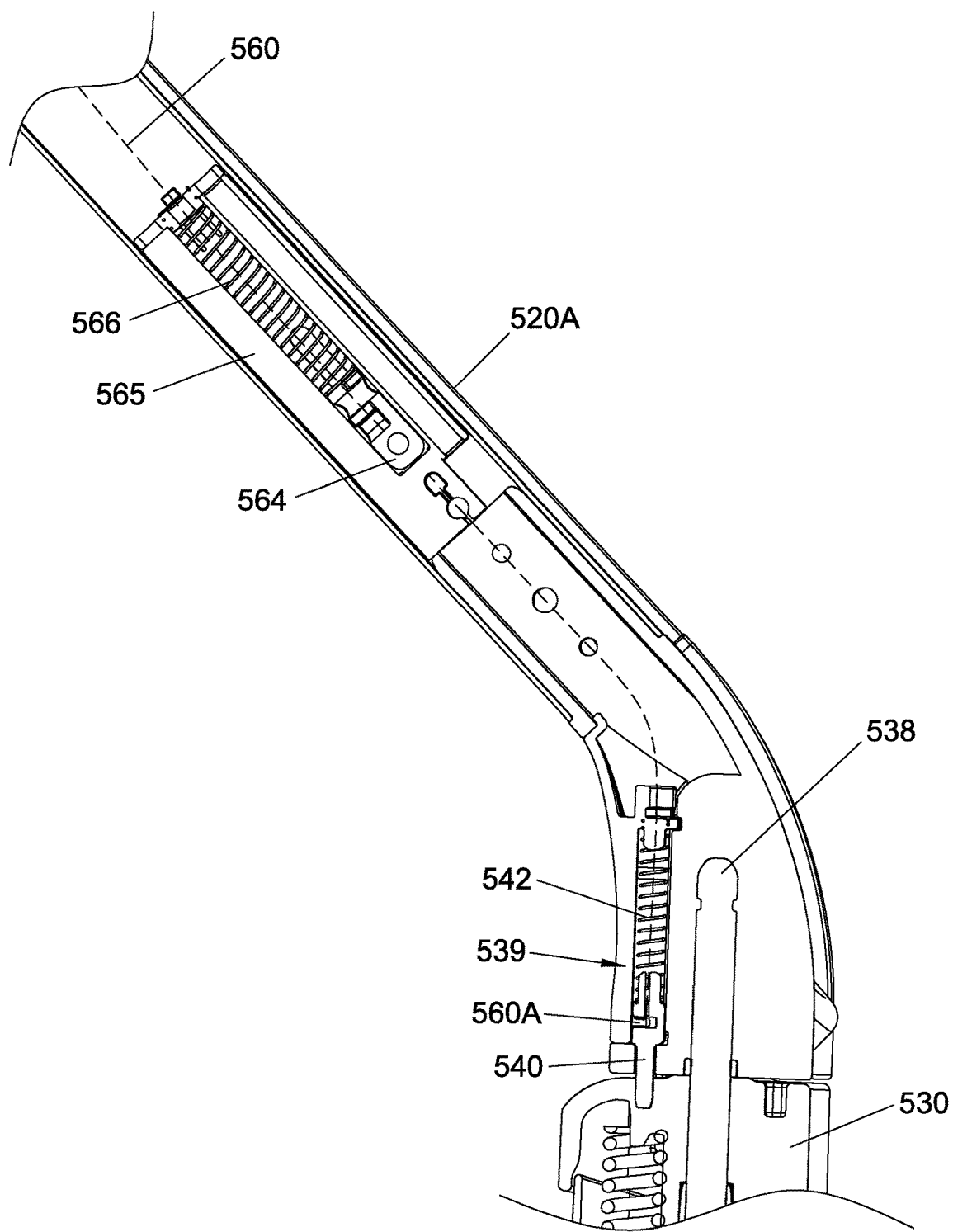
FIG. 52 is a cross-sectional view illustrating a linking part of the actuating assembly coupled to a wheel mount latch of a wheel assembly in the wheeled carrying apparatus of FIG. 50.

Referring to FIGS. 50-52, the two wheel assemblies 516 can have a same construction. In each wheel assembly 516, the wheel mount 530 can be pivotally connected with the side segment 520A of the leg frame 520 about a pivot axle 538 so that the wheel mount 530 and the wheel 532 carried therewith can rotate in unison about the pivot axle 538. Moreover, a locking assembly 539 is provided to rotationally lock and unlock the wheel mount 530 with respect to the standing frame 512. The locking assembly 539 can include a wheel mount latch 540 movably connected with the standing frame 512, and a locking spring 542 connected with the wheel mount latch 540. The wheel mount latch 540 can move downward to engage with the wheel mount 530 and thereby rotationally lock the wheel mount 530 with respect to the standing frame 512, and move upward to disengage from the wheel mount 530 to unlock the wheel mount 530 so that the wheel mount 530 can rotate relative to the standing frame 512. The locking spring 542 can apply a biasing force for urging the wheel mount latch 540 to engage with the wheel mount 530.

Figure 53:
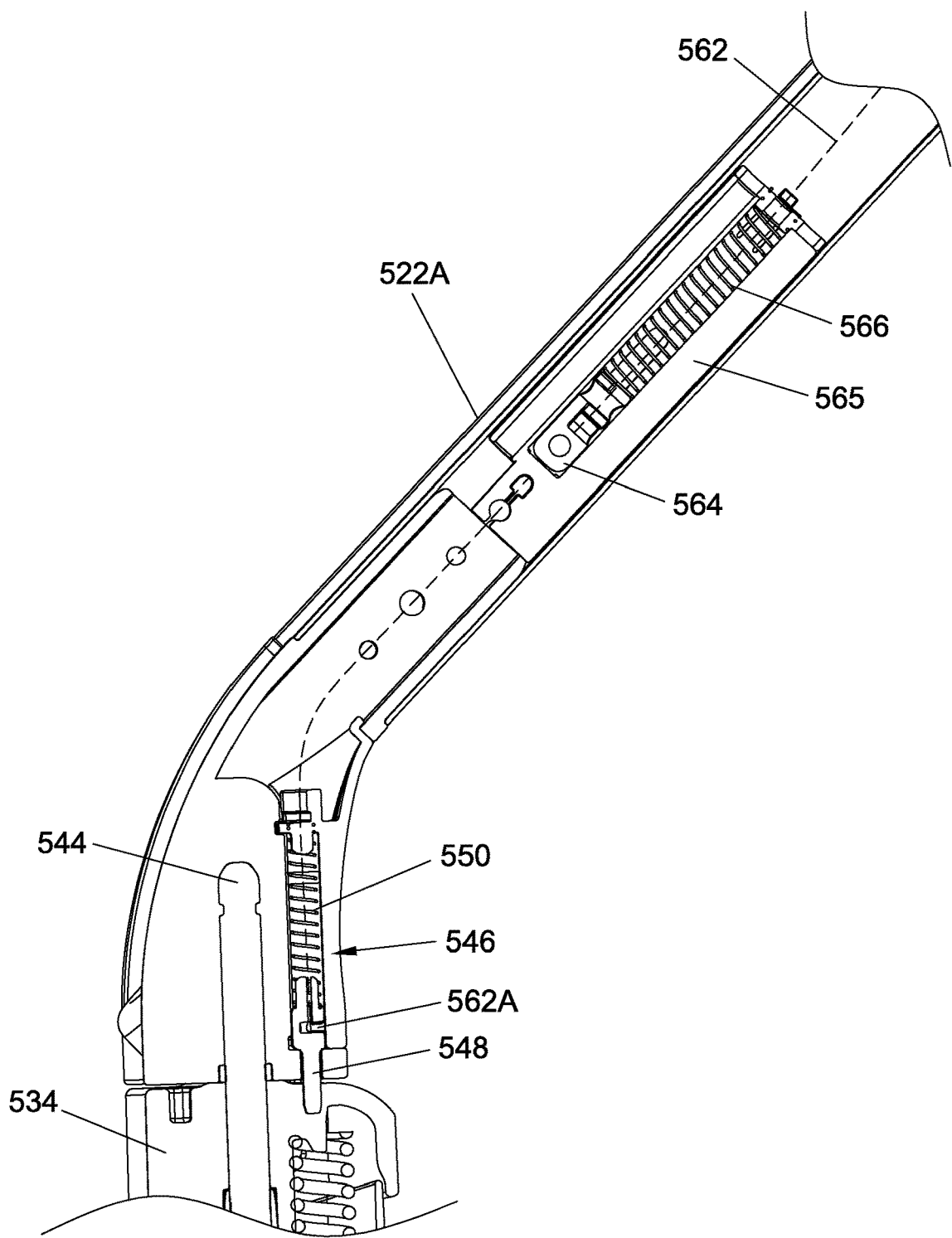
FIG. 53 is a cross-sectional view illustrating another linking part of the actuating assembly coupled to a wheel mount latch of another wheel assembly in the wheeled carrying apparatus of FIG. 50.

Referring to FIGS. 50, 51 and 53, the two wheel assemblies 518 can have a same construction. In each wheel assembly 518, the wheel mount 534 can be pivotally connected with the side segment 522A of the leg frame 522 about a pivot axle 544 so that the wheel mount 534 and the wheel 536 carried therewith can rotate in unison about the pivot axle 544. Moreover, a locking assembly 546 is provided to rotationally lock and unlock the wheel mount 534 with respect to the standing frame 512. The locking assembly 546 can include a wheel mount latch 548 movably connected with the standing frame 512, and a locking spring 550 connected with the wheel mount latch 548. The wheel mount latch 548 can move downward to engage with the wheel mount 534 and thereby rotationally lock the wheel mount 534 with respect to the standing frame 512, and move upward to disengage from the wheel mount 534 to unlock the wheel mount 534 so that the wheel mount 534 can rotate relative to the standing frame 512. The locking spring 550 can apply a biasing force for urging the wheel mount latch 548 to engage with the wheel mount 534.

Referring to FIGS. 50-61, the wheeled carrying apparatus 500 can further include an actuating assembly 552 that is coupled to the wheel mount latches 540 and 548, and a release mechanism 554 including an operating part 556 that is provided on the handle frame 514.

Referring to FIGS. 52-55, the actuating assembly 552 can include a link actuator 558 movably connected with the standing frame 512, a linking part 560 coupling the wheel mount latch 540 to the link actuator 558, and a linking part 562 coupling the wheel mount latch 548 to the link actuator 558, the wheel mount latches 540 and 548 being respectively associated with the wheel assemblies 516 and 518 located at a same side (i.e., a left or right side) of the wheeled carrying apparatus 500.

The link actuator 558 is configured to be movable in a first direction to pull the linking part 562 and urge the wheel mount latch 548 to disengage from the wheel mount 534 and concurrently relax the linking part 560 so that the wheel mount latch 540 can engage with the wheel mount 530, and in a second direction opposite to the first direction to pull the linking part 560 and urge the wheel mount latch 540 to disengage from the wheel mount 530 and concurrently relax the linking part 562 so that the wheel mount latch 548 can engage with the wheel mount 534, the link actuator 558 being movable in the first direction or the second direction in response to a rotation of the handle frame 514 relative to the standing frame 512 between the first position and the second position of different inclinations. According to an example of construction, the link actuator 558 can be pivotally connected with the standing frame 512 about the pivot axis P, and can rotate as a unitary part relative to the standing frame 512 in the first and second direction. For example, the link actuator 558 can be pivotally assembled around a cylinder 563 in a cavity defined between the coupling parts 524 and 526, the cylinder 563 being fixedly connected with the coupling part 524. Examples of suitable structures for the link actuator 558 may include, without limitation, a rotary plate, a ring, and the like.

Figure 54:
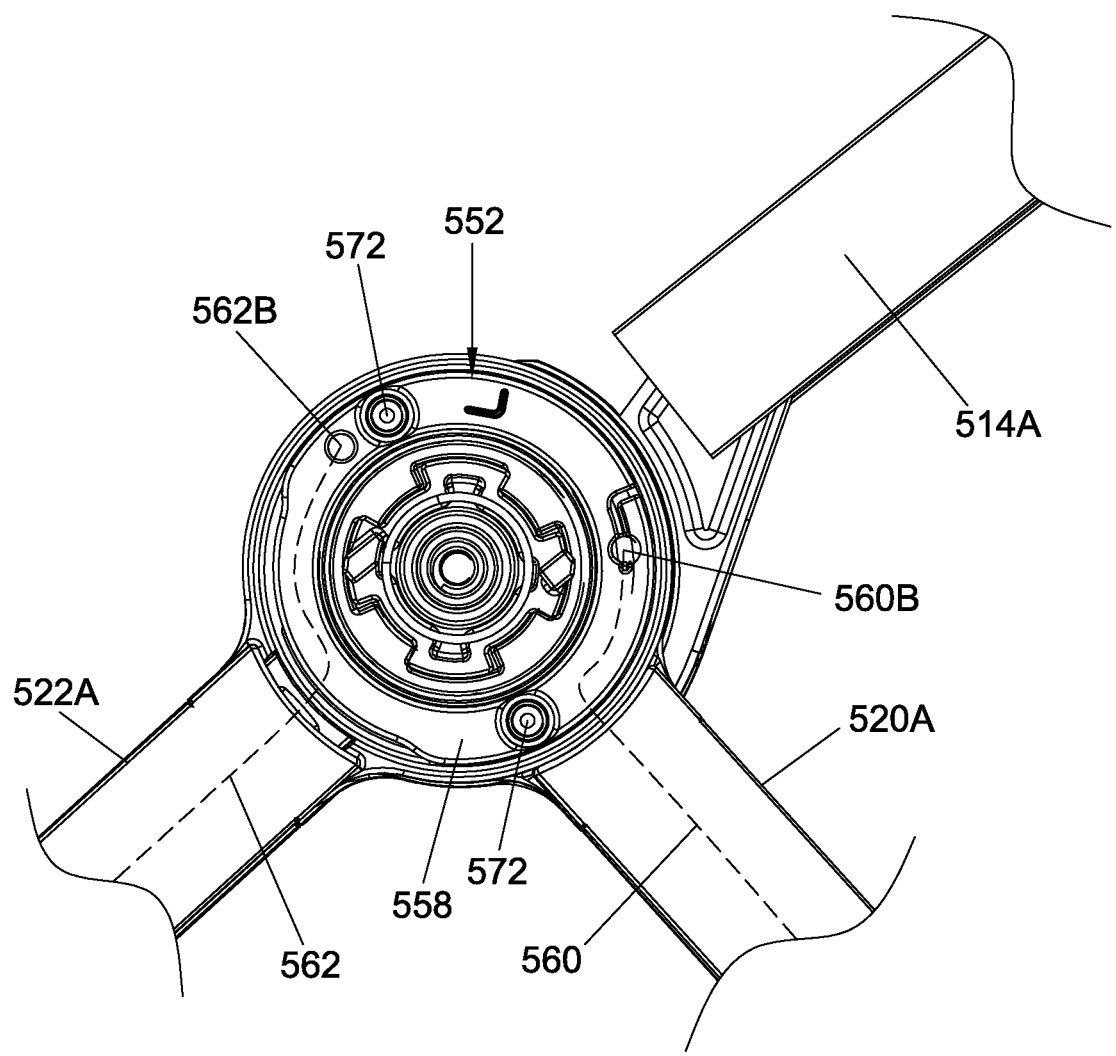
FIG. 54 is planar view illustrating a portion of the actuating assembly provided in the wheeled carrying apparatus of FIG. 50.
Figure 55:
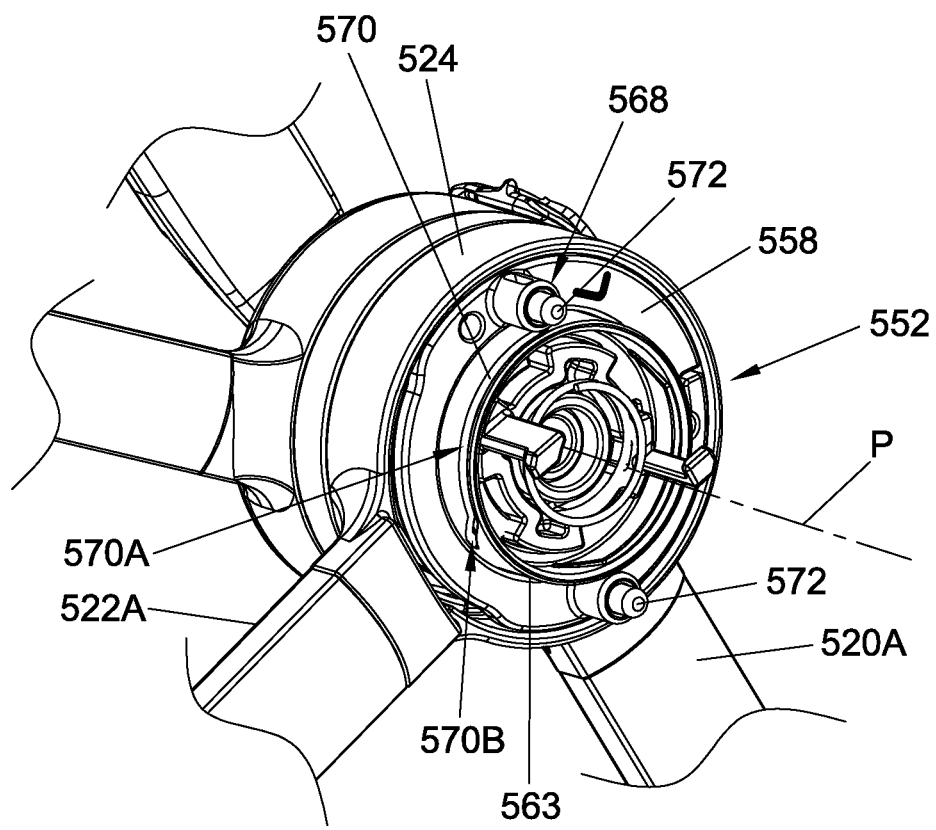
FIG. 55 is a perspective view illustrating a portion of the actuating assembly provided in the wheeled carrying apparatus of FIG. 50.
Figure 56:
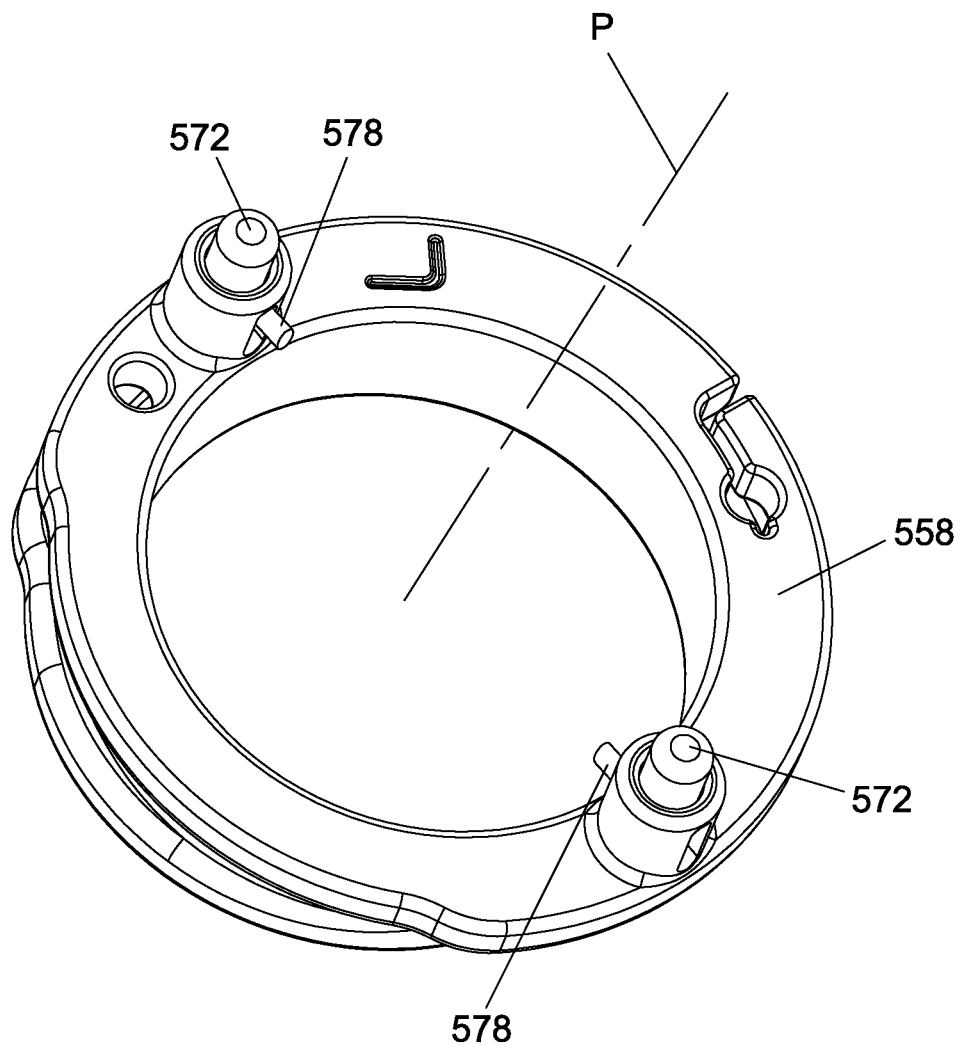
FIG. 56 is a perspective view illustrating a link actuator of the actuating assembly provided in the wheeled carrying apparatus of FIG. 50.
Figure 57:
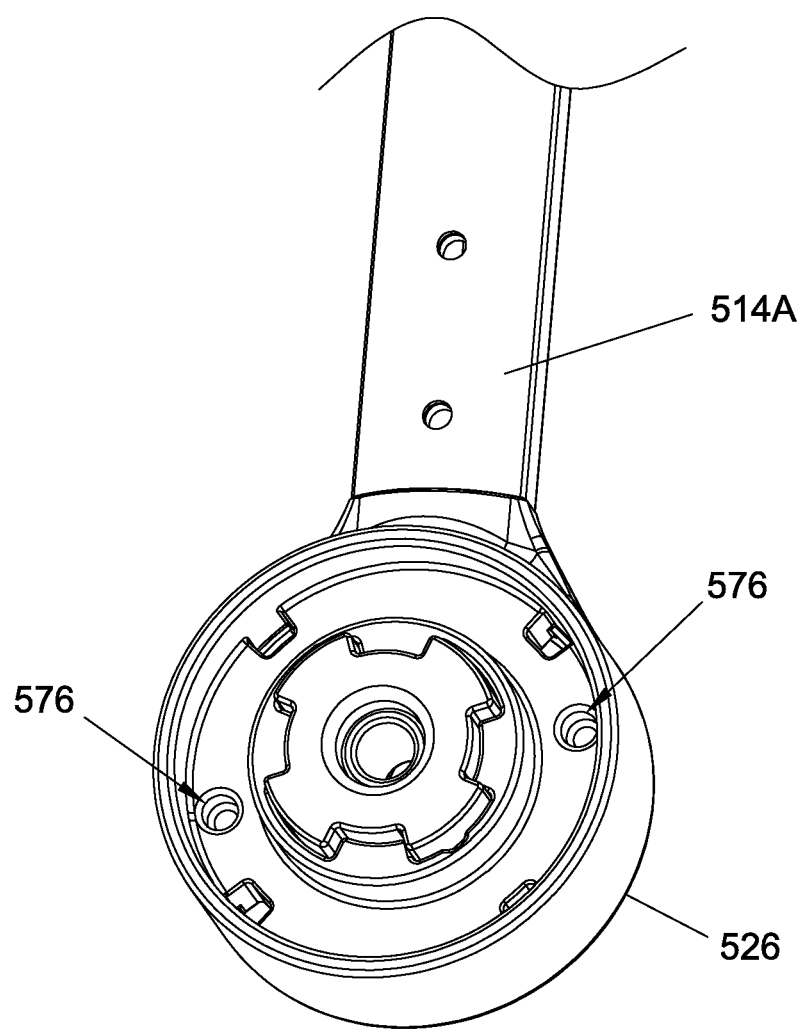
FIG. 57 is a perspective view illustrating a coupling part fixedly connected with a handle frame of the wheeled carrying apparatus shown in FIG. 50.
Figure 58:
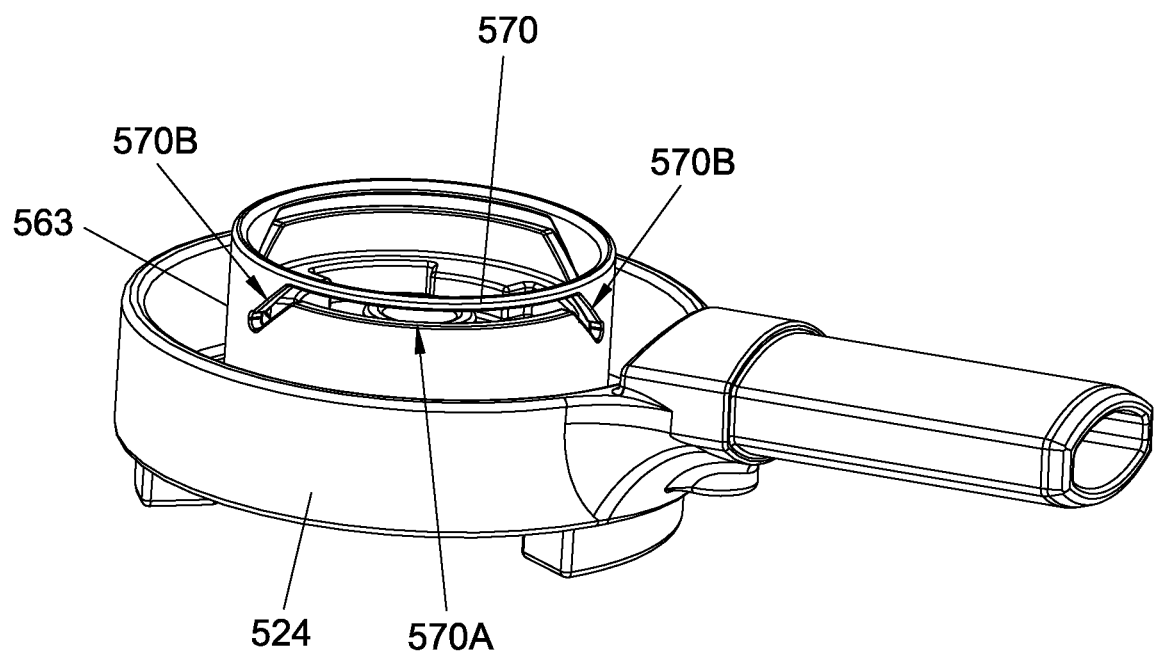
FIG. 58 is a perspective view illustrating a coupling part provided on a standing frame of the wheeled carrying apparatus shown in FIG. 50.
Figure 59:
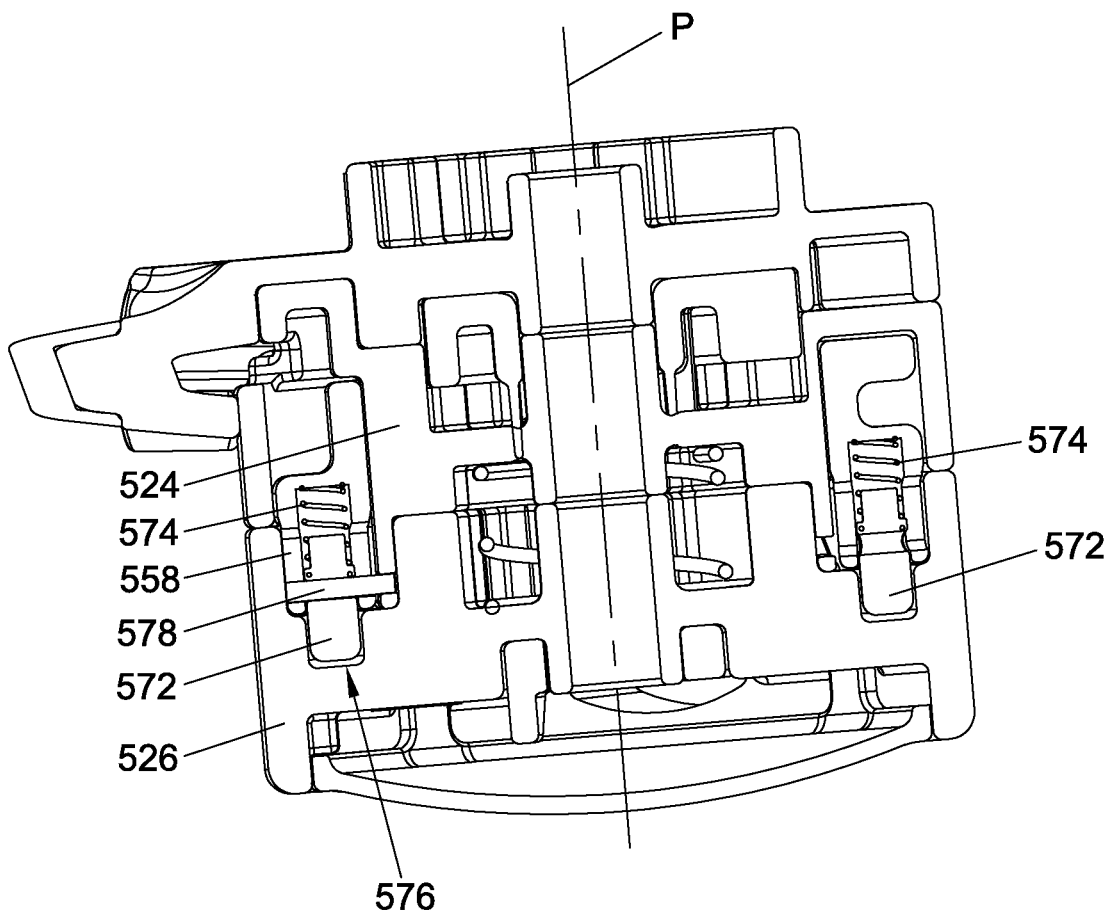
FIG. 59 is a cross-sectional view illustrating the link actuator assembled between the coupling part of the handle frame and the coupling part of the standing frame in the wheeled carrying apparatus shown in FIG. 50.

Referring to FIGS. 52-54, the two linking parts 560 and 562 can include cable portions, and can be routed along the standing frame 512. According to an example of construction, the two linking parts 560 and 562 can respectively include two cable portions provided as two separate cables that respectively couple the wheel mount latches 540 and 548 to the link actuator 558. For example, the linking part 560 can include a cable having an end 560A anchored to the wheel mount latch 540 and another end 560B anchored to the link actuator 558, and the linking part 562 can include a cable having an end 562A anchored to the wheel mount latch 548 and another end 562B anchored to the link actuator 558. The linking part 560 can be exemplarily routed from the wheel mount latch 540 along the side segment 520A of the leg frame 520 to the link actuator 558. The linking part 562 can be exemplarily routed from the wheel mount latch 548 along the side segment 522A of the leg frame 522 to the link actuator 558. In this manner, the link actuator 558 is rotatable in a first direction to pull the linking part 562 and urge the wheel mount latch 548 to disengage and unlock the wheel mount 534 and concurrently relax the linking part 560 so that the wheel mount latch 540 can engage and lock the wheel mount 530, and in a second direction opposite to the first direction to pull the linking part 560 and urge the wheel mount latch 540 to disengage and unlock the wheel mount 530 and concurrently relax the linking part 562 so that the wheel mount latch 548 can engage and lock the wheel mount 534.

Referring to FIG. 52, a tensioning mechanism may be coupled to the linking part 560 in the side segment 520A of the leg frame 520 to ensure that the linking part 560 is suitably tensioned during operation. The tensioning mechanism can include a sliding part 564 attached to the linking part 560, a guide member 565 fixedly connected with the side segment 520A of the leg frame 520, and a spring 566 respectively connected with the sliding part 564 and the guide member 565. The linking part 560 can travel through the guide member 565, and the sliding part 564 is restricted to slide within the guide member 565. The spring 566 is loaded by the sliding part 564 when the linking part 560 is pulled by the link actuator 558, and can apply a biasing force that can urge the sliding part 564 to slide downward to facilitate tensioning of the linking part 560 when the link actuator 558 relaxes the linking part 560. The same tensioning mechanism may be provided for the linking part 562, as shown in FIG. 53.

Referring to FIGS. 54-59, the actuating assembly 552 can further include a rotational coupling mechanism 568 configured to rotationally couple the link actuator 558 to the handle frame 514 during rotation of the handle frame 514 between the first position and the second position of different inclinations, and to rotationally decouple the link actuator 558 from the handle frame 514 when the handle frame 514 rotates for folding the wheeled carrying apparatus 500. The rotational coupling mechanism 568 can include a guide slot 570 provided on the coupling part 524 of the standing frame 512, a catching part 572 carried with the link actuator 558, and a spring 574 (shown in FIG. 59). The guide slot 570 can be exemplarily formed on the cylinder 563 of the coupling part 524, and run around the pivot axis P. Moreover, the guide slot 570 can have a slot portion 570A, and two slot portions 570B that are connected with the slot portion 570A at two opposite side thereof and are tilted an angle relative to the slot portion 570A.

The catching part 572 can be connected with the link actuator 558 at a location eccentric from the pivot axis P, and is movable relative to the link actuator 558 between a first state for rotationally coupling the link actuator 558 to the handle frame 514 and a second state for rotationally decoupling the link actuator 558 from the handle frame 514. According to an example of construction, the catching part 572 may be assembled with the link actuator 558 for sliding along the pivot axis P. The catching part 572 can thereby slide relative to the link actuator 558 between the first state where the catching part 572 is engaged with the coupling part 526 of the handle frame 514 and the second state where the catching part 572 is disengaged from the coupling part 526 of the handle frame 514. For example, the coupling part 526 can have an opening 576, and the catching part 572 can be engaged with the opening 576 in the first state and disengaged from the opening 576 in the second state. The spring 574 can be respectively connected with the catching part 572 and the link actuator 558, and can bias the catching part 572 toward the first state.

Referring to FIGS. 54-59, the catching part 572 can have a protrusion 578 that projects sideways and is received in the guide slot 570 of the coupling part 524. The catching part 572 is engaged with the coupling part 526 and the protrusion 578 is received in the slot portion 570A when the catching part 572 is in the first state for rotationally coupling the link actuator 558 to the handle frame 514. When the handle frame 514 rotates relative to the standing frame 512 between the first and second position of different inclinations, the link actuator 558 can rotate along with the handle frame 514 with the catching part 572 in the first state and the protrusion 578 of the catching part 572 sliding freely along the slot portion 570A.

When the handle frame 514 rotates beyond the rotational range between the first and second position for folding the wheeled carrying apparatus 500, the protrusion 578 is forced to travel from the slot portion 570A into one of the two slot portions 570B, which urges the catching part 572 to move to the second state and disengage from the coupling part 526. The link actuator 558 can be thereby rotationally decoupled from the handle frame 514. This can ensure that the link actuator 558 suitably operates within the rotational range of the handle frame 514 between the first and second position of different inclinations.

With the aforementioned construction, the wheel mount 530 thus can be locked to the standing frame 512 and the wheel mount 534 unlocked for free rotation when the handle frame 514 is in the first position, and the wheel mount 534 can be locked to the standing frame 512 and the wheel mount 530 unlocked for free rotation when the handle frame 514 is in the second position.

Figure 60:
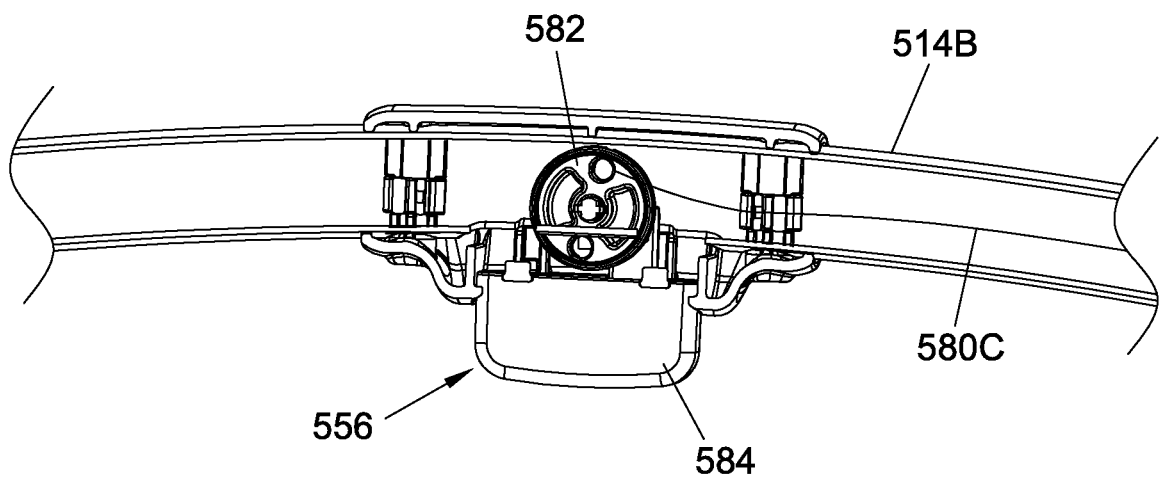
FIG. 60 is a partial cross-sectional view illustrating an operating part provided in the wheeled carrying apparatus shown in FIG. 50.
Figure 61:
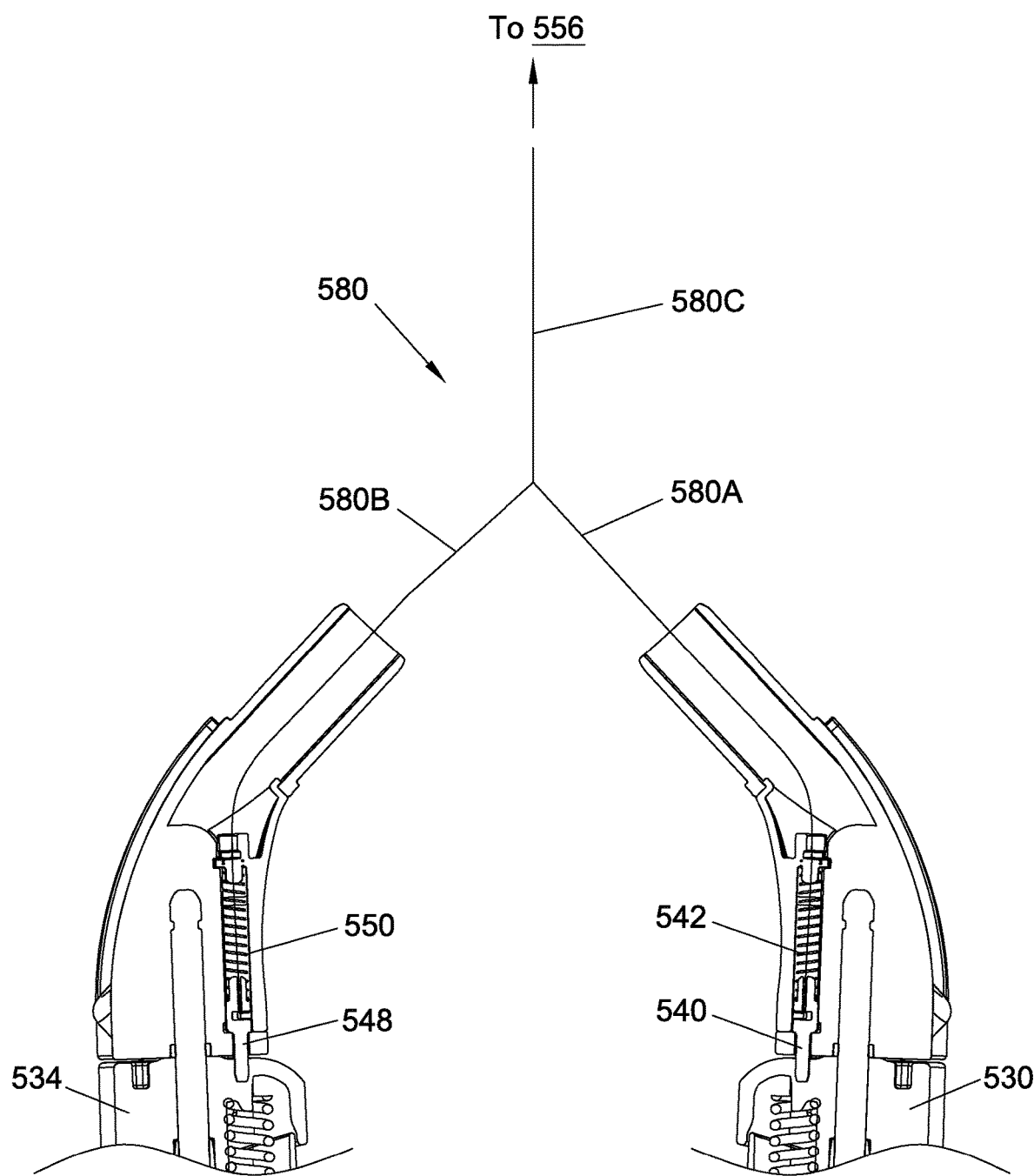
FIG. 61 is a schematic view illustrating a portion of the actuating assembly that is coupled to the operating part shown in FIG. 60.

Referring to FIGS. 50-54, 60 and 61, the release mechanism 554 can include an operating part 556 provided on the grip portion 514B of the handle frame 514, and is operable while the handle frame 514 is in any of the first and second position to cause the wheel mounts 530 and 534 to be unlocked at the same time. To this end, the actuating assembly 552 can further include a cable assembly 580 that operatively couples the operating part 556 to the wheel mount latches 540 and 548 and is operatively decoupled from the link actuator 558, whereby the operating part 556 is operable to pull the cable assembly 580 so that the wheel mount latches 540 and 548 are respectively disengaged from the wheel mounts 530 and 534 at the same time. For example, the cable assembly 580 can include a cable portion 580A connected with the wheel mount latch 540, a cable portion 580B connected with the wheel mount latch 548, and a cable portion 580C respectively connected with the operating part 556 and the cable portions 580A and 508B. As shown in FIG. 60, the operating part 556 can include a barrel 582 and a button 584. The barrel 582 can be pivotally connected with the grip portion 514B of the handle frame 514, and the cable portion 580C can have an end anchored to the barrel 582. The button 584 can be slidably connected with the grip portion 514B and pivotally connected with the barrel 582. With this construction, the button 584 can be pressed to urge the barrel 582 to rotate and pull the cable assembly 580 so that the wheel mount latches 540 and 548 are unlocked at the same time.

Since the two wheels assemblies 516 and 518 are provided at each of the left and right side of the wheeled carrying apparatus 500, the actuating assembly 552 can be symmetrically arranged at the left and right side and likewise coupled to the operating part 556.

FIGS. 62-78 are schematic views illustrating another embodiment of a wheeled carrying apparatus 600 implemented as a child stroller apparatus. Referring to FIGS. 62-78, the wheeled carrying apparatus 600 can have the frame structure 502, the wheel assemblies 516 and 518 and the locking assemblies 539 and 546 described previously with reference to FIGS. 50-53, and can further include an actuating assembly 620 and a release mechanism 622 that can substitute for the actuating assembly 552 and the release mechanism 554 of the previous embodiment.

Figure 62:
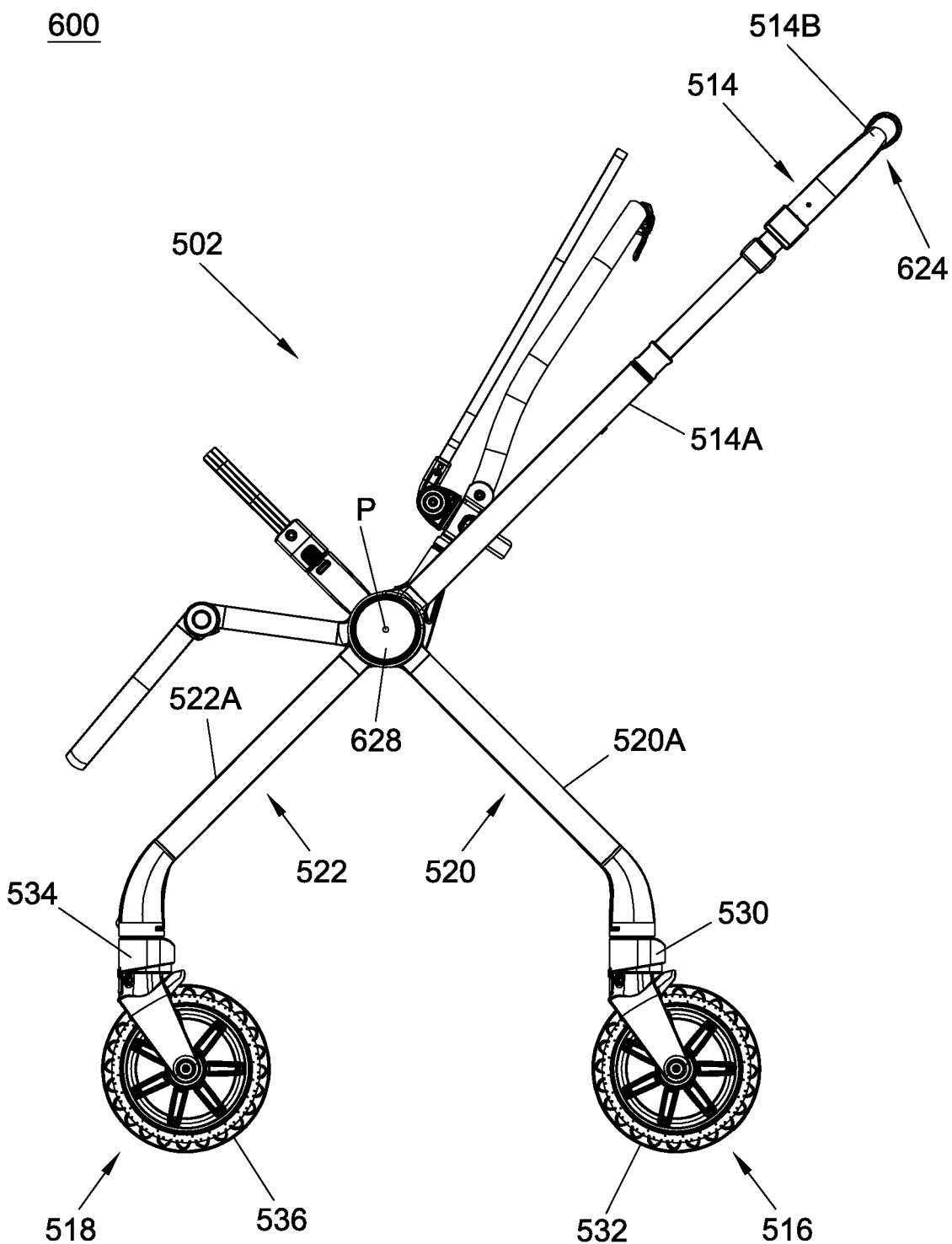
FIG. 62 is a side view illustrating the wheeled carrying apparatus of FIG. 50 provided with another actuating assembly and another release mechanism.
Figure 63:
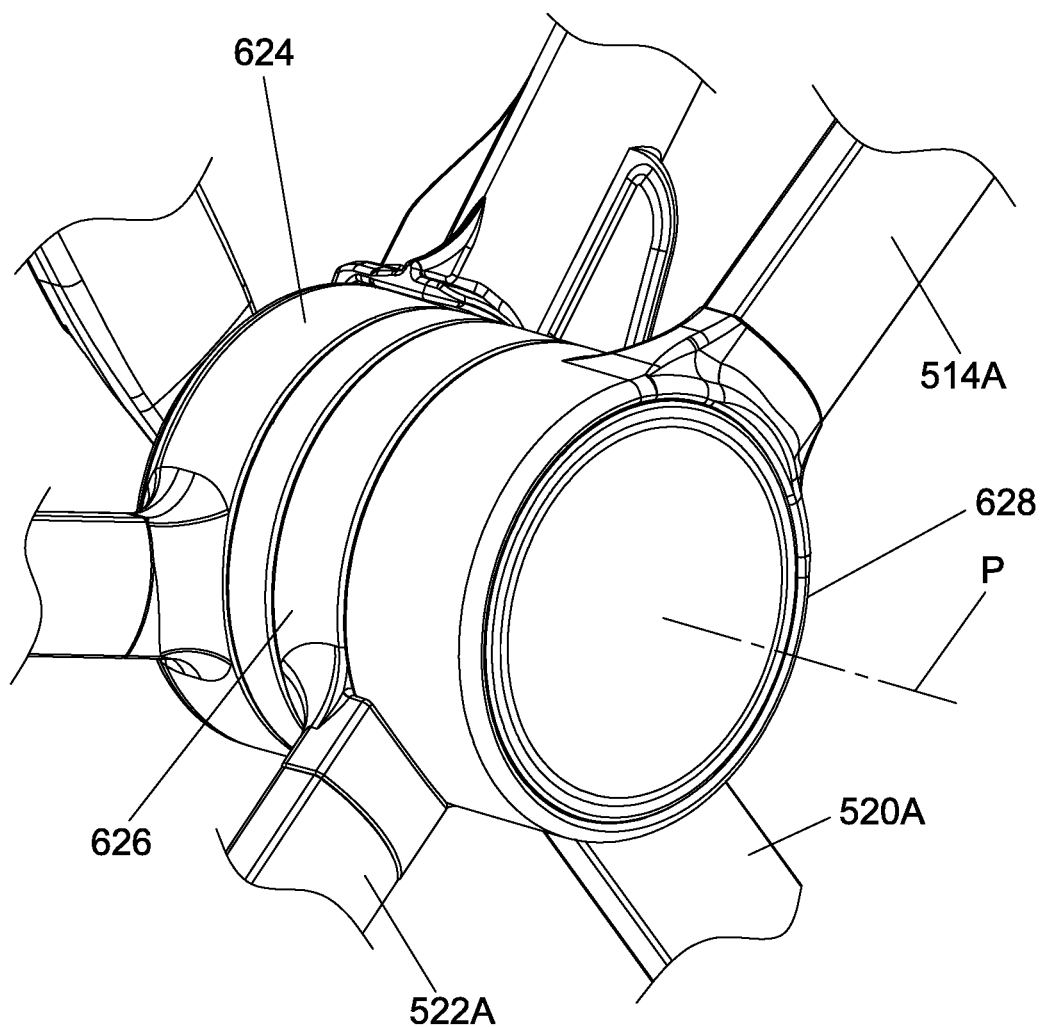
FIG. 63 is a perspective view illustrating a portion of a standing frame pivotally connected with a handle frame in the wheeled carrying apparatus shown in FIG. 62.
Figure 64:
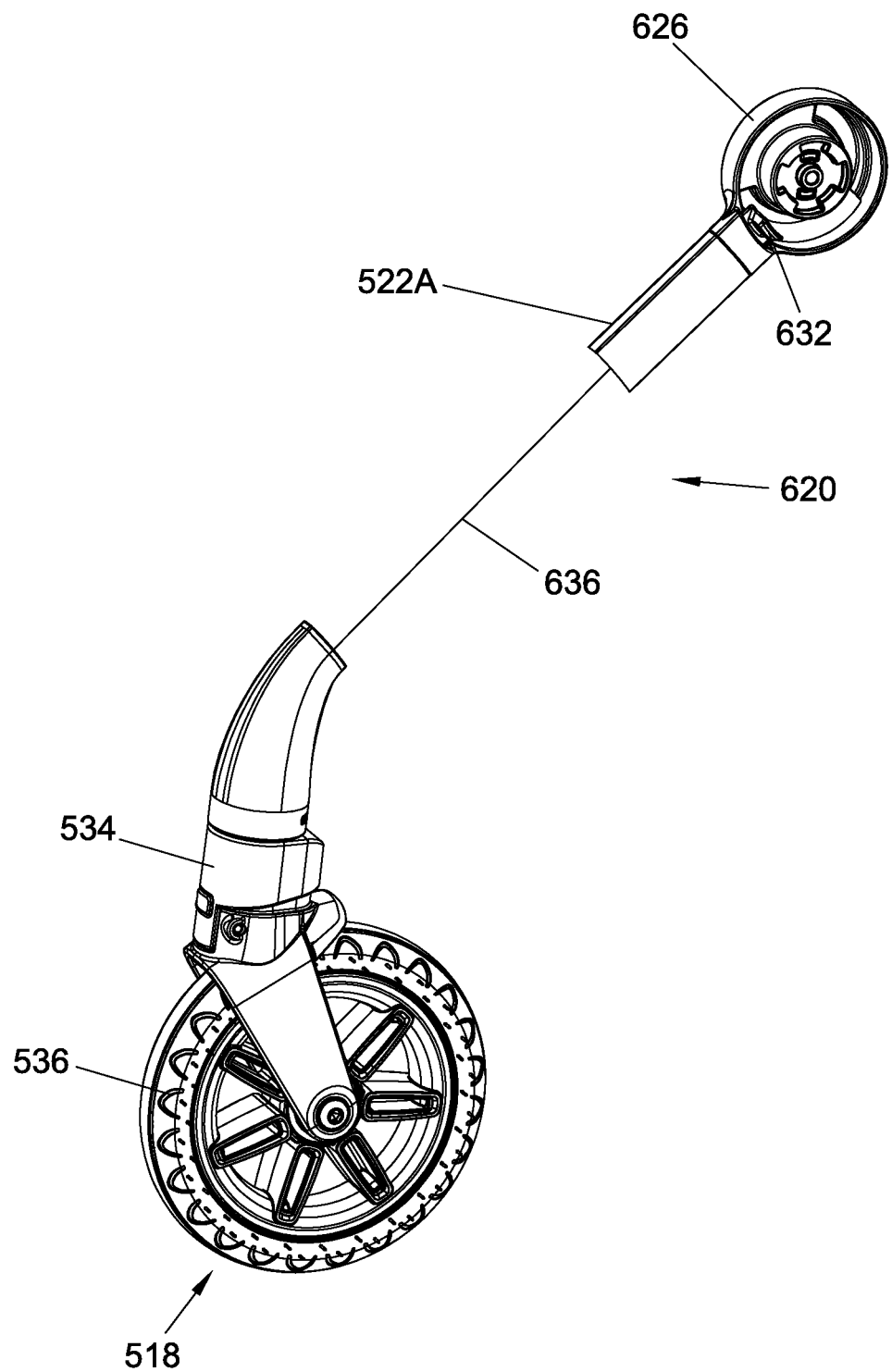
FIG. 64 is a schematic view illustrating a link actuator and a linking part of the actuating assembly provided in the wheeled carrying apparatus shown in FIG. 62.
Figure 65:
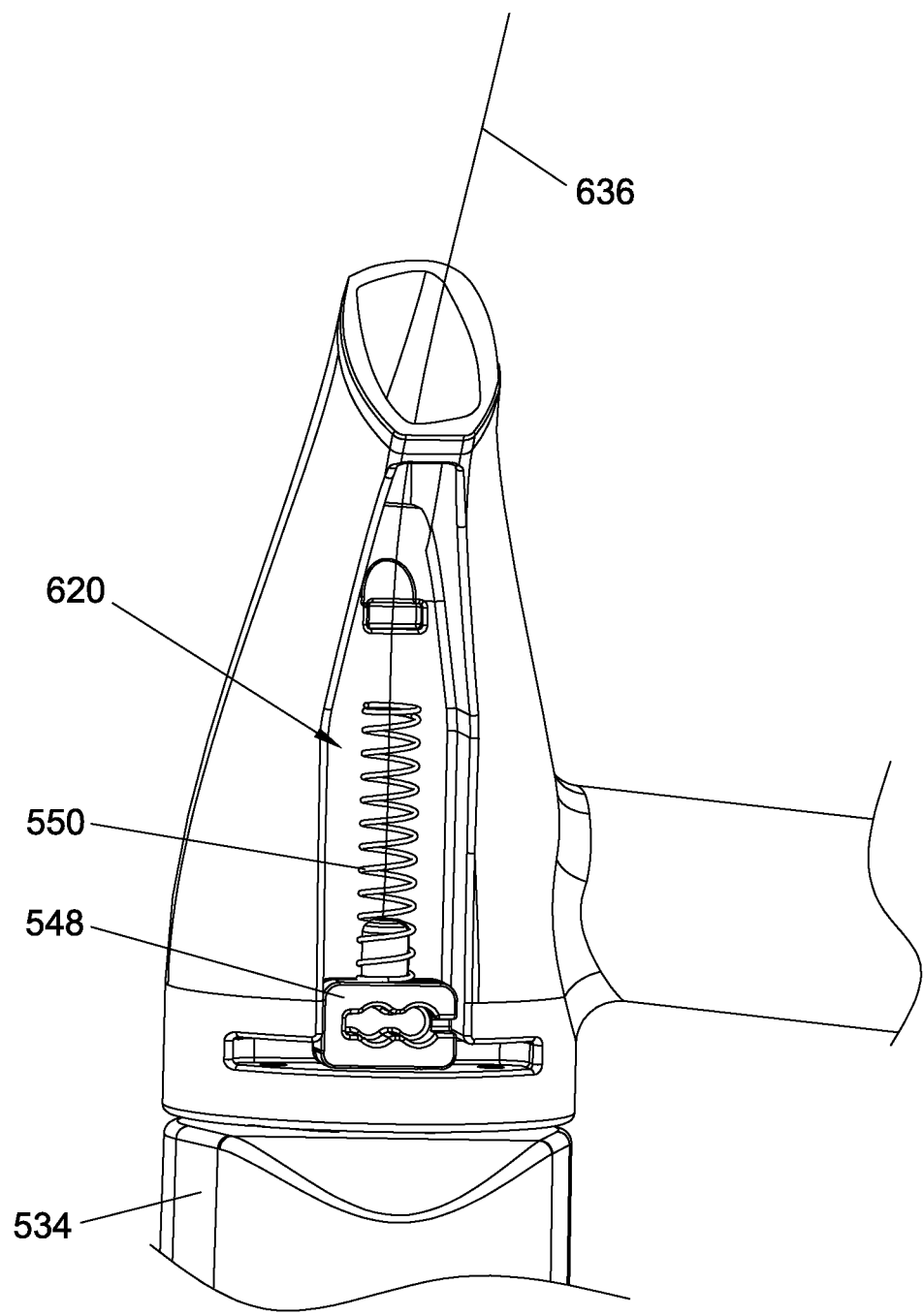
FIG. 65 is a schematic view illustrating the linking part shown in FIG. 64 coupled to a wheel mount latch in the wheeled carrying apparatus.
Figure 66:
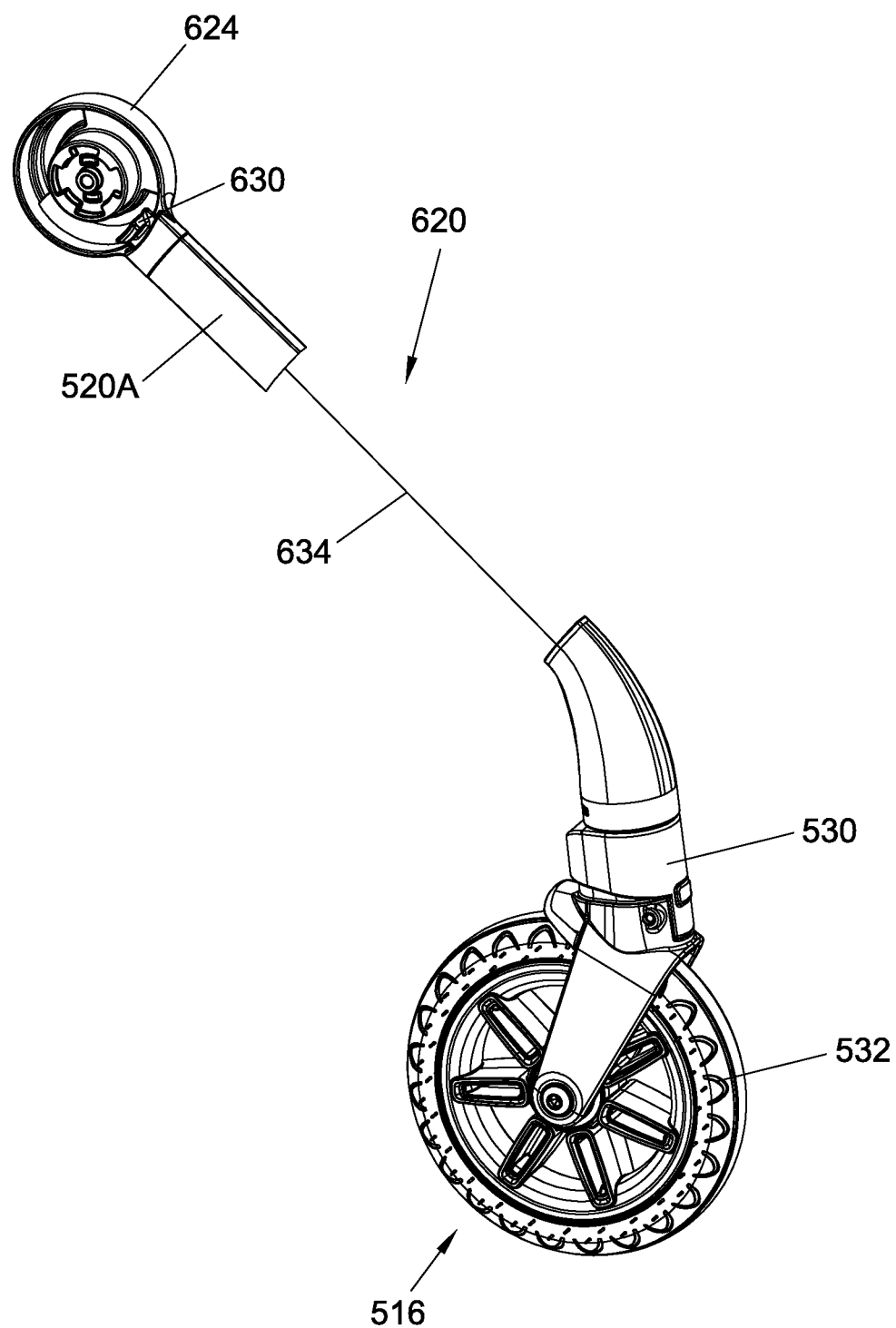
FIG. 66 is a schematic view illustrating another link actuator and another linking part of the actuating assembly provided in the wheeled carrying apparatus shown in FIG. 62.
Figure 67:
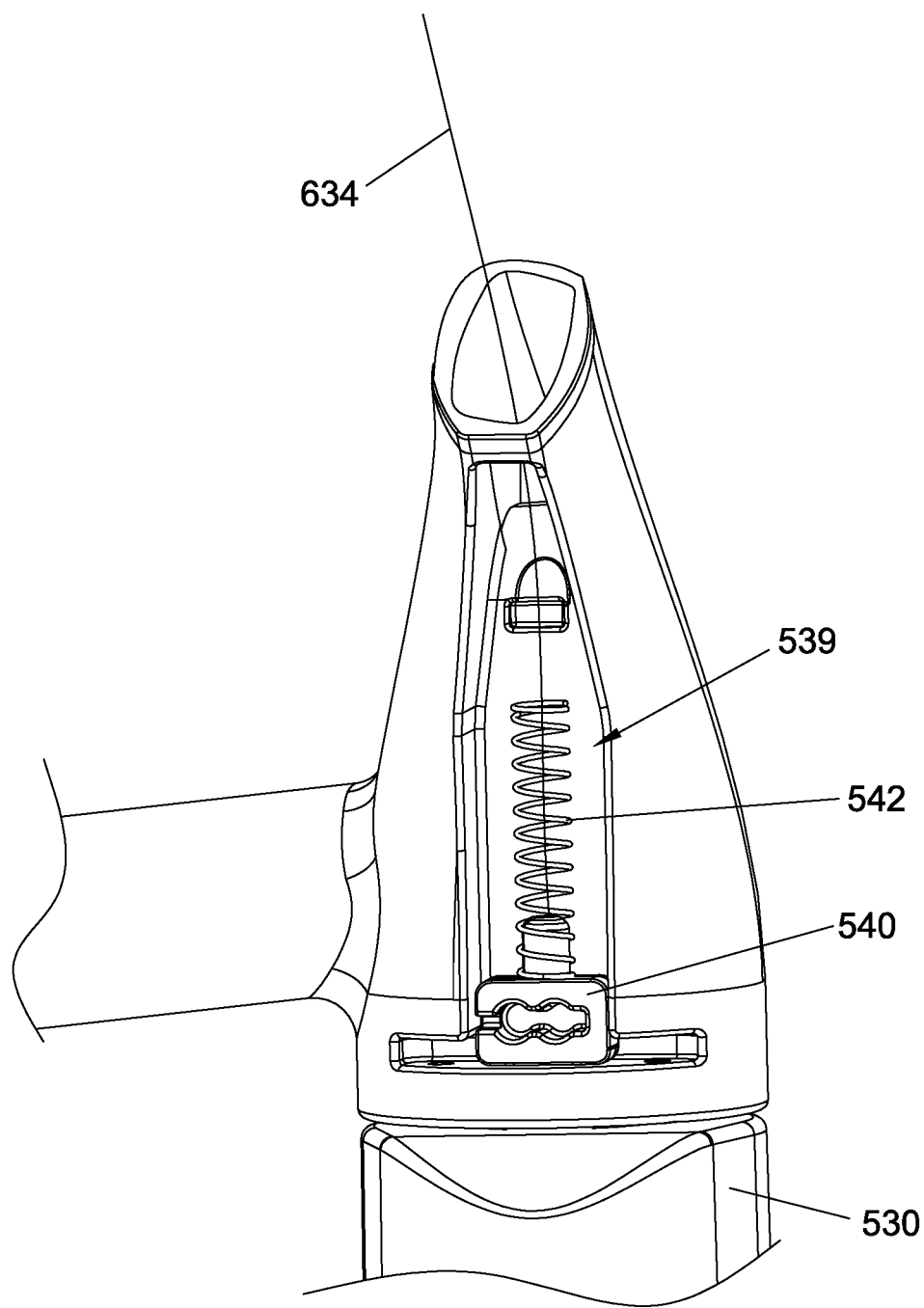
FIG. 67 is a schematic view illustrating the linking part shown in FIG. 66 coupled to another wheel mount latch in the wheeled carrying apparatus.
Figure 68:
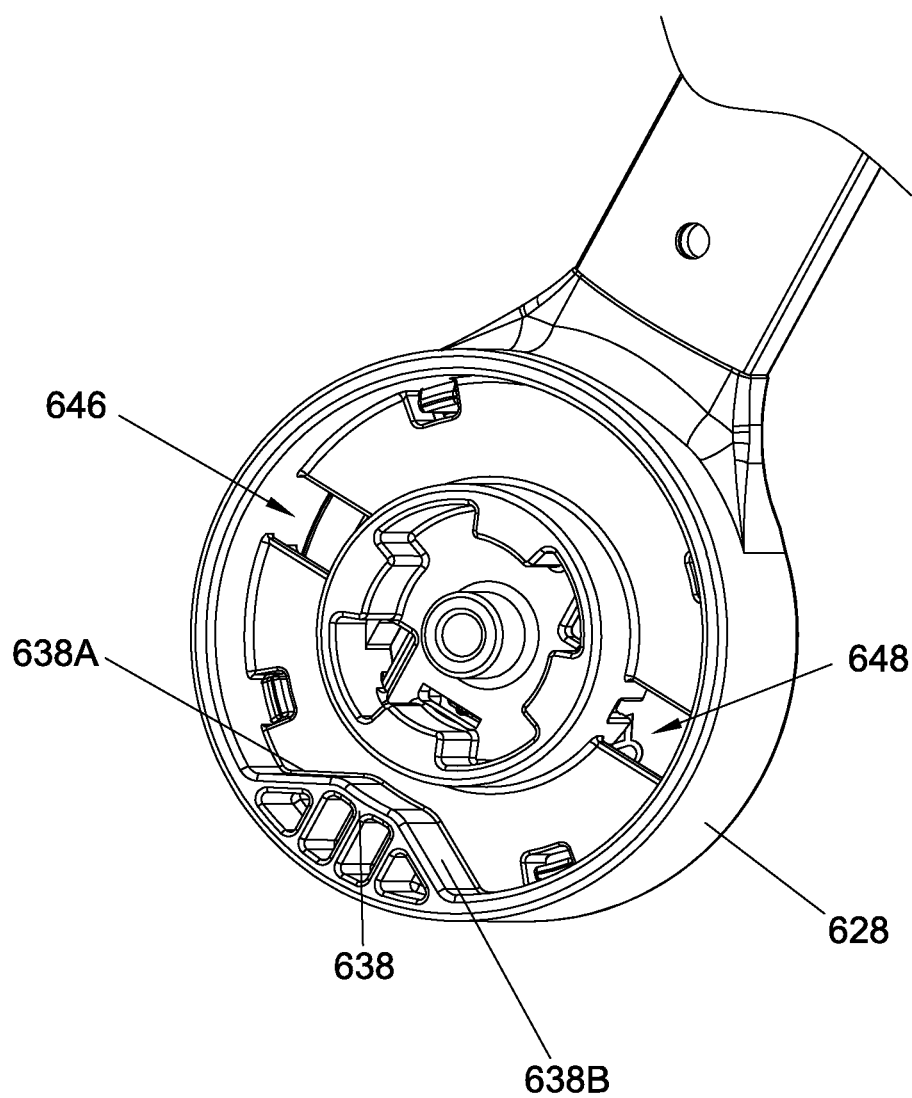
FIG. 68 is a perspective view illustrating a portion of the actuating assembly provided on a coupling part fixedly connected with a handle frame of the wheeled carrying apparatus shown in FIG. 62.
Figure 69:
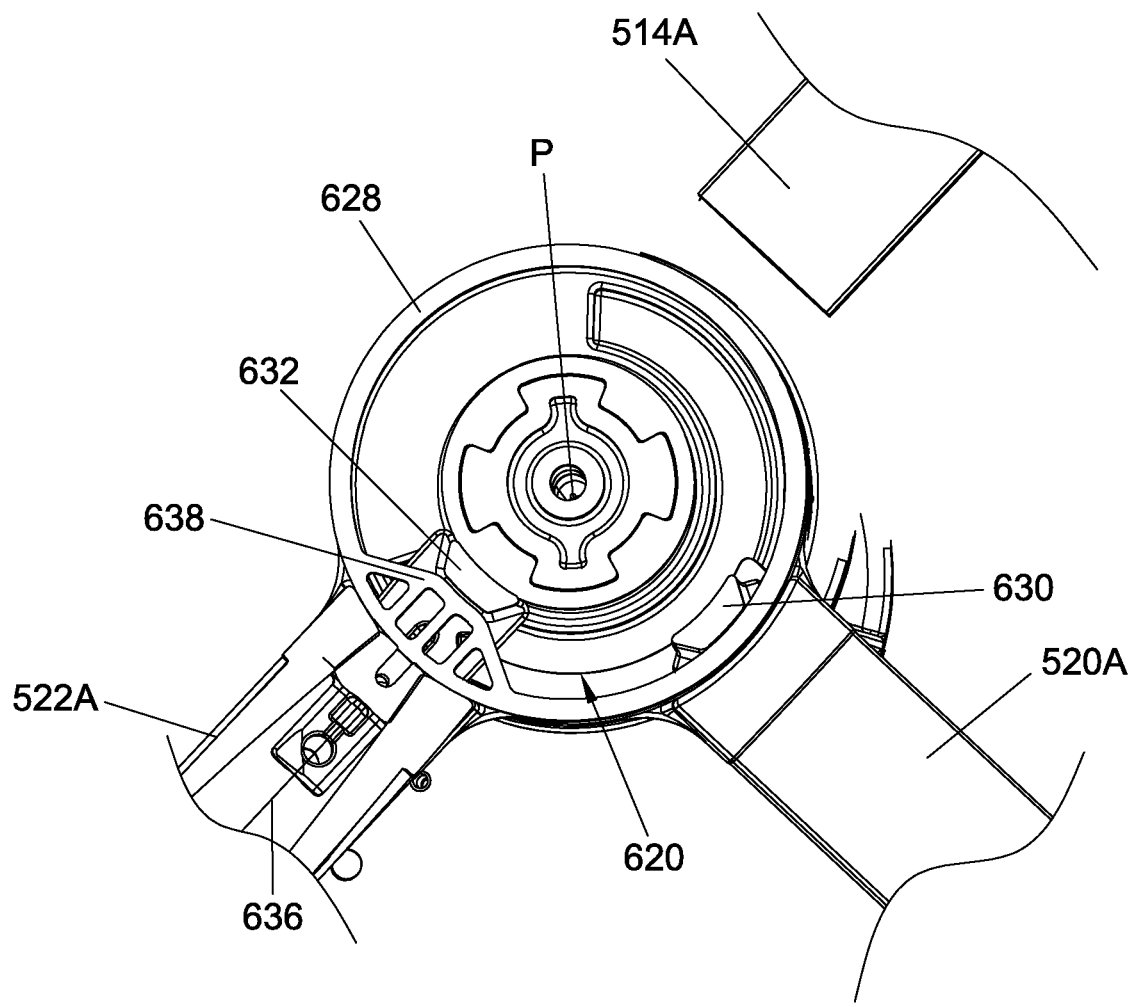
FIG. 69 is a schematic view illustrating a portion of the actuating assembly provided in the wheeled carrying apparatus shown in FIG. 62, the actuating assembly including an urging portion interacting with one of two link actuators.
Figure 70:
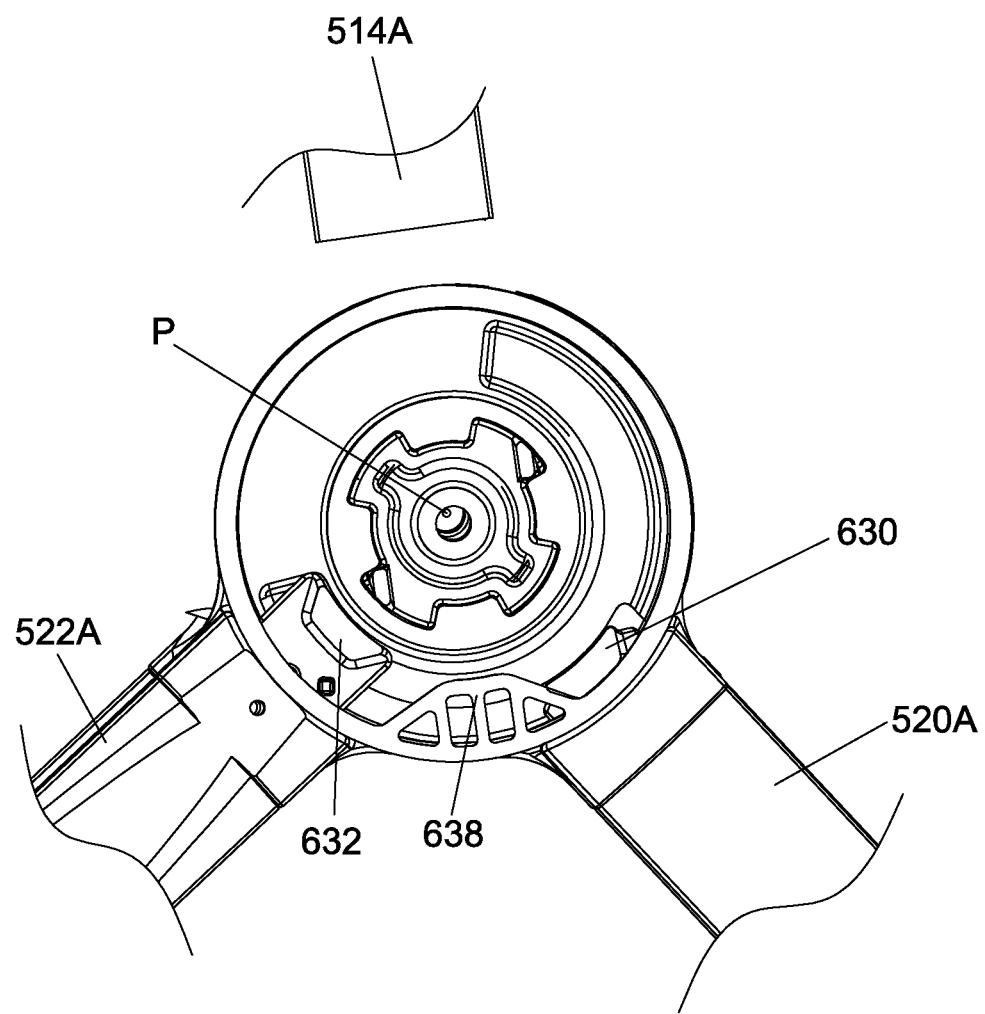
FIG. 70 is a schematic view illustrating the urging portion of the actuating assembly displaced an angle from the position shown in FIG. 69.

Referring to FIGS. 62 and 63, at each of the left and right side, the side segment 520A of the leg frame 520 can be fixedly connected with a coupling part 624, the side segment 522A of the leg frame 522 can be fixedly connected with a coupling part 626, and the side portion 514A of the handle frame 514 can be fixedly connected with a coupling part 628. The coupling parts 624, 626 and 628 can be exemplarily housing elements, and can be pivotally connected with one another about the pivot axis P so that the handle frame 514 and the leg frames 520 and 522 can rotate relative to one another for folding and unfolding the wheeled carrying apparatus. Moreover, the handle frame 514 is rotatable about the pivot axis P relative to the standing frame 512 between a first position inclined toward the side of the leg frame 520 and a second position inclined toward the side of the leg frame 522.

Referring to FIGS. 64-69, the actuating assembly 620 can include two link actuators 630 and 632 movably connected with the standing frame 512, a linking part 634 coupling the wheel mount latch 540 to the link actuator 630, a linking part 636 coupling the wheel mount latch 548 to the link actuator 632, and an urging portion 638 provided on the coupling part 628 of the handle frame 514, the wheel mount latches 540 and 548 being respectively associated with the wheel assemblies 516 and 518 located at a same side (i.e., a left or right side) of the wheeled carrying apparatus 600. According to an example of construction, the link actuator 630 can be movably connected with the coupling part 624 of the leg frame 520, and the link actuator 632 can be movably connected with the coupling part 626 of the leg frame 522. For example, the link actuators 630 and 632 can be respectively connected slidably with the coupling parts 624 and 626, and can be disposed radially apart from the pivot axis P. The link actuators 630 and 632 can thereby slide in different radial directions relative to the standing frame 512.

The urging portion 638 can be provided on the coupling part 628 of the handle frame 514 at an eccentric location relative to the pivot axis P. According to an example of construction, the urging portion 638 can be fixedly connected with the coupling part 628 and protrude inward. For example, the urging portion 638 may be formed integrally with the coupling part 628. The urging portion 638 is movable along with the handle frame 514 to contact with and push either the link actuators 630 or 632 to slide radially toward the pivot axis P. The link actuator 630 or 632 can be urged to move for pulling the linking part 634 or 636 via a sliding contact between ramp surfaces respectively provided on the urging portion 638 and the link actuators 630 and 632. For example, the urging portion 638 can have a ramp surface 638A that can push the link actuator 630 in movement, and a ramp surface 638B that can push the link actuator 632 in movement.

Referring to FIGS. 64-67, the two linking parts 634 and 636 can include cable portions, and can be routed along the standing frame 512. According to an example of construction, the two linking parts 634 and 636 can respectively include two cable portions provided as two separate cables that respectively couple the wheel mount latch 540 to the link actuator 630 and the wheel mount latch 548 to the link actuator 632. The linking part 634 can be exemplarily routed from the wheel mount latch 540 along the side segment 520A of the leg frame 520 to the link actuator 630. The linking part 636 can be exemplarily routed from the wheel mount latch 548 along the side segment 522A of the leg frame 522 to the link actuator 632.

Depending on the direction of rotation of the handle frame 514, the urging portion 638 can move along with the handle frame 514 and push the link actuator 630 or 632 to slide for pulling the corresponding wheel mount latch 540 or 548 to unlock. For example, a rotation of the handle frame 514 from the second position to the first position can cause the urging portion 638 to move away from the link actuator 630 and push the link actuator 632 in movement so that the link actuator 632 pulls the wheel mount latch 548 to disengage from the wheel mount 534, while the linking part 634 can be relaxed so that the wheel mount latch 540 can engage with the wheel mount 530 under the biasing force of the locking spring 542. Conversely, a rotation of the handle frame 514 from the first position to the second position causes the urging portion 638 to move away from the link actuator 632 and push the link actuator 630 in movement so that the link actuator 630 pulls the wheel mount latch 540 to disengage from the wheel mount 530, while the linking part 636 can be relaxed so that the wheel mount latch 548 can engage with the wheel mount 534 under the biasing force of the locking spring 550. Accordingly, the wheel mount 530 can be locked to the standing frame 512 and the wheel mount 534 unlocked for free rotation when the handle frame 514 is in the first position, and the wheel mount 534 can be locked to the standing frame 512 and the wheel mount 530 unlocked for free rotation when the handle frame 514 is in the second position.

Referring to FIGS. 68 and 71-78, the release mechanism 622 is operable while the handle frame 514 is in any of the first and second position to cause the wheel mounts 530 and 534 to be unlocked at the same time. According to an example of construction, the release mechanism 622 can include an operating part 624 placed on the grip portion 514B of the handle frame 514, two urging parts 640 and 642 carried with the handle frame 514, and a release actuator 644 coupled to the operating part 624 and operatively connected with the two urging parts 640 and 642.

The two urging parts 640 and 642 can be respectively received in two cavities 646 and 648 provided in the coupling part 628 of the handle frame 514, and can be configured to be movable relative to the coupling part 628 toward or away from the link actuators 630 and 632. For example, the two urging parts 640 and 642 may be slidably connected with coupling part 628, and can slide parallel to the pivot axis P toward or away from the link actuators 630 and 632. Two springs 650 and 652 can be provided to respectively bias the two urging parts 640 and 642 away from the link actuators 630 and 632. For example, the spring 650 can have two ends respectively connected with the urging part 640 and the coupling part 628, and the spring 652 can have two ends respectively connected with the urging part 642 and the coupling part 628.

Since the urging parts 640 and 642 are carried with the handle frame 514, the urging parts 640 and 642 can move along with the handle frame 514 around the pivot axis P during rotation of the handle frame 514 between the first and second position of different inclinations. More specifically, the urging part 640 can be positioned adjacent to the link actuator 630 and the urging part 642 can be displaced away from the link actuator 632 when the handle frame 514 is in the first position, and the urging part 642 can be positioned adjacent to the link actuator 632 and the urging part 640 can be displaced away from the link actuator 630 when the handle frame 514 is in the second position. Accordingly, the urging part 640 is movable to push the link actuator 630 in movement and cause the wheel mount latch 540 to disengage from the wheel mount 530 when the handle frame 514 is in the first position, and the urging part 642 is movable to push the link actuator 632 in movement and cause the wheel mount latch 548 to disengage from the wheel mount 534 when the handle frame 514 is in the second position. The urging parts 640 and 642 may respectively have ramp surfaces 640A and 642A, and the link actuator 630 and 632 can be respectively urged to move for pulling the linking part 634 and 636 via a sliding contact between the ramp surface 640A and the link actuator 630 and a sliding contact between the ramp surface 642A and the link actuator 632.

Referring to FIGS. 71-78, the release actuator 644 is carried with the handle frame 514, and is coupled to the operating part 624 via a cable 654. The release actuator 644 is movable to concurrently push the two urging parts 640 and 642 in movement so that either the urging part 640 or 642 can push the link actuator 630 or 632 adjacent thereto in movement and thereby cause the corresponding wheel mount latch 540 or 548 to unlock. According to an example of construction, the release actuator 644 can be slidably connected with the coupling part 628 of the handle frame 514, and can slide as unitary part along an axis that is substantially orthogonal to the axes of displacement of the urging parts 540 and 542. The urging parts 640 and 642 can be urged in movement for respectively pushing the link actuators 630 and 632 to move toward the pivot axis P via a sliding contact between ramp surfaces respectively provided on the release actuator 644 and the urging parts 640 and 642.

Figure 71:
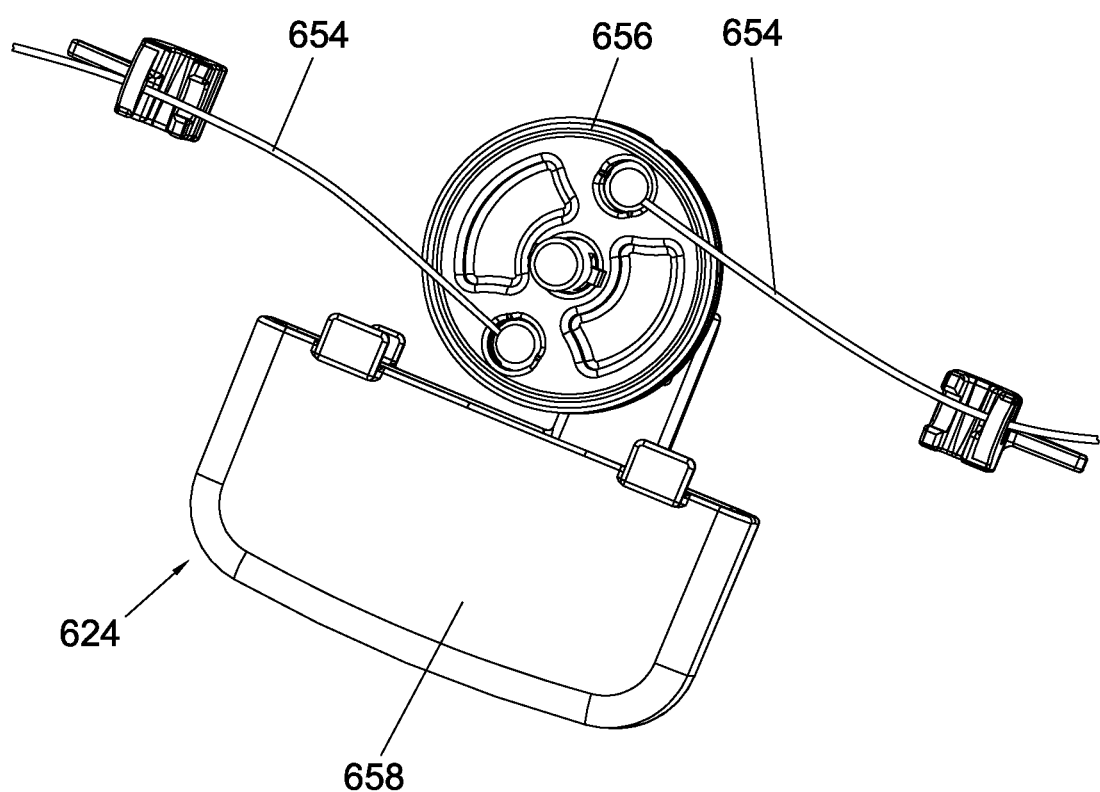
FIG. 71 is a schematic view illustrating an operating part provided in the wheeled carrying apparatus shown in FIG. 62.
Figure 72:
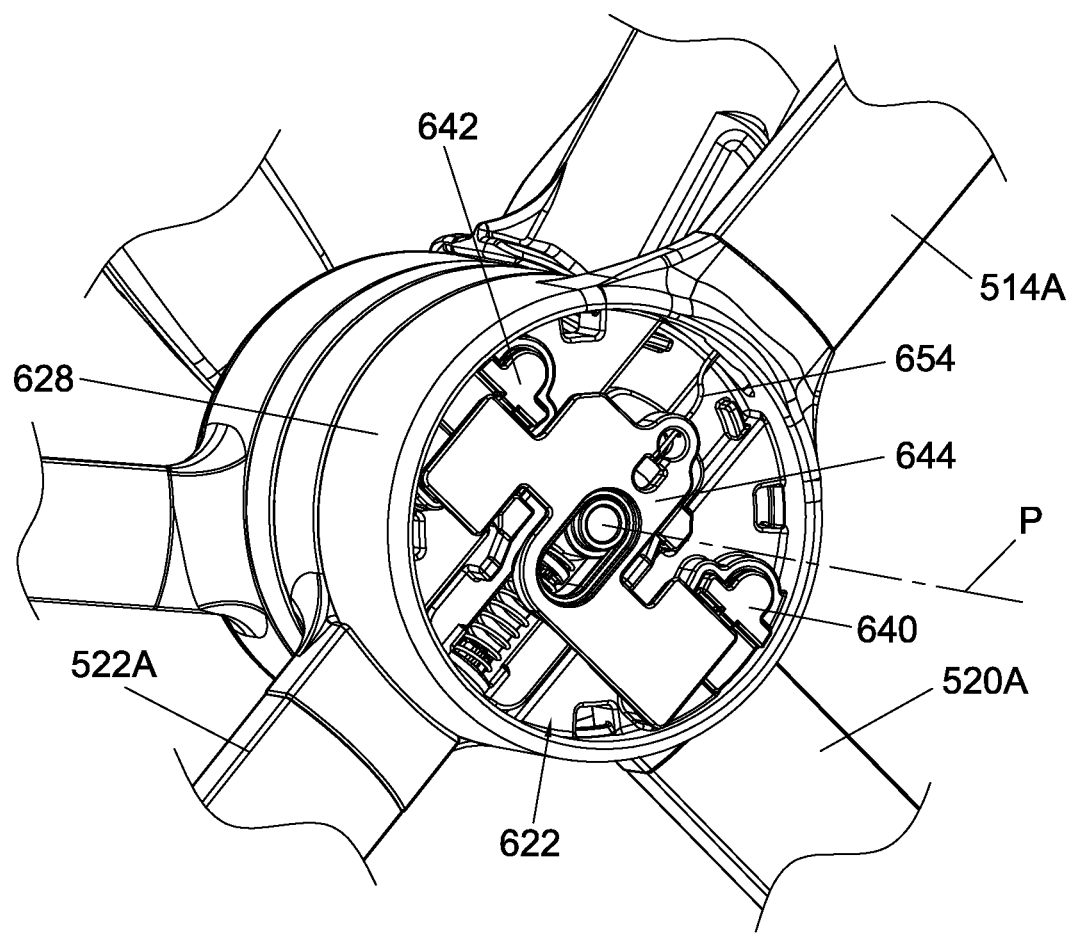
FIG. 72 is a perspective view illustrating construction details of a release mechanism provided in the wheeled carrying apparatus shown in FIG. 62.
Figure 73:
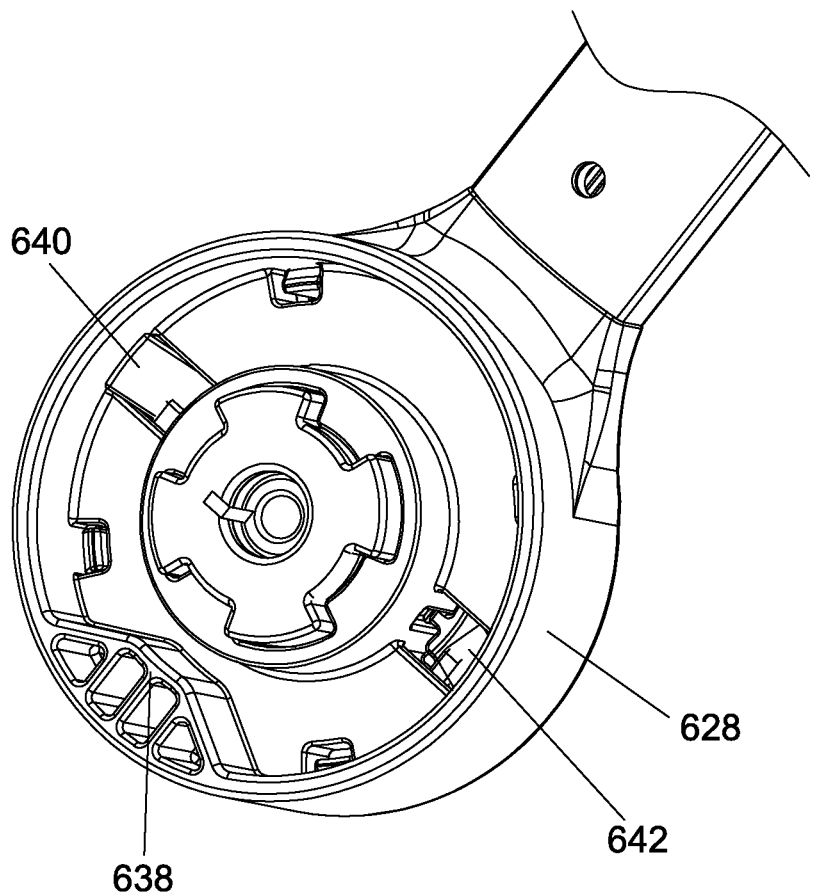
FIG. 73 is a perspective view illustrating a portion of the release mechanism provided in the coupling part of the handle frame in the wheeled carrying apparatus shown in FIG. 62.
Figure 74:
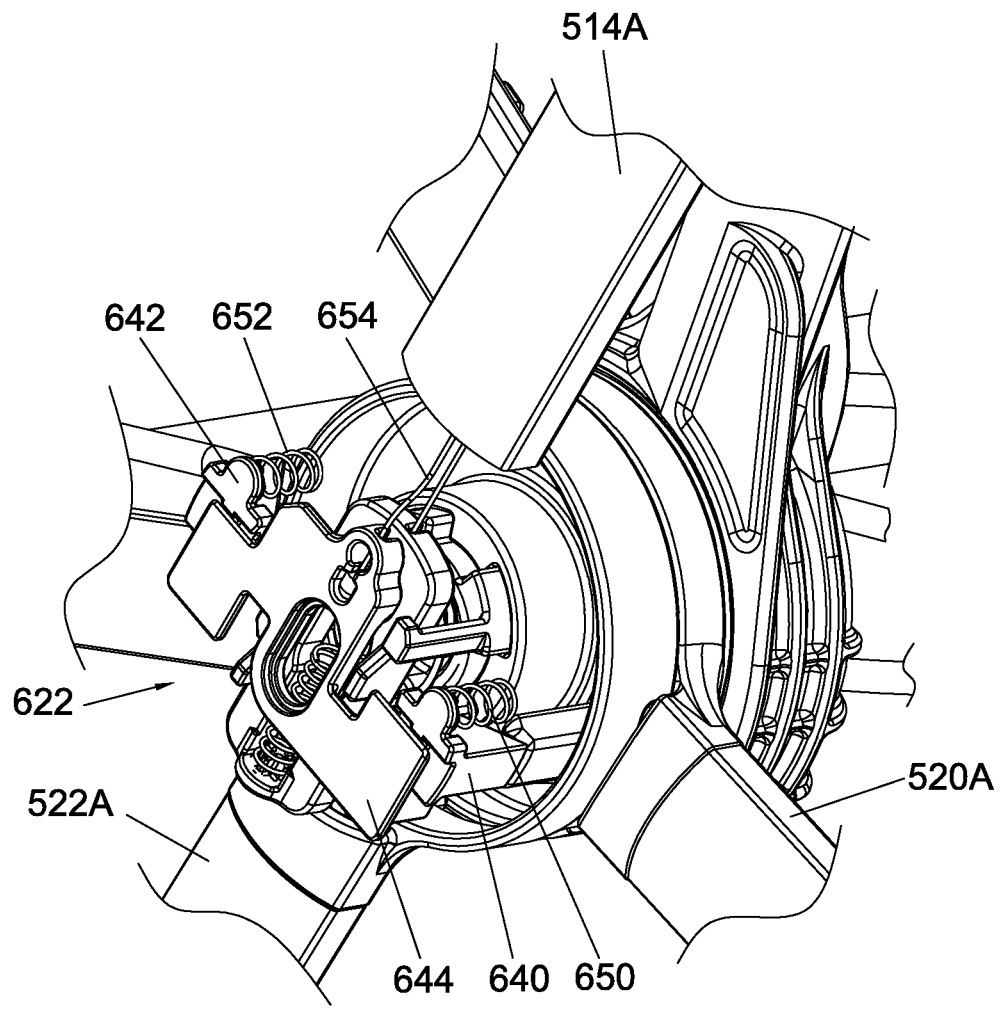
FIG. 74 is a perspective view illustrating further construction details of the release mechanism provided in the wheeled carrying apparatus shown in FIG. 62.
Figure 75:
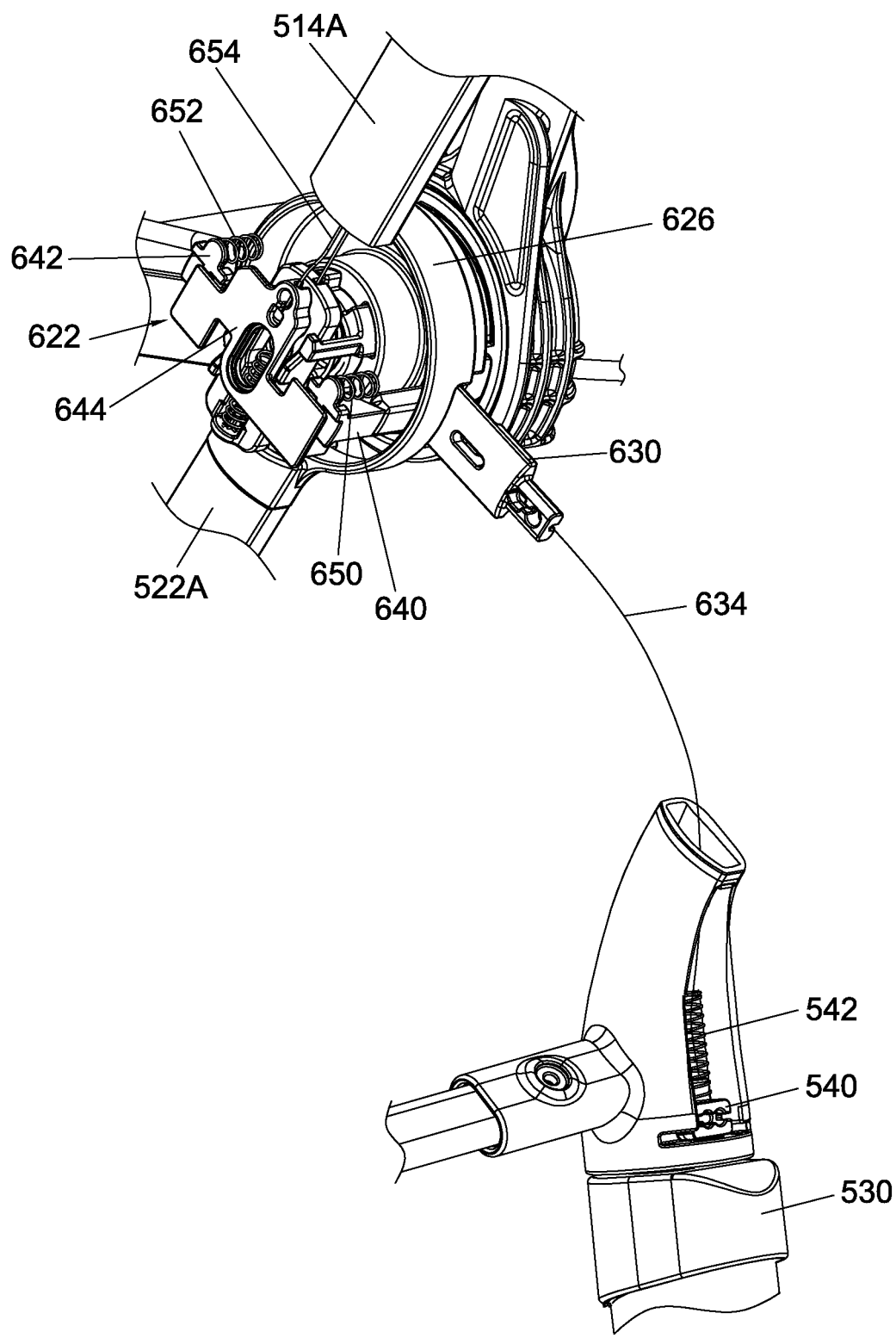
FIG. 75 is a schematic view illustrating the handle frame and the release mechanism disposed in a position adapted to interact with one of the two link actuators of the actuating assembly in the wheeled carrying apparatus shown in FIG. 62.
Figure 76:
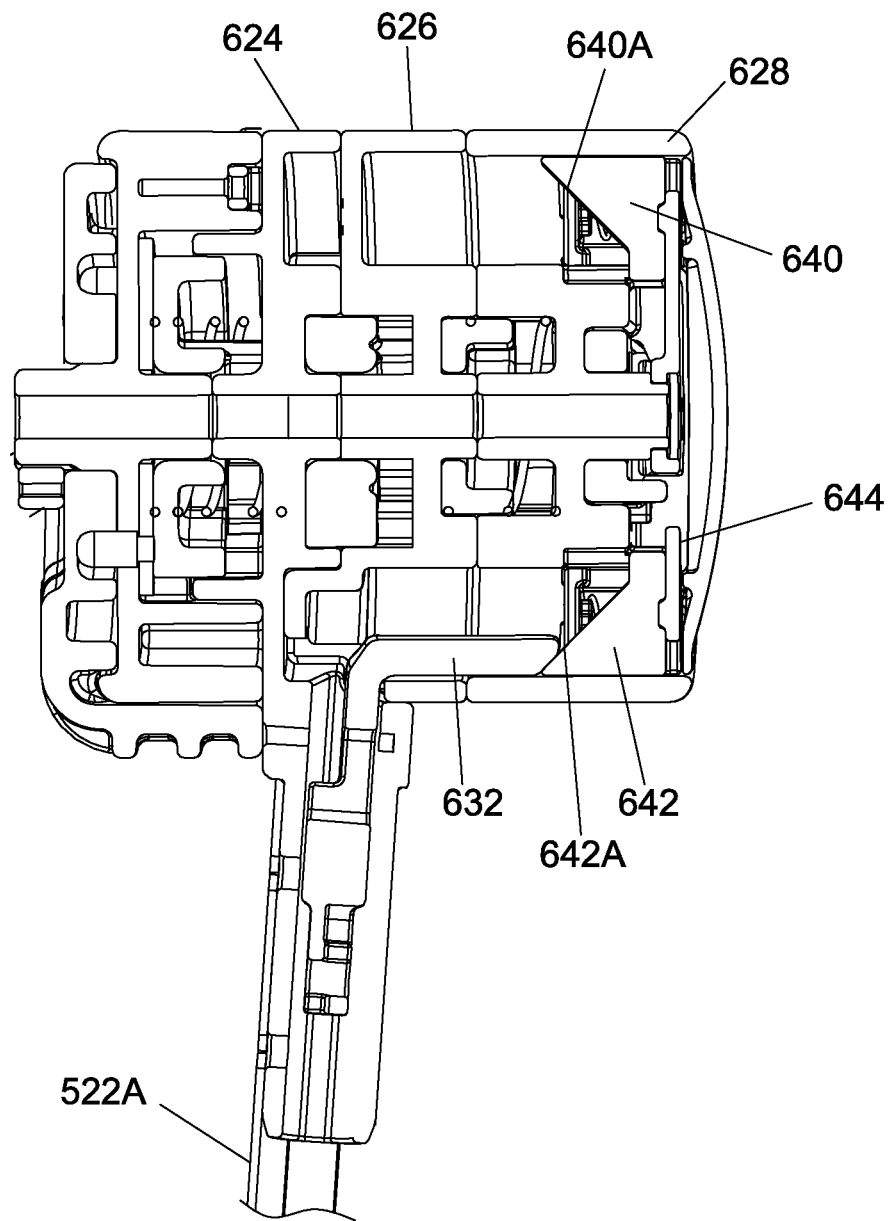
FIG. 76 is a cross-sectional view illustrating the release mechanism disposed in another position adapted to interact with the other one of the two link actuators of the actuating assembly in the wheeled carrying apparatus shown in FIG. 62.
Figure 77:
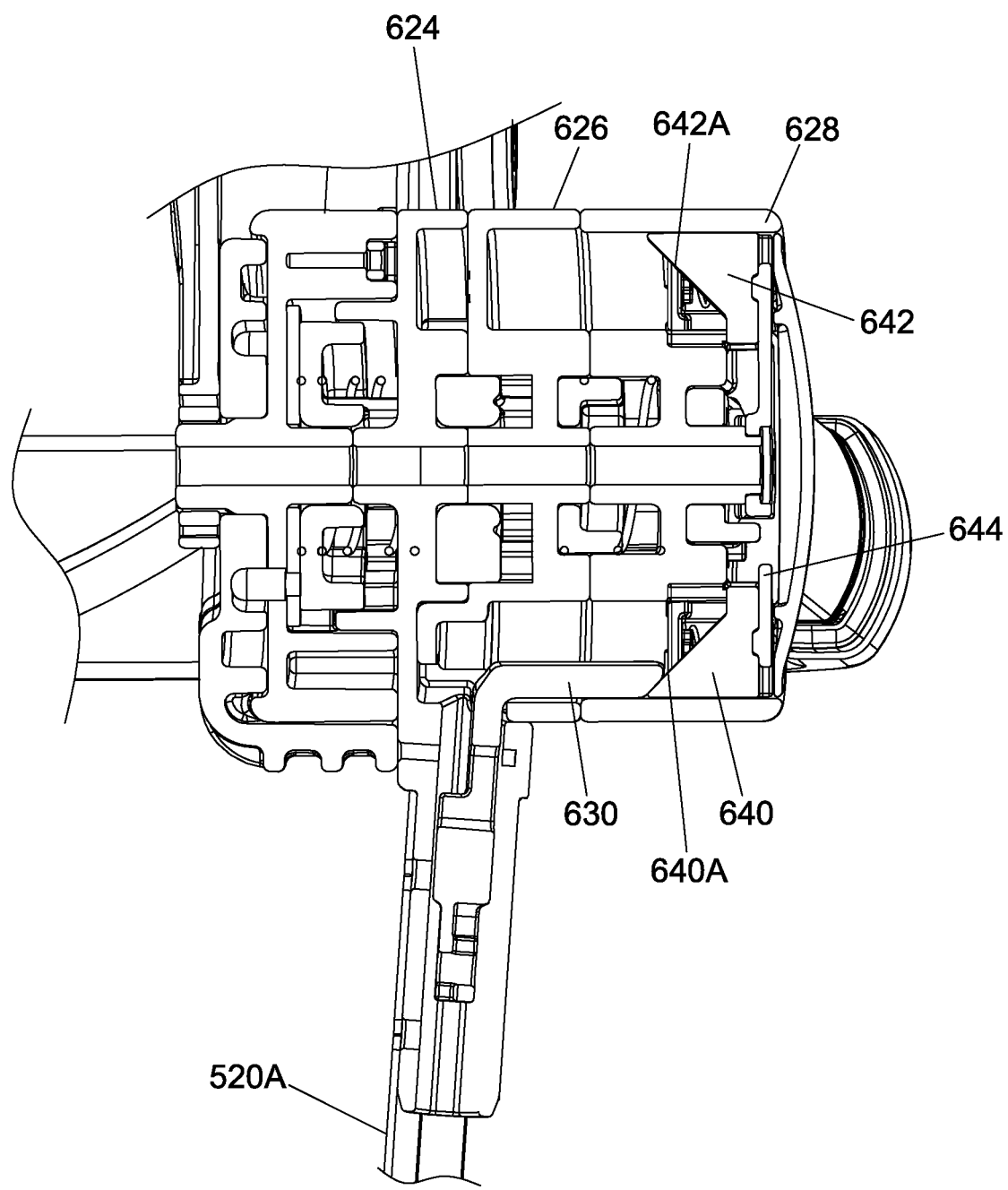
FIG. 77 is a cross-sectional view illustrating the release mechanism disposed in the position shown in FIG. 75 adapted to interact with one of the two link actuators of the actuating assembly in the wheeled carrying apparatus shown in FIG. 62.
Figure 78:
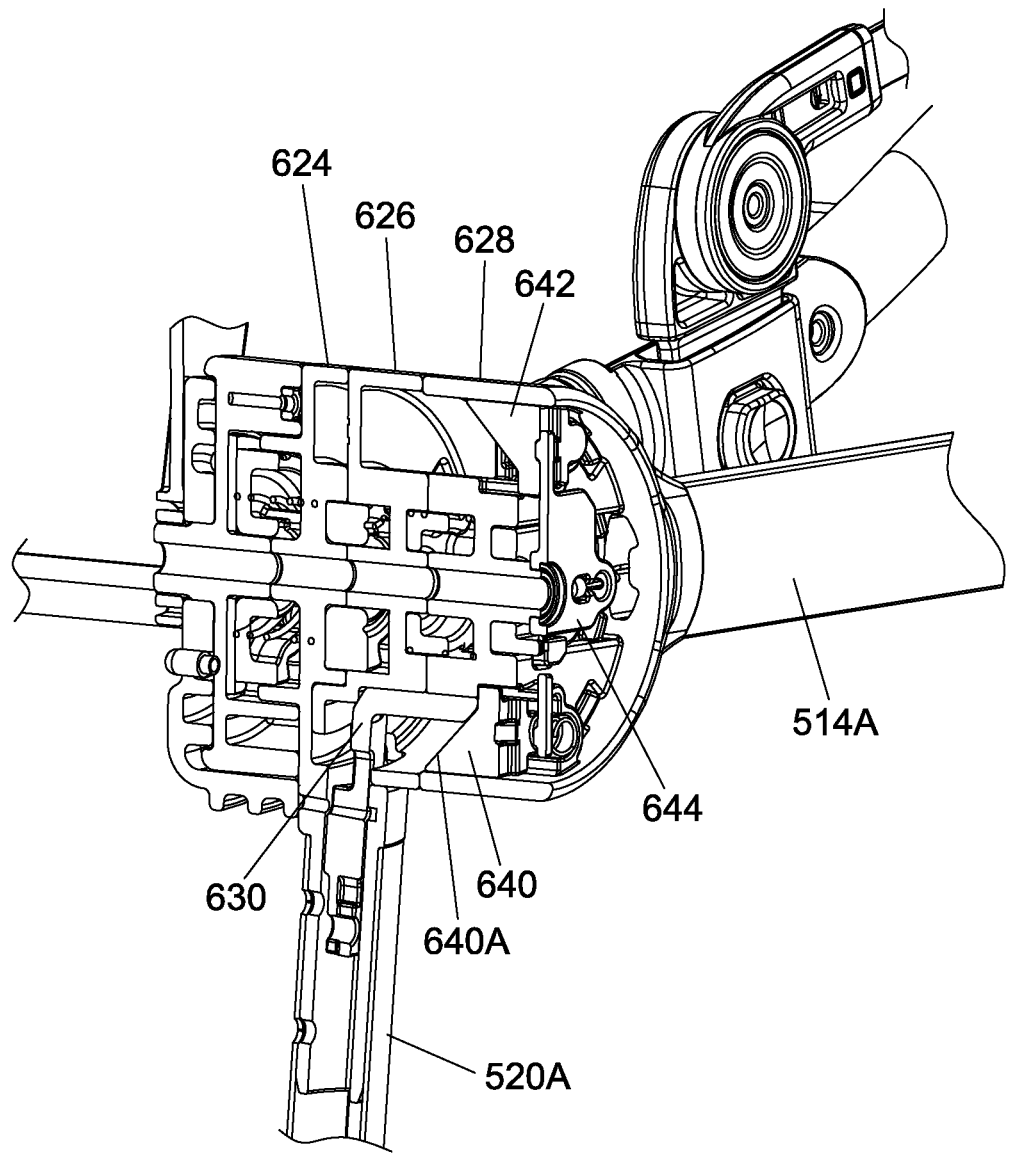
FIG. 78 is a cross-sectional view illustrating the release mechanism disposed in the position of FIG. 77 and operated to urge the link actuator in movement for unlocking the wheel mount latch coupled thereto.

Referring to FIGS. 62 and 71, the operating part 624 can include a barrel 656 and a button 658. The barrel 656 can be pivotally connected with the grip portion 514B of the handle frame 514, and the cable 654 can have an end anchored to the barrel 656. The button 658 can be slidably connected with the grip portion 514B and pivotally connected with the barrel 656. With this construction, the button 658 can be pressed to urge the barrel 656 to rotate for pulling the cable 654, whereby the release actuator 644 can move and push the urging parts 640 and 642 in movement for pushing against either the link actuator 630 or 632.

While the handle frame 514 is in the first position, the wheel mount 534 is kept unlocked by the interaction between the urging portion 638 and the link actuator 632, the urging part 640 is positioned adjacent to the link actuator 630, and the urging part 642 is positioned away from the link actuator 632. As a caregiver actuates the operating part 624, the release actuator 644 moves and pushes the urging part 640 in movement, which consequently urges the link actuator 630 to move and pull the wheel mount latch 540 to disengage from the wheel mount 530. Accordingly, the wheel mounts 530 and 534 can be unlocked at the same time.

While the handle frame 514 is in the second position, the wheel mount 530 is kept unlocked by the interaction between the urging portion 638 and the link actuator 630, the urging part 642 is positioned adjacent to the link actuator 632, and the urging part 640 is positioned away from the link actuator 630. As a caregiver actuates the operating part 624, the release actuator 644 moves and pushes the urging part 642 in movement, which consequently urges the link actuator 632 to move and pull the wheel mount latch 548 to disengage from the wheel mount 534. Accordingly, the wheel mounts 530 and 534 can be unlocked at the same time.

Since the two wheels assemblies 516 and 518 are provided at each of the left and right side of the wheeled carrying apparatus 600, the actuating assembly 620 and the release mechanism 622 can be symmetrically arranged at the left and right side and coupled to the operating part 624.

Advantages of the wheeled carrying apparatuses described herein include the ability to lock and unlock wheel assemblies with respect to a standing frame in a flexible manner. According to the needs, some of the wheel assemblies are locked while others are unlocked, or all of the wheel assemblies are unlocked at the same time as desired. Accordingly, the wheeled carrying apparatuses can be more flexible in use and offer better maneuverability.

Realization of the wheeled carrying apparatuses has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A wheeled carrying apparatus comprising:
    a frame structure including a standing frame and a handle frame coupled to the standing frame;
    a first wheel mount carrying a first wheel and pivotally connected with the standing frame, the first wheel being rotatable relative to the first wheel mount about a first wheel axis;
    a locking assembly including a first wheel mount latch movably connected with the standing frame, the first wheel mount latch being adapted to be engaged with the first wheel mount to rotationally lock the first wheel mount with respect to the standing frame, and adapted to be disengaged from the first wheel mount to unlock the first wheel mount so that the first wheel mount is rotatable relative to the standing frame for changing an orientation of the first wheel axis;
    an actuating assembly coupled to the first wheel mount latch; and
    a release mechanism being operable, independently from operating the handle frame, to cause the actuating assembly to actuate the first wheel mount latch to disengage the first wheel mount latch from the first wheel mount,
    wherein
    the first wheel mounting latch has an engaging portion configured to be engaged in an opening at an upper surface of the first wheel mount, and a size of the opening corresponds to the engaging portion of the first wheel mounting latch.

2. The wheeled carrying apparatus according to claim 1, wherein the release mechanism is operable to cause the actuating assembly to push or pull the first wheel mount latch so that the first wheel mount latch disengages from the first wheel mount.

3. The wheeled carrying apparatus according to claim 1, wherein the locking assembly includes a locking spring connected with the first wheel mount latch, the locking spring being adapted to apply a biasing force for engaging the first wheel mount latch with the first wheel mount.

4. The wheeled carrying apparatus according to claim 1, wherein the release mechanism includes an operating part that is optionally placed on the handle frame.

5. The wheeled carrying apparatus according to claim 4, wherein the operating part is slidably or pivotally connected with the frame structure, in particular with the handle frame.

6. The wheeled carrying apparatus according to claim 1, wherein the actuating assembly includes a link actuator and a linking part, the link actuator being movably connected with the frame structure, the linking part coupling the first wheel mount latch to the link actuator.

7. The wheeled carrying apparatus according to claim 6, wherein the link actuator is movable to actuate the linking part, in particular to push or pull the linking part, and to urge the first wheel mount latch to disengage from the first wheel mount.

8. The wheeled carrying apparatus according to claim 6 or 7, wherein the linking part includes a cable.

9. The wheeled carrying apparatus according to claim 8, wherein the release mechanism includes an operating part that is coupled to the link actuator via a cable.

10. The wheeled carrying apparatus according to claim 1, wherein the actuating assembly includes a link actuator and wherein the handle frame is coupled to the standing frame via a bar linkage, the link actuator being movably connected with the bar linkage.

11. The wheeled carrying apparatus according to claim 10, wherein the bar linkage includes a bar having two ends respectively connected pivotally with the handle frame and the standing frame, and the link actuator is slidably connected with the bar.

12. The wheeled carrying apparatus according to claim 10, wherein the release mechanism includes an operating part that is placed on the handle frame.

13. The wheeled carrying apparatus according to claim 1, wherein the actuating assembly includes a link actuator and wherein the link actuator is slidably assembled with the frame structure, and the release mechanism includes an operating part that has a ramp surface, the release mechanism being operable to cause the first wheel mount latch to unlock the first wheel mount via a sliding contact between the ramp surface and the link actuator.

14. The wheeled carrying apparatus according to claim 1, wherein the release mechanism includes an operating part that includes a barrel pivotally connected with the frame structure, and wherein the actuating assembly includes a linking part, and the linking part includes a cable having an end anchored to the barrel, the barrel being rotatable to wind at least partially the cable so that the first wheel mount latch is actuated in movement by the actuating assembly, in particular pushed or pulled in movement by the actuating assembly, and disengages from the first wheel mount.

15. The wheeled carrying apparatus according to claim 1, wherein the release mechanism includes an operating part that includes a barrel pivotally connected with the frame structure, and a button slidably connected with the frame structure, and wherein the actuating assembly includes a linking part, and the linking part includes a cable having an end anchored to the barrel, the button being operable to urge the barrel to rotate for operating the cable so that the first wheel mount latch is actuated in movement by the actuating assembly, in particular for pulling the cable so that the first wheel mount latch is pulled in movement by the actuating assembly and disengages from the first wheel mount.

16. The wheeled carrying apparatus according to claim 1, wherein the release mechanism includes an operating part, and the actuating assembly includes a single cable having two opposite ends respectively connected with the operating part and the first wheel mount latch.

17. The wheeled carrying apparatus according to claim 1, being implemented as a child stroller apparatus.

18. The wheeled carrying apparatus according to claim 1, wherein the first wheel mount is configured to, in response to the engaging portion of the first wheel mount latch engaging with the opening at the upper surface of the first wheel mount without changing the orientation of the first wheel axis, be rotationally locked with respect to the standing frame.

19. The wheeled carrying apparatus according to claim 1, wherein the release mechanism includes an operating part provided on the frame structure at a location distant from the first wheel mount latch.

20. A wheeled carrying apparatus comprising:
a frame structure including a standing frame;
a first wheel mount carrying a first wheel and pivotally connected with the standing frame, the first wheel being rotatable relative to the first wheel mount about a first wheel axis;
a locking assembly including a first wheel mount latch movably connected with the standing frame, the first wheel mount latch being adapted to be engaged with the first wheel mount to rotationally lock the first wheel mount with respect to the standing frame, and adapted to be disengaged from the first wheel mount to unlock the first wheel mount so that the first wheel mount is rotatable relative to the standing frame for changing an orientation of the first wheel axis;
an actuating assembly coupled to the first wheel mount latch; and
a release mechanism including an operating part provided on the frame structure at a location distant from the first wheel mount latch, the release mechanism being operable to cause the actuating assembly to actuate the first wheel mount latch so that the first wheel mount latch disengages from the first wheel mount,
wherein the standing frame includes a leg frame, and the operating part is placed on the leg frame, and
wherein the leg frame includes a side segment and a transversal segment fixedly connected with each other, and the operating part is placed on the side segment or the transversal segment.

21. The wheeled carrying apparatus according to claim 20, wherein the operating part is provided on the frame structure at a location distant from the first wheel mount latch.

22. A wheeled carrying apparatus comprising:
a frame structure including a standing frame;
a first wheel mount carrying a first wheel and pivotally connected with the standing frame, the first wheel being rotatable relative to the first wheel mount about a first wheel axis;
a locking assembly including a first wheel mount latch movably connected with the standing frame, the first wheel mount latch being adapted to be engaged with the first wheel mount to rotationally lock the first wheel mount with respect to the standing frame, and adapted to be disengaged from the first wheel mount to unlock the first wheel mount so that the first wheel mount is rotatable relative to the standing frame for changing an orientation of the first wheel axis;
an actuating assembly coupled to the first wheel mount latch; and
a release mechanism including an operating part provided on the frame structure at a location distant from the first wheel mount latch, the release mechanism being operable to cause the actuating assembly to actuate the first wheel mount latch so that the first wheel mount latch disengages from the first wheel mount,
wherein the wheeled carrying apparatus further includes:
a second wheel mount carrying a second wheel and pivotally connected with the standing frame, the second wheel being rotatable relative to the second wheel mount about a second wheel axis, the first and second wheel mounts being spaced apart from each other along a lengthwise axis of the wheeled carrying apparatus extending from a rear to a front thereof; and
a second locking assembly including a second wheel mount latch movably connected with the standing frame, the second wheel mount latch being adapted to be engaged with the second wheel mount to rotationally lock the second wheel mount with respect to the standing frame, and adapted to be disengaged from the second wheel mount to unlock the second wheel mount so that the second wheel mount is rotatable relative to the standing frame for changing an orientation of the second wheel axis.

23. The wheeled carrying apparatus according to claim 22, wherein the frame structure further includes a handle frame that is coupled to the standing frame and is rotatable relative to the standing frame between a first position and a second position, the release mechanism being configured to be operable in any of the first and second position of the handle frame to cause the first wheel mount and the second wheel mount to be unlocked at the same time.

24. The wheeled carrying apparatus according to claim 23, wherein the actuating assembly includes:
a link actuator disposed adjacent to the handle frame or the standing frame; and
a linking part having an intermediate portion that loops at the first wheel mount latch, and a first and a second end respectively anchored to the link actuator and the second wheel mount latch;
wherein the link actuator is rotatable along with the handle frame or the standing frame in a first direction to actuate the second end of the linking part, and particular push or pull the second end of the linking part, and to urge the second wheel mount latch to disengage from the second wheel mount and concurrently relax the intermediate portion of the linking part for engagement of the first wheel mount latch with the first wheel mount, and the link actuator is rotatable along with the handle frame in a second direction opposite to the first direction to actuate the intermediate portion of the linking part, in particular push or pull the intermediate portion of the linking part, and to urge the first wheel mount latch to disengage from the first wheel mount and concurrently relax the second end of the linking part for engagement of the second wheel mount latch with the second wheel mount.

25. The wheeled carrying apparatus according to claim 24, wherein the locking assembly includes a first locking spring connected with the first wheel mount latch, and the second locking assembly includes a second locking spring connected with the second wheel mount latch, the first locking spring applying a biasing force for engaging the first wheel mount latch with the first wheel mount that is greater than a biasing force applied by the second locking spring for engaging the second wheel mount latch with the second wheel mount.

26. The wheeled carrying apparatus according to claim 24 or 25, wherein the operating part being operable to cause the link actuator to rotate in a same one of the first and second direction for unlocking the first and second wheel mounts while the handle frame is in any of the first and second position.

27. The wheeled carrying apparatus according to claim 26, wherein the operating part is connected with the link actuator or a driving element that is coupled to the link actuator via a cable, so that the operating part is able to be operated to cause the link actuator to rotate.

28. The wheeled carrying apparatus according to claim 23, wherein the actuating assembly includes:
a link actuator disposed adjacent to the handle frame or the standing frame; and
a linking part having an intermediate portion that loops at the link actuator, and a first and a second end respectively anchored to the first wheel mount latch and the second wheel mount latch;
wherein the link actuator is rotatable along with the handle frame or the standing frame in a first direction to actuate the second end of the linking part, and particular push or pull the second end of the linking part, and to urge the second wheel mount latch to disengage from the second wheel mount and concurrently relax the intermediate portion of the linking part for engagement of the first wheel mount latch with the first wheel mount, and the link actuator is rotatable along with the handle frame in a second direction opposite to the first direction to actuate the intermediate portion of the linking part, in particular push or pull the intermediate portion of the linking part, and to urge the first wheel mount latch to disengage from the first wheel mount and concurrently relax the second end of the linking part for engagement of the second wheel mount latch with the second wheel mount.

29. The wheeled carrying apparatus according to claim 28, wherein the actuating assembly further includes a cable assembly that operatively couples the operating part to the first and second wheel mount latches and is operatively decoupled from the link actuator, the operating part being operable to actuate the cable assembly, in particular to push or pull the cable assembly, so that the first and second wheel mount latches are respectively disengaged from the first and second wheel mounts.

30. The wheeled carrying apparatus according to claim 29, wherein the cable assembly includes a sliding part, a first and a second cable portion connected with the sliding part, and a third cable connected with the sliding part and the operating part, the first cable portion further being connected with the first wheel mount latch or a first portion of the linking part, the second cable portion further being connected with the second wheel mount latch or a second portion of the linking part, the first and second portions of the linking part being folded relative to each other.

31. The wheeled carrying apparatus according to claim 23, wherein the actuating assembly includes:
a first and a second link actuator movably connected with the standing frame;
a first linking part coupling the first wheel mount latch to the first link actuator, and a second linking part coupling the second wheel mount latch to the second link actuator; and
a coupling part fixedly connected with the handle frame and having an urging portion;
wherein a rotation of the handle frame from the second position to the first position causes the urging portion to move away from the first link actuator and to effect movement of the second link actuator, in particular to push or pull the second link actuator in movement so that the second link actuator actuates the second wheel mount latch to disengage from the second wheel mount, in particular pushes or pulls the second wheel mount latch to disengage from the second wheel mount, and a rotation of the handle frame from the first position to the second position causes the urging portion to move away from the second link actuator and to effect movement of the second link actuator, in particular to push or pull the first link actuator in movement so that the first link actuator actuates the first wheel mount latch, and particular pushes or pulls the first wheel mount latch to disengage from the first wheel mount.

32. The wheeled carrying apparatus according to claim 31, wherein the release mechanism further includes a first and a second urging part carried with the handle frame, and a release actuator coupled to the operating part and connected with the first and second urging parts, the first urging part being adjacent to the first link actuator and the second urging part being displaced away from the second link actuator when the handle frame is in the first position, and the second urging part being adjacent to the second link actuator and the first urging part being displaced away from the first link actuator when the handle frame is in the second position, the operating part being operable to cause the first urging part to effect movement of the first link actuator, in particular to push or pull the first link actuator in movement so that the first link actuator actuates the first wheel mount latch, in particular pushes or pulls the first wheel mount latch to disengage from the first wheel mount while the handle frame is in the first position, and the operating part being operable to cause the second urging part to effect movement of the second link actuator, in particular to push or pull the second link actuator in movement so that the second link actuator actuates the second wheel mount latch, in particular pushes or pulls the second wheel mount latch to disengage from the second wheel mount while the handle frame is in the second position.

33. The wheeled carrying apparatus according to claim 22 or 23, wherein the actuating assembly includes:
a link actuator movably connected with the frame structure, in particular with the standing frame or the handle frame; and
a first linking part coupling the first wheel mount latch to the link actuator, and a second linking part coupling the second wheel mount latch to the link actuator;
wherein the link actuator is movable in a first direction to actuate the second linking part, in particular push or pull the second linking part, and to urge the second wheel mount latch to disengage from the second wheel mount and concurrently relax the first linking part so that the first wheel mount latch is allowed to engage with the first wheel mount, and the link actuator is movable in a second direction opposite to the first direction to actuate the first linking part, in particular push or pull the second linking part, and to urge the first wheel mount latch to disengage from the first wheel mount and concurrently relax the second linking part so that the second wheel mount latch is allowed to engage with the second wheel mount.

34. The wheeled carrying apparatus according to claim 33, wherein the link actuator is movable in the first direction or the second direction in response to a rotation of the handle frame between the first position and the second position.

35. The wheeled carrying apparatus according to claim 34, wherein any of the first linking part and the second linking part includes a cable.

36. The wheeled carrying apparatus according to claim 33, wherein the handle frame is rotatable about a pivot axis relative to the standing frame between the first position and the second position, and the link actuator is pivotally connected with the standing frame about the same pivot axis.

37. The wheeled carrying apparatus according to claim 36, wherein the actuating assembly further includes a rotational coupling mechanism configured to rotationally couple the link actuator to the handle frame during rotation of the handle frame between the first position and the second position, and to rotationally decouple the link actuator from the handle frame when the handle frame rotates for folding the wheeled carrying apparatus.

38. The wheeled carrying apparatus according to claim 37, wherein the standing frame includes a first coupling part, the handle frame includes a second coupling part pivotally connected with the first coupling part, and the rotational coupling mechanism includes a guide slot provided on the first coupling part and a catching part carried with the link actuator, the catching part having a protrusion received in the guide slot, the guide slot having a first slot portion and a second slot portion tilted at an angle relative to the first slot portion, and the catching part being movable relative to the link actuator between a first state and a second state, the catching part being engaged with the second coupling part and the protrusion being received in the first slot portion in the first state for rotationally coupling the link actuator to the handle frame, and the catching part being disengaged from the second coupling part and the protrusion being received in the second slot portion in the second state for rotationally decoupling the link actuator from the handle frame.

39. The wheeled carrying apparatus according to claim 38, wherein the protrusion of the catching part is adapted to slide along the first slot portion when the handle frame rotates between the first and second position.

40. The wheeled carrying apparatus according to claim 38, wherein the rotational coupling mechanism further includes a spring respectively connected with the catching part and the link actuator, the spring biasing the catching part toward the first state.

41. The wheeled carrying apparatus according to claim 33, wherein the release mechanism further includes a coupling part that is operatively connected with the operating part, the coupling part being movable relative to the link actuator between a first state and a second state, the link actuator is rotatable relative to the handle frame or the standing frame in a first direction when the coupling part is in the second state and the handle frame is in the first position, and to urge the second wheel mount latch to disengage from the second wheel mount.

42. The wheeled carrying apparatus according to claim 41, wherein the link actuator is rotatable relative to the handle frame or the standing frame in a second direction when the coupling part is in the second state and the handle frame is in the second position, and to urge the first wheel mount latch to disengage from the first wheel mount in a second direction.

43. The wheeled carrying apparatus according to claim 41, wherein the coupling part is carried with the handle frame and being movable relative to the handle frame, wherein the link actuator and the handle frame being coupled to each other so as to be rotatable in unison when the coupling part is in the first state.

44. The wheeled carrying apparatus according to claim 41, wherein the actuating assembly further includes:
a first spring connected with the link actuator, the first spring being operable to bias the link actuator to rotate relative to the standing frame and the handle frame in the first direction; and
a second spring connected with the link actuator, the second spring being operable to bias the link actuator to rotate relative to the standing frame and the handle frame in the second direction.

45. The wheeled carrying apparatus according to claim 44, wherein the coupling part is engaged with the link actuator in the first state so as to prevent rotation of the link actuator relative to the handle frame, and the link actuator is rotatable relative to the handle frame and the standing frame under a biasing force of the first or second spring when the coupling part is in the second state.

46. The wheeled carrying apparatus according to claim 45, wherein the handle frame is rotatable between the first position and the second position with the coupling part in the first state, whereby the link actuator is rotatable along with the handle frame in the first direction when the handle frame rotates from the second position to the first position, and the link actuator is rotatable along with the handle frame in the second direction when the handle frame rotates from the first position to the second position.

47. The wheeled carrying apparatus according to claim 45, wherein the operating part is operable to cause the coupling part to move relative to the handle frame from the first state to the second state while the handle frame is in the first position so that the link actuator biased by the second spring rotates in the second direction and pulls the first linking part for disengaging the first wheel mount latch from the first wheel mount, and the operating part is operable to cause the coupling part to move relative to the handle frame from the first state to the second state while the handle frame is in the second position so that the link actuator biased by the first spring rotates in the first direction and pulls the second linking part for disengaging the second wheel mount latch from the second wheel mount.

48. The wheeled carrying apparatus according to claim 45, wherein the link actuator has a generally V-shaped slot, and a notch at a bottom of the slot, the coupling part being engaged with the notch in the first state and disengaged from the notch in the second state.

49. The wheeled carrying apparatus according to claim 45, wherein the operating part is connected with the coupling part via a cable.

50. The wheeled carrying apparatus according to claim 33, wherein the actuating assembly further includes a cable assembly that operatively couples the operating part to the first and second wheel mount latches and is operatively decoupled from the link actuator, the operating part being operable to actuate the cable assembly, in particular push or pull the cable assembly, so that the first and second wheel mount latches are respectively disengaged from the first and second wheel mounts.

51. The wheeled carrying apparatus according to claim 50, wherein the cable assembly includes a sliding part, a first and a second cable portion connected with the sliding part, and a third cable connected with the sliding part and the operating part, the first cable portion further being connected with the first linking part or the first wheel mount latch, the second cable portion further being connected with the second linking part or the second wheel mount latch.

52. The wheeled carrying apparatus according to claim 33, wherein the actuating assembly further includes a spring connected with the link actuator, a rotation of the handle frame from the second position to the first position causing the handle frame to contact and urge the link actuator to move in the first direction, and a rotation of the handle frame from the first position to the second position causing the handle frame to move away from the link actuator so that the link actuator moves in the second direction under a biasing force of the spring.

53. The wheeled carrying apparatus according to claim 33, wherein the first linking part and the second linking part are formed by a single cable.

54. The wheeled carrying apparatus according to claim 22, wherein the release mechanism includes an operating part provided on the frame structure at a location distant from the first wheel mount latch.

\* \* \* \* \*